US 8,204,844 B2

(12) United States Patent
Au

(10) Patent No.: US 8,204,844 B2
(45) Date of Patent: *Jun. 19, 2012

(54) SYSTEMS AND METHODS TO INCREASE EFFICIENCY IN SEMANTIC NETWORKS TO DISAMBIGUATE NATURAL LANGUAGE MEANING

(75) Inventor: Lawrence Au, Vienna, VA (US)

(73) Assignee: QPS Tech. Limited Liability Company, Wilmington, DE (US)

( * ) Notice: Subject to any disclaimer, the term of this patent is extended or adjusted under 35 U.S.C. 154(b) by 27 days.

This patent is subject to a terminal disclaimer.

(21) Appl. No.: 12/577,159

(22) Filed: Oct. 10, 2009

(65) Prior Publication Data

US 2010/0030723 A1    Feb. 4, 2010

Related U.S. Application Data

(60) Division of application No. 10/329,402, filed on Dec. 27, 2002, now Pat. No. 7,711,672, which is a continuation-in-part of application No. 09/085,830, filed on May 28, 1998, now Pat. No. 6,778,970.

(60) Provisional application No. 60/342,360, filed on Dec. 27, 2001.

(51) Int. Cl.
*G06N 7/00*    (2006.01)
(52) U.S. Cl. ..................................... 706/55; 707/999.01
(58) Field of Classification Search .................... 706/55; 707/999.01
See application file for complete search history.

(56) References Cited

U.S. PATENT DOCUMENTS

| | | |
|---|---|---|
| 4,429,385 A | 1/1984 | Cichelli et al. |
| 4,468,728 A | 8/1984 | Wang |
| 4,677,550 A | 6/1987 | Ferguson |
| 4,769,772 A | 9/1988 | Dwyer |
| 4,774,657 A | 9/1988 | Anderson et al. |
| 4,868,733 A | 9/1989 | Fujisawa et al. |
| 4,905,163 A | 2/1990 | Garber et al. |
| 4,914,569 A | 4/1990 | Levine et al. |
| 4,914,590 A | 4/1990 | Loatman et al. |
| 5,043,872 A | 8/1991 | Cheng et al. |
| 5,056,021 A | 10/1991 | Ausborn |
| 5,095,458 A | 3/1992 | Lynch et al. |
| 5,099,425 A * | 3/1992 | Kanno et al. ....................... 704/9 |
| 5,111,398 A | 5/1992 | Nunberg et al. |
| 5,123,057 A | 6/1992 | Verly et al. |

(Continued)

FOREIGN PATENT DOCUMENTS

EP    1288794    3/2003

(Continued)

OTHER PUBLICATIONS

Roark, et al. "Noun-phrase Co-occurrence Statistics for Semuautomatic Semantic Lexicon Construction," Proceedings of the 17th International Conference on Computational Linguistics, vol. 2, pp. 1110-1116, 1998.

(Continued)

*Primary Examiner* — Jeffrey A Gaffin
*Assistant Examiner* — Mai T Tran
(74) *Attorney, Agent, or Firm* — Turocy & Watson, LLP

(57) ABSTRACT

A computer implemented data processor system shifts a semantic network topology to increase efficiency in disambiguating a contextual meaning of natural language symbols.

25 Claims, 52 Drawing Sheets

U.S. PATENT DOCUMENTS

| | | | |
|---|---|---|---|
| 5,155,825 A | 10/1992 | Moughanni et al. | |
| 5,202,986 A | 4/1993 | Nickel | |
| 5,299,125 A | 3/1994 | Baker et al. | |
| 5,321,608 A | 6/1994 | Namba et al. | |
| 5,386,556 A | 1/1995 | Hedin et al. | |
| 5,434,777 A | 7/1995 | Luciw | |
| 5,479,563 A | 12/1995 | Yamaguchi | |
| 5,528,491 A * | 6/1996 | Kuno et al. | 704/9 |
| 5,598,560 A | 1/1997 | Benson | |
| 5,625,767 A | 4/1997 | Bartell et al. | |
| 5,625,814 A | 4/1997 | Luciw | |
| 5,628,011 A * | 5/1997 | Ahamed et al. | 1/1 |
| 5,630,125 A * | 5/1997 | Zellweger | 1/1 |
| 5,644,740 A | 7/1997 | Kiuchi | |
| 5,664,181 A | 9/1997 | Velissaropoulos et al. | |
| 5,694,590 A | 12/1997 | Thuraisingham et al. | |
| 5,721,895 A | 2/1998 | Velissaropoulos et al. | |
| 5,742,284 A | 4/1998 | Duggan et al. | |
| 5,752,016 A | 5/1998 | Whittaker et al. | |
| 5,778,223 A | 7/1998 | Velissaropoulos et al. | |
| 5,794,050 A | 8/1998 | Dahlgren et al. | |
| 5,802,508 A | 9/1998 | Morgenstern | |
| 5,809,269 A | 9/1998 | Favot et al. | |
| 5,826,256 A | 10/1998 | Devanbu | |
| 5,829,002 A | 10/1998 | Priest | |
| 5,870,751 A | 2/1999 | Trotter | |
| 5,894,554 A | 4/1999 | Lowery et al. | |
| 5,901,100 A | 5/1999 | Taylor | |
| 5,937,400 A * | 8/1999 | Au | 706/55 |
| 5,963,940 A | 10/1999 | Liddy et al. | |
| 5,974,412 A * | 10/1999 | Hazlehurst et al. | 1/1 |
| 6,006,221 A | 12/1999 | Liddy et al. | |
| 6,154,213 A | 11/2000 | Rennison et al. | |
| 6,179,491 B1 | 1/2001 | Choi et al. | |
| 6,219,657 B1 | 4/2001 | Hatayama | |
| 6,233,575 B1 | 5/2001 | Agrawal et al. | |
| 6,256,623 B1 | 7/2001 | Jones | |
| 6,263,352 B1 | 7/2001 | Cohen | |
| 6,269,335 B1 | 7/2001 | Ittycheriah et al. | |
| 6,304,864 B1 | 10/2001 | Liddy et al. | |
| 6,356,906 B1 | 3/2002 | Lippert et al. | |
| 6,405,162 B1 | 6/2002 | Segond et al. | |
| 6,430,531 B1 | 8/2002 | Polish | |
| 6,442,522 B1 | 8/2002 | Carberry et al. | |
| 6,446,061 B1 | 9/2002 | Doerre et al. | |
| 6,446,083 B1 | 9/2002 | Leight et al. | |
| 6,463,430 B1 | 10/2002 | Brady et al. | |
| 6,499,021 B1 | 12/2002 | Abu-Hakima | |
| 6,609,091 B1 | 8/2003 | Budzinski | |
| 6,665,658 B1 | 12/2003 | DaCosta et al. | |
| 6,675,159 B1 | 1/2004 | Lin et al. | |
| 6,675,205 B2 | 1/2004 | Meadway et al. | |
| 6,684,201 B1 | 1/2004 | Brill | |
| 6,778,970 B2 | 8/2004 | Au | |
| 6,778,975 B1 | 8/2004 | Anick et al. | |
| 6,826,568 B2 | 11/2004 | Bernstein et al. | |
| 6,871,199 B1 | 3/2005 | Binnig et al. | |
| 6,931,397 B1 | 8/2005 | Sundaresan | |
| 7,152,031 B1 | 12/2006 | Jensen et al. | |
| 7,493,333 B2 | 2/2009 | Hill et al. | |
| 7,689,629 B1 | 3/2010 | Baatz et al. | |
| 2002/0059289 A1 | 5/2002 | Wenegrat et al. | |
| 2002/0133347 A1 | 9/2002 | Schoneburg et al. | |
| 2003/0028367 A1 | 2/2003 | Chalabi | |
| 2003/0037073 A1 | 2/2003 | Tokuda et al. | |
| 2003/0041047 A1 | 2/2003 | Chang et al. | |
| 2003/0167276 A1 | 9/2003 | Simpson et al. | |
| 2003/0217052 A1 | 11/2003 | Rubenczyk et al. | |
| 2004/0117352 A1 | 6/2004 | Schabes et al. | |
| 2004/0267709 A1 | 12/2004 | Ji et al. | |
| 2005/0065773 A1 | 3/2005 | Huang et al. | |
| 2005/0108001 A1 | 5/2005 | Aarskog | |
| 2005/0149510 A1 | 7/2005 | Shafrir | |
| 2005/0210009 A1 | 9/2005 | Tran | |
| 2006/0179074 A1 | 8/2006 | Martin et al. | |
| 2006/0235689 A1 | 10/2006 | Sugihara et al. | |
| 2007/0250497 A1 | 10/2007 | Mansfield et al. | |

FOREIGN PATENT DOCUMENTS

| | | |
|---|---|---|
| EP | 1612704 | 1/2006 |
| GB | 2302188 | 1/1997 |
| WO | 2004029827 | 4/2004 |
| WO | 2004090674 | 10/2004 |
| WO | 2005050513 | 6/2005 |

OTHER PUBLICATIONS

OA dated Oct. 19, 2010 for U.S. Appl. No. 11/806,261, 19 pages.

OA dated Jan. 26, 2010 U.S. Appl. No. 11/866,901, 40 pages.

OA dated Jan. 4, 2010 for U.S. Appl. No. 11/806,261, 37 pages.

Aho et al., "Data Structures and Algorithms", Addison-Wesley, Copyright 1983; pp. 107-151, 163-169, and 246-250.

Anick,P.G. "Integrating Natural Language Processing and Information Retrieval in a Troubleshooting Help Desk" IEEE, Dec. 1993.

Bellegarda,J.R. A Multispan Language Modeling Framework for Large Vocabulary Speech recognition. IEEE, Sep. 1998.

Chan,S.W.K. et al. "Symbolic Connectionism in Natural Language Disambiguation" IEEE Trans. on Neural Networks, vol. 9, No. 5, Sep. 1998.

Kiyoki, Y. "A Fast Algorithm of Semantic Associative Search for Databases and Knowledge Bases" Information Modelling and Knowledge Bases, VIII. IOS Press, 1996.

Kruse "Data Structures and Programming Design", Prentice Hall, Copyright 1984; pp. 40-83, 93-100 and 377-382.

Mariani, J. "Recent Advances in Speech Processing" IEEE, 1989, pp. 429-440.

Proceedings of the 17th Annual Meeting on Association for Computational Linguistics, 1979. Conference Research on Computational Linguistics, Taiwan, 1997.

Rabiner,L.R. "Applications of Speech Recognition in the Area of Telecommunications" IEEE, 1997.

Rada, R. et al. "Devolopment and Application of a Metric on Semantic Nets" IEEE, 1989.

Shapiro "Generalized Augmented Transition Network Grammars for Generation from Semantic Networks", ACM Proceedings of the 17th Annual Meeting on Association for Computational Linguistics, 1979.

Proceedings of ROCKLING X (1997) International Conference Research on Computational Linguistics, Taiwan, 1997, 11 pages, last accessed on Oct. 7, 2009.

Response to Office Action of Jan. 10, 2008, in U.S. Appl. No. 11/503,898, pp. 1-20.

Response to Office Action of Jan. 11, 2008, in U.S. Appl. No. 11/503,906, pp. 1-23.

Notice of Allowance issued in U.S. Appl. No. 11/503,898 on Dec. 23,2008,IO pages.

Notice of Allowance issued in U.S. Appl. No. 11/503,906 on Jan. 9, 2009, 11 pages.

Official Action dated Jan. 11, 2008 issued in U.S. Appl. No. 11/503,906, 23 pages.

Official Action dated Jan. 10, 2008 in U.S. Appl. No. 11/503,898, 20 pages.

Official Action dated Apr. 18, 2007 issued in U.S. Appl. No. 10/329,402, 19 pages.

Official Action dated Aug. 14, 2008 issued in U.S. Appl. No. 11/503,898, 20 pages.

Official Action dated Aug. 15, 2008 issued in U.S. Appl. No. 11/503,906, 24 pages.

Official Action dated Jan. 10, 2008 in U.S. Appl. No. 11/503,900, 21 pages.

Official Action dated Jan. 11, 2008 in U.S. Appl. No. 11/503,938, 22 pages.

Official Action dated Jan. 11, 2008 in U.S. Appl. No. 11/503,901, 22 pages.

Official Action dated Jan. 11, 2008 in U.S. Appl. No. 11/503,902, 20 pages.

Official Action dated Jan. 22, 2009 in U.S. Appl. No. 10/329,402, 2 pages.

Official Action dated Jul. 28, 2008 issued in U.S. Appl. No. 10/329,402, 4 pages.

Official Action dated Oct. 26, 2005 issued in U.S. Appl. No. 10/329,402, 16 pages.
Official Action dated Oct. 6, 2006 issued in U.S. Appl. No. 10/329,402, 17 pages.
Response to Official Action dated Apr. 18, 2007 filed in U.S. Appl. No. 10/329,402, filed Oct. 18, 2007, 10 pgs.
Response to Official Action dated Aug. 14, 2008 filed in U.S. Appl. No. 11/503,898, 12 pages filed Dec. 15, 2008.
Response to Official Action dated Aug. 15, 2008 filed in U.S. Appl. No. 11/503,906, 14 pages filed Dec. 15, 2008.
Response to Official Action dated Dec. 26, 2007 filed in U.S. Appl. No. 10/329,402, filed Apr. 28, 2008, 10 pgs.
Response to Official Action dated Jan. 10, 2008 filed in U.S. Appl. No. 11/503,898, 20 pages, filed Jun. 10, 2008.
Response to Official Action dated Jan. 11, 2008 filed in U.S. Appl. No. 11/503,906, filed Jun. 10, 2008, 23 pgs.
Response to Official Action dated Jan. 22, 2009 in U.S. Appl. No. 10/329,402, 4 pages filed Mar. 23, 2009.
Response to Official Action dated Jul. 28, 2008 filed in U.S. Appl. No. 10/329,402, 3 pages filed Oct. 24, 2008.
Response to Official Action dated Jun. 19, 2006 filed in U.S. Appl. No. 10/329,402, filed Jun. 29, 2006, 9 pages.
Response to Official Action dated Oct. 26, 2005 filed in U.S. Appl. No. 10/329,402, filed Mar. 24, 2006, 21 pgs.
Response to Official Action dated Oct. 6, 2006 filed in U.S. Appl. No. 10/329,402, filed Feb. 2, 2007, 13 pgs.
CN OA issued Jan. 19, 2011 for Chinese Patent Application No. 200780043235.7, 8 pages.
KR OA issued Jan. 14, 2011 for Korean Patent Application No. 2009-7009292, 3 pages.
OA dated Mar. 2, 2011 for U.S. Appl. No. 11/866,901, 27 pages.
OA dated Feb. 17, 2011 for U.S. Appl. No. 11/806,261, 23 pages.
Non Final Office Action dated Sep. 15, 2010 for U.S. Appl. No. 11/806,260, 48 pages.
Non Final Office Action dated Jul. 22, 2010 for U.S. Appl. No. 11/866,901, 23 pages.
OA dated Apr. 28, 2011 for U.S. Appl. No. 11/806,260, 40 pages.
OA dated May 13, 2011 for U.S. Appl. No. 12/577,160, 43 pages.
OA dated Aug. 16, 2011 for U.S. Appl. No. 11/866901, 28 pages.
OA dated Aug. 4, 2011 for U.S. Appl. No. 11/806,261, 28 pages.
OA dated Jun. 29, 2011 for U.S. Appl. No. 12/715,968, 51 pages.
OA dated Dec. 13, 2011 for U.S. Appl. No. 12/715,968, 24 pages.

\* cited by examiner

SQL Query for *'fascinating art not ugly'* select art.num,
art.artDescription
from art,
artAdjective
where art.artAdjectiveNum = artAdjective.num
and artAdjective.adjective = 'fascinating'
and artAdjectiveNum not in
(select distinct num from artAdjective where adjective = 'ugly')

---

Relational Data Base Engine artAdjective table

| num | adjective |
|---|---|
| 10 | strange |
| 10 | desirable |
| 20 | charming |
| 20 | edible |
| 20 | desirable |
| 20 | fascinating |
| 30 | desirable |
| 30 | fascinating |
| 30 | stained glass |
| 30 | lead |
| *30* | *ugly* |

*relation - a* adjective table

| adjective |
|---|
| ugly |
| undesirable |
| strange |
| fascinating |
| charming |
| edible |
| stained glass |
| lead |

*relation - b* art table

| num | artAdjectiveNum | artDescription |
|---|---|---|
| 1 | 10 | dancers made of children's blocks |
| 2 | 20 | delicate figurines of pasta |
| 3 | 30 | *stained glass statues of people* |

---

Query Output

| num | artDescription |
|---|---|
| 2 | delicate figurines of pasta |

FIG. 8

Image Processing Of Face Expressions (PRIOR ART)

| step 1 | step 2 | step 3 | step 4 |
|---|---|---|---|
| input image of face | trace mouth contours | identify mouth shape | identify face expression |
|  |  | curving up | happy face |
|  |  | curving down | sad face |
|  |  | straight | quizzzical face |
|  |  | compressed | angry face |

FIG. 9

Sound Processing Of Phonemes (PRIOR ART)

| step 1 | step 2 | step 3 | step 4 |
|---|---|---|---|
| input sounds by amplitude over time | fast Fourier transform to map vibrational frequency bands over time | identify phonemes as transitions of frequency bands | identify words as transitions of phonemes |
| 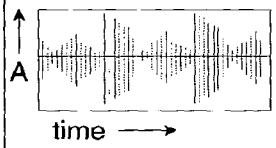 | 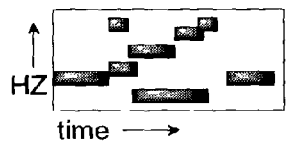 | 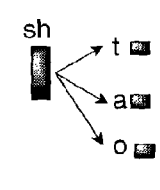 | 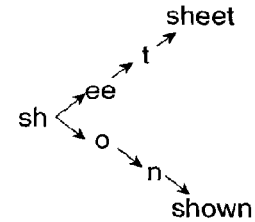 |

FIG. 10

Stage Filters

| stage: | filter type: | filter accepts these kinds of nodes: |
|---|---|---|
| start | traversal type filter | nodes describing semantic network traversal methods |
| start | category node filter | nodes which are adjectives or adverbs |
| start | context type filter | nodes which are prepositions, e.g. 'and', 'or' and 'not' |
| start | context node filter | nodes which are nouns or verbs |
| middle | category node filter | nodes which are topics of conversation |
| middle | context node filter | nodes already identified in conversation |

FIG. 13

Topology Traversal Methods

| topology type: | method traverses semantic network: |
|---|---|
| category hierarchy | inherited is-links |
| general hierarchy | any inherited links |
| part-of hierarchy | inherited part-of links |
| enclosing hierarchy | encloses-is-a-links |
| list of nodes | category list |

FIG. 14

Best Contextual Distance Functions

| context type: | best contextual distance function: |
|---|---|
| and | minimum average distance |
| and equivalent | minimum average distance, not counting is-a links |
| or | minimum distance |
| not | maximum average distance |
| absolutely not | infinite minimum distance |
| pronoun | minimum average distance |

FIG. 15

Dialog To Create and Retrieve Semantic Network Information

My friend Hal was a programmer.
His number is (402) 287-0101
His address is 404 Fesser Street in Detroit.
He is a good trumpet player.

*( later )*

Who is a good musician friend?
programmer Hal.

FIG. 42

Inversion Method To Create New IS-A links step 1
scan semantic network for parse trees inheriting from 'inversion' node step 2
link parse tree subject node via is-a links to inherit copy of predicate inheriting inversion type, such as was (or untagged for default type 'is')

step 3
delete redundant verb, predicate subject of parse tree

FIG. 43

| input node types: | allowable links: | traversal starting point: |
|---|---|---|
| question | inheritor is-links | direct inheriteds of inheriteds |
| noun | inheritor is-links | input node inherited nodes |
| adjective | any inheritor links | input node inherited nodes |
| pronoun | inheritor is-links | input node inherited nodes |
| verb | none | none |
| adverb | any inheritor links | input node inherited nodes | step 1
scan input phrase tree to check for a node inheriting from question node:

Who:2 - *yes*
is:5 - *no*
a:4 - *no*
good:4 - *no*
musician:2 - *no*
friend:3 - *no*

↓ yes step 2
for the set of nodes associated to input tree, traverse allowable links from traversal starting point to find the closest node in common which is not a node in the input tree:

1) Who:1 *(since this is a question node, start one above and traverse only is-a links)*
    Who:1 - pronoun - His:1 - His:2
    Who:1 - person - programmer:1 - programmer:2 - Hal:2
    Who:1 - person - friend:1 - friend:2 - Hal:2
    Who:1 - person - noun - *(and all nouns farther)*

2) is:5 *(since this is a verb node, do not traverse links)*

3) a:4 *(since this is a verb node, do not traverse links)*

4) good:1 -*(since this is an adjective node, traverse all links)*
    good:1 - good:3 - trumpet:3 - player:3 - Hal:2 -
      His:2 - number:2 - is:3 - (402)287-1010
    good:1 - good:3 - trumpet:3 - player:3 - Hal:2 -
      His:2 - address:2 - is:3 - 404 Fesser Street - in:2 - Detroit 5) musician:1 - *(since a noun, traverse only is-a links)*
    musician:1 - player:1 - player:3 - Hal:2

6) friend:1 - friend:2 - Hal:2
    friend:1 - Ann:2 step 3
reply to question by describing nodes tied for closest node in common which is not a node in the input tree: Hal:2 can be described as "My friend Hal" or "programmer Hal" whichever is closest to conversational context.

FIG. 54

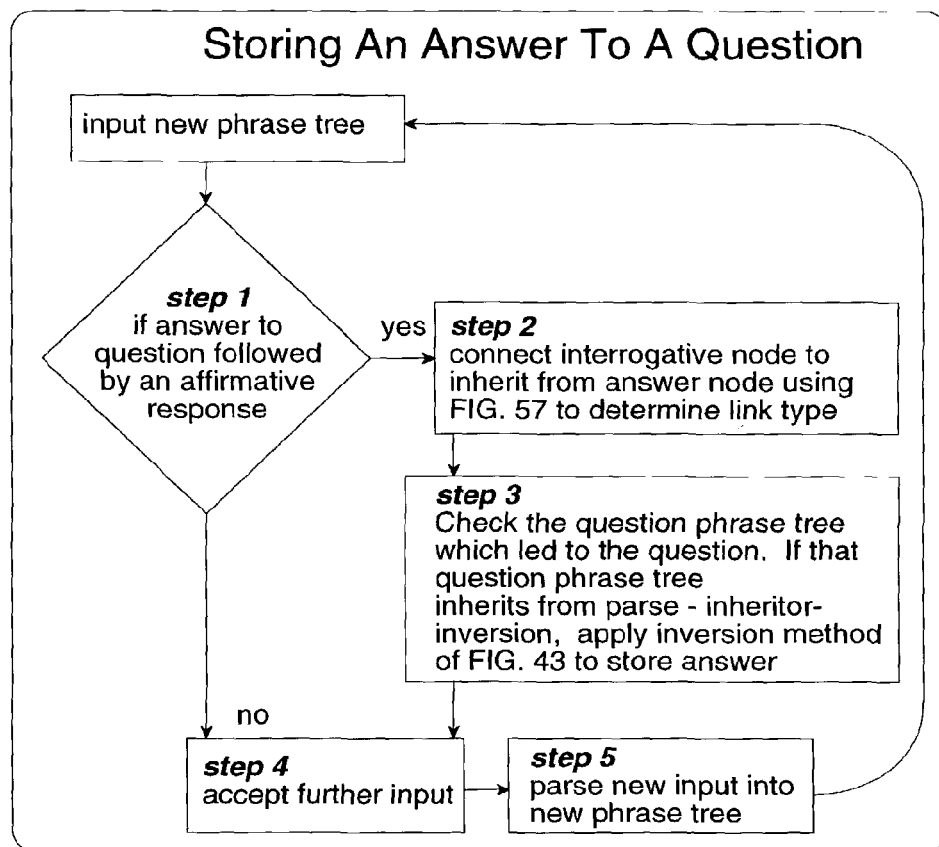

SYSTEMS AND METHODS TO INCREASE EFFICIENCY IN SEMANTIC NETWORKS TO DISAMBIGUATE NATURAL LANGUAGE MEANING

CROSS REFERENCE TO RELATED APPLICATIONS

This application is a Divisional of U.S. patent application Ser. No. 10/329,402 filed Dec. 27, 2002, which is a continuation-in-part of U.S. patent application Ser. No. 09/085,830 filed May 28, 1998, issued U.S. Pat. No. 6,778,970 on Aug. 17, 2004 and claims priority to U.S. Provisional Application 60/342,360 filed Dec. 27, 2001, each of which are hereby incorporated by reference. Topological methods described in Ser. No. 09/085,830 traverse semantic networks in ways useful for computer-implemented natural language processing, including methods for constraining search to intersections of semantic categories.

BACKGROUND OF THE INVENTION

Examples of natural language forms include written and spoken words, gestures and face expressions which clarify the meaning of words, intonation patterns indicating whether a sentence is a question, and other auditory and visual contextual aids for conveying meaning. Each of these forms may convey multiple meanings which may appear ambiguous when forms occur out of context. For instance, there are many dictionary meanings of the word 'dash', such as a race or a small amount of seasoning. Since multiple meanings for words are so common, lexicographers refer to a single word's diversity of meanings as polysemy. To disambiguate polysemy, all the of the above natural language forms must be correlated in order to infer the context which identified specific meaning from a list of polysemous potential meanings.

The prior art detects such inputs on a piecemeal basis, but to provide a comprehensive user interface for computer systems, all of the above inputs must be correlated, as efficiently as a person can correlate them. However, the prior art has failed to correlate even a fraction of such inputs as efficiently as people do. As a result, designers of natural language processing systems have greatly restricted the range of conversation recognized by natural language processing, to increase accuracy at the expense of flexibility.

Thus prior art computer systems correlate small ranges of natural language inputs, but the vast majority of inputs that a human could easily correlate remain useless to such systems. For instance, a raised eyebrow can indicate a question and a smile may indicate agreement, and a wave of a hand might indicate dismissal or indicate of a change in subject. All of these gestures are useful and meaningful for people, but the prior art cannot reliably correlate simple gestures with other inputs such as spoken or written words.

The inability of computer systems to correlate a wide variety of inputs has hampered the ability of computers to participate in conversations with people. In particular, this inability to correlate prevents computers from recognizing important contextual shades of meaning which are needed for parsing natural language. In human conversation, contexts shift fluidly and dramatically to constrain the meaning of gestures and other symbols which can have varying meanings depending on precise context. For instance, the word 'dash' can mean at least four different nouns and three different verbs: dash as in a small quantity mixed into something (a dash of salt), dash as in a race (a fifty yard dash), dash as in car dashboard, dash as in a Morse Code (a signal longer that a dot), dash as in to mix together, dash as in to ruin something (dash hopes), dash as in to move quickly. For clarity, more meanings for dash may be needed and added later to a natural language processing system. For instance, dash as in to splatter, or dash as in a short sudden movement.

Prior art uses grammar or statistics to disambiguate polysemy. Prior art using a grammar analysis to choose the correct meaning of 'dash' based in grammar can only determine whether a noun or verb meaning is best. Such a system would not disambiguate whether dash means a Morse code or a small quantity of something. Prior art using statistics of usage can only choose a meaning which was chosen most of the time in a context. Thus statistical methods disable any other meanings and prevent the acquisition of new meanings for a symbol within any context.

Human linguistic abilities are clearly less limited, in addition to being more accurate than prior art. Besides acquiring new meanings for words within a conversational context, humans also create new meaningful contexts through self-organizing linguistic abilities. For instance, as humans converse about subjects, subjects acquire new semantic meanings which evolve into new conversational contexts. In contrast, prior art computer systems only acquire new semantic contexts through laborious programming and data-entry efforts. The encumbrance of such programming and data-entry prevents prior art computer systems acquiring semantic knowledge on a real-time basis during natural language conversations with humans. Although a large number of programming languages have been created for inputting semantic knowledge, none of which have the flexibility and general utility of a natural language such as English. Languages such as Prolog, SQL or Lisp cannot match the convenience of conversing in plain English or other natural languages.

General computer-implemented methods to process natural language have been based in either logic, statistics, or topology. Logic has been the dominant method in the prior art. However, logical ambiguities inherent in natural language have foiled the prior art attempts which rely upon logic as a basis for processing natural language. For instance, one of the most important aspects of human conversation is called polysemy: the re-use of identical symbols to mean different things, depending upon context. For instance, the word run could mean a verb meaning to step quickly, but it could also mean the verb to campaign for office or to mean the noun for a small brook. In any specific conversation, run would signify just one of these meanings, unless a pun was intended, in which case run might signify two such meanings. By sensing natural language contexts to determine which polysemous meanings are most within context, humans recognize which meanings are signified.

Context is impractical to define logically because logic requires enumeration of logical inputs and outputs. The number of contexts which can be defined by a natural language input is limited only by every possible shade of meaning of every symbol which occurs in every possible natural language sentence. Since such a large number of combinations cannot be enumerated, logical natural language processors store a subset to the full set of possible contexts as a logical approximation: Each natural language symbol is stored with its own set of logical data, and with rules for combining its logical data with other symbols.

For instance, when the context is politics, to run would mean to campaign for office. However, many of these rules will break when a combination of contexts is pertinent. For instance, if the context is a political appointee who runs for elected office and also runs a government agency, the meaning of run remains logically ambiguous.

The larger the semantic system, the more frequently contextually defined semantic rules are broken. For vocabularies larger than ten thousand words the frequency of flaws from broken rules easily overwhelms the accuracy of a natural language processing system, as demonstrated by problems in the CYC project. Even when attempting to define a small static semantic dictionary, logical contradictions emerge during testing which cannot be resolved without creating a new logical category for each possible combination of symbols. The combinatorial complexity of language makes testing these categories generally impractical.

For a semantic dictionary of N symbols, in a language where the maximum number of symbols strung together is M, the number of logical combinations is N to the M power. For a vocabulary of 1,000 words combined in short four word sentences, the number of logical combinations is 1,000 raised to the fourth power, which equals 1,000,000,000,000. If a team lexicographers attempts to define and test a semantic dictionary of this small size there would be 100,000,000,000 testing hours required if each test takes $1/10^{th}$ of an hour. If 500 testers each work 2000 hours a year, the team can work 1,000,000 hours per year, and the testing will be complete in 100 years. By that time, the dictionary will surely be obsolete and require re-testing. For longer sentences and larger dictionaries, this drawback quickly grows exponentially worse.

Even worse, as phrases are used within new conversations, they immediately acquire new shades of meaning from these new conversations. A natural language processing system must track shifts in overall meaning of phrases to remain accurate. For instance, the meaning of a celebrity's name shifts as that name is used in major news reports, particularly if their frame is new. To logically represent such shifts in meaning, the rules describing how to combine a celebrity's name in various contexts must be extended to handle each new conversational use of the celebrity's name explicitly. Using logical methods, all possible combinations of phrases and contexts must be defined and tested.

Because the testing of logical methods is so impractical for large vocabularies, statistical methods have instead been dominant in natural language processing systems, particularly in speech recognition. In the prior art, statistical probability functions have been used to map from inputs to most likely contexts. Statistics, however, only apply to sets of previously occurring events.

All statistics require the collection of a set of prior events from which to calculate a statistical aggregate. For new events no such set exists and no statistical aggregate can be calculated. Unfortunately, natural language is full of new events, such as newly concatenated phrases, each having a unique contextual shade of meaning. For instance, a person might request "fascinating art—not ugly." A person would have no trouble combining the definitions of fascinating, art, not and ugly to make some sense of such a request, even if that person had never before heard the phrase 'fascinating art—not ugly.' A statistical natural language processing system, on the other hand, would have no statistical event set from which to disambiguate the meaning of a new combination of words such as 'fascinating art—not ugly.'

Another problem with statistics is that once an event set has been collected to describe the meanings for a symbol, statistical functions prefer frequently chosen meanings over rarely chosen meanings, rendering the system insensitive to new meanings conveyed by new events. Thus as statistical natural language systems acquire semantic knowledge, their ability to distinguish new information diminishes.

The above drawbacks can be avoided by topological methods for processing natural language.

SUMMARY OF THE INVENTION

The present invention is a computer implemented data processor system to automatically disambiguate a contextual meaning of natural language input streams of symbols, stored as new input stream nodes within a semantic network, whose various candidate meanings are stored as nodes in the semantic network, and whose natural language context is stored as a set of context nodes in the semantic network. By precisely measuring semantic distances in terms of semantic links when traversing between various candidate meanings and the set of context nodes, the present invention can automatically choose candidate nodes closest to the context node set to represent a contextual meaning of the input stream. To store this contextual meaning, the present invention can create new semantic inheritance links between the input stream nodes and the candidate nodes closest to the context nodes. These new links create precise records of contextual meaning to be stored for later retrieval by subsequent natural language queries. The present invention thus enables the semantic network to function as a natural language database by storing data as semantic network nodes, with all semantic categories needed for accurate natural language database design automatically created and linked entirely from natural language input streams. The present invention thus automatically provides precise storage and retrieval of detailed, intersecting levels of information, comparable to relational database storage and retrieval capability, without the labor cost and inconvenience of designing a database, to enable flexible and efficient natural language interfaces to computers, household appliances and hand-held devices. Additional advantages and novel features of the invention will be set forth in part in the description that follows, and in part will become more apparent to those skilled in the art upon examination of the following or upon learning by practice of the invention.

BRIEF DESCRIPTION OF THE DRAWINGS

FIG. 8 shows an example of an SQL database processing a query corresponding to the natural language request "fascinating art not ugly," in accordance with an embodiment of the present invention.

FIG. 9 shows a simple image processing method for identifying emotional content of face expressions by analyzing the contours of the mouth, in accordance with an embodiment of the present invention.

FIG. 10 show an overview of sound processing methods to identify words from sounds by analyzing phonemes comprised of transitions from one frequency bands to another, in accordance with an embodiment of the present invention.

FIG. 13 shows a table mapping from filter types of FIG. 12 to filter actions which screen out input nodes of FIG. 12, in accordance with an embodiment of the present invention.

FIG. 14 shows a table mapping from topological categorization input category types to their corresponding semantic network traversal functions, in accordance with an embodiment of the present invention.

FIG. 15 shows a table mapping from topological contextual filtering input context types to their corresponding best contextual distance functions, in accordance with an embodiment of the present invention.

FIG. 42 shows an example of a dialog between a person and natural language processor where the natural language processor remembers and retrieves dialog semantic information, in accordance with an embodiment of the present invention.

FIG. 43 shows an example of a method to create semantic is-a type dictionary links from parse phrase trees containing 'is' and 'a' phrasing, in accordance with an embodiment of the present invention.

FIG. 54 shows the method of FIG. 50 applied to answer the input phrase tree question in FIG. 53, in accordance with an embodiment of the present invention.

FIG. 55 shows an example of a dialog in which an answer to question has been answered affirmatively, indicating that the answer would be useful to store in a semantic network, in accordance with an embodiment of the present invention.

FIG. 56 shows an example of a method to stored the confirmed answer to a question, using the inversion method of FIG. 43, in accordance with an embodiment of the present invention.

FIG. 57 shows an example of a table of input phrase tree's input node types and corresponding connecting links used to connect interrogative nodes in step 2 of FIG. 56, in accordance with an embodiment of the present invention.

DETAILED DESCRIPTION OF THE INVENTION

Figure 1:
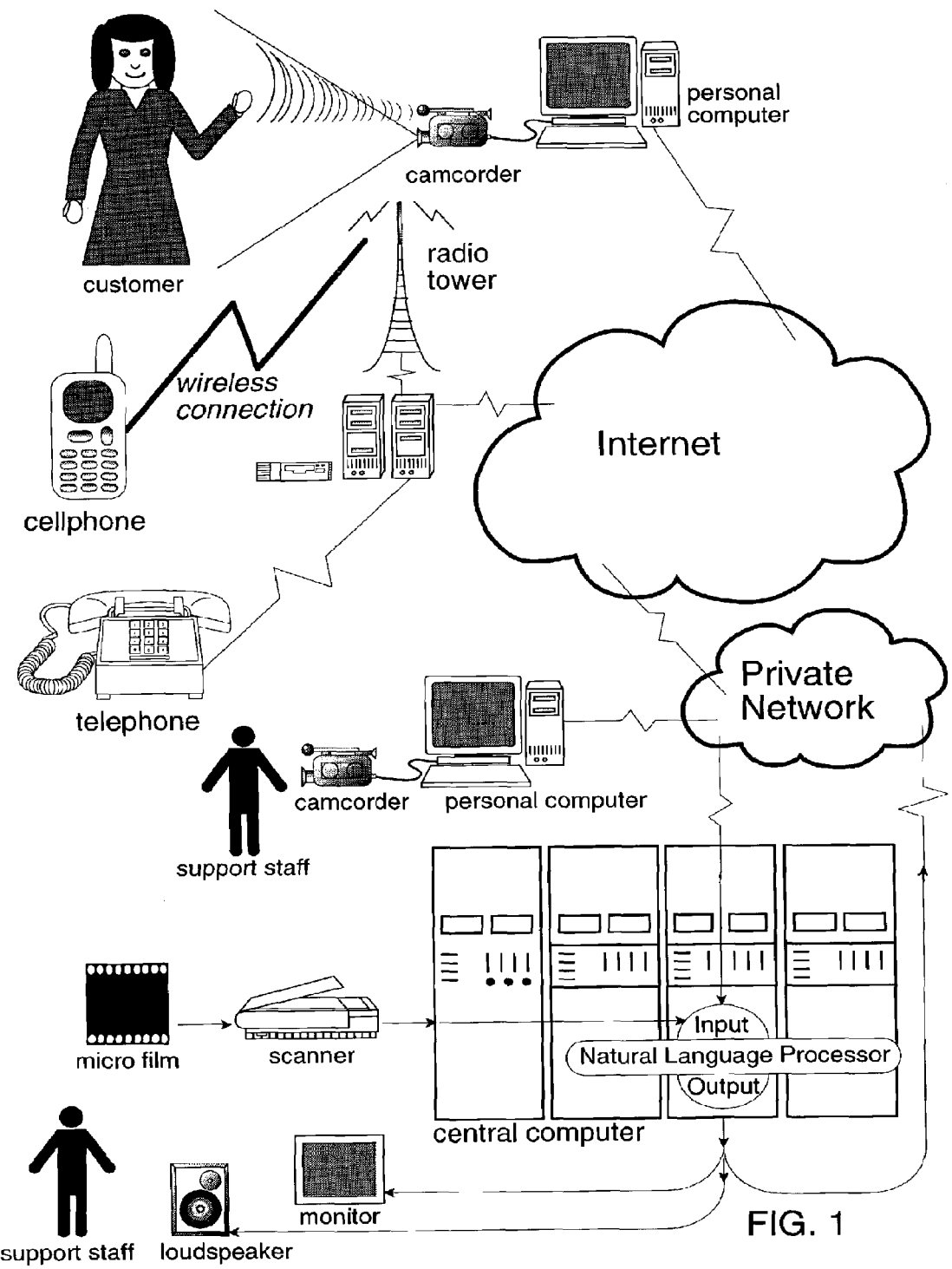
FIG. 1 shows a natural language processing system deployed on a central computer shared by a variety of customer support staff and remote customers connected by Internet connections, in accordance with an embodiment of the present invention.

In accordance with the present invention, topological methods disambiguate polysemy by measuring the relative distance between symbols in a semantic network. In a well constructed semantic network, the distance between symbols is proportional to the closeness in meaning between symbols. Consequently the contextual meaning of a symbol can be found by locating the closest symbol to a set of symbols defining the context. Both new symbols and new meanings can be recorded simply by adding new symbol nodes to existing topologies. Shifts in meaning can be recorded simply by shifts in topologies.

However, among others, two problems with topological methods, which have prevented them from succeeding in prior art, are overcome with the present invention. The first problem is that the topological distance between a pair of symbol nodes in a semantic network may not reflect closeness in semantic meaning between the pair of symbol nodes. This problem can be avoided by adjusting automatically adjusting distance between each pair of nodes to accurately reflect semantic meaning by regrouping, adding, and removing nodes. Relevant methods for automatically regrouping, adding and removing nodes are described in patent application Ser. No. 09/085,830 "topological methods to organize semantic network data flows for conversation applications."

The second problem with topological methods occurs when representing and disambiguating the meaning of negation. When seeking a candidate symbol in terms of being NOT some symbol 'A', some semantic path will generally connect the 'A' and candidate symbols. However, closeness of the 'A' to candidate symbols cannot represent closeness to desired meaning. Rather, it represents closeness to opposite meaning. Therefore, when seeking a candidate symbol which is NOT 'A', some other metric besides closeness must be applied to find appropriate candidate symbols.

For instance, a person might request 'fascinating art' from an information retrieval system. Using topological methods such as the method of 'most specific common abstraction'

(Kolodner, pages 346-347), a retrieval system could find nodes closest to 'fascinating art' by measuring semantic path distances from every candidate node to both 'fascinating' and 'art'. The retrieval system would return candidate nodes having minimal distance to both 'fascinating' and 'art'.

For requests containing negation, such a minimal distance function would not suffice. Similarly, requests containing other logical operators like 'or' as well as prepositions like 'from', 'to', and 'after' demand other logical-syntactic meanings beyond the capability of a simple minimal distance function to model.

For instance, simple distance functions have difficulty interpreting a request such as 'fascinating art that is not ugly' because of the complexity of possible negative connections between 'art' and 'ugly': malicious art, art that is harsh, art that is crude, art made from toxic substances. Any of these negative concepts connecting 'art' to 'ugly' might be considered when retrieving meaning corresponding to 'fascinating art that is not ugly'. Yet depending upon context, some of these negative concepts might be important and some might be irrelevant.

For instance, if the overall context of a request concerned environmental pollution, then art made from toxic substances would be a more important meaning of 'ugly' to avoid and others meanings might not matter. Because of the logical meaning imbedded in the word 'not', prior art logical methods have typically defined negative concepts for a particular context. For instance, prior art has typically contrived rules such that when the overall context of a request includes 'pollution' then 'ugly' signifies 'toxic substances'.

In prior art, logical methods employ sets of rules to identify sets of candidate nodes preferred for a given logical context, and other sets of rules to rank the set of candidate nodes for the given logical context. Prior art logical methods have been preferred for their processing speed and economy with storage space. However such advantages have lost relevance as computer processors has become faster and computer memory becomes cheaper. As outlined above, logic have cannot handle the combinatorial complexity of natural language when there are more than a thousand symbol nodes. In addition, logic cannot resolve contradictions in meaning which arise naturally in general-purpose natural language systems.

For example, a person might request 'fascinating art that is not ugly' from an information retrieval system. The system might find, categorized under art, a set of candidate nodes. For instance, there might be two such nodes. The first semantic node 'stained glass statues of people', might inherit from 'art', 'beautiful' and 'stained glass'. The second semantic node 'dancers made of children's blocks' might inherited from 'art' and 'strange'. To determine which of the two nodes is most fascinating and least ugly, a logical semantic processor would apply rules. A first such rule might be that inheritors of 'beautiful' are not ugly. A second such rule might be that toxic substances are ugly. Since 'stained glass' might inherit from 'lead' which in turn might inherit from 'toxic substance', the first rule might conflict with the second rule. To resolve such conflicts, semantic rules must be ranked to determine which rule about 'ugly' is more significant.

In the present invention, the relative distances between nodes are used in place of logic to resolve logical contradictions. By using sets nodes to define context, contexts can be defined with various degrees of focus. General contexts can be defined by a few high-level nodes, and specific, narrowly focused contexts can be defined by a large number of low level nodes. By minimizing distances to a large number of low level nodes in a narrowly focused context, logical contradictions can be resolved by topology recorded in the local neighborhood of that narrow context.

By contrast, in prior art, fuzzy logic algorithms were developed to locally resolve logical contradictions by using statistical functions. Since some things can be both beautiful and ugly, there is a probability that beautiful implies not ugly, and this is compared to the probability of the toxic quality of lead implies ugly. Although statistical functions can resolve logical contradictions between frequently competing candidate nodes, they cannot resolve logical contractions for new descriptions or old descriptions relative to new semantic nodes, because, as mentioned above, all statistics require a prior set of trial events upon to base a statistical distribution. If 'fascinating art that is not ugly' was a new request, there would be no events upon which to base a statistical distribution and statistical methods would be of no use. Even after recording an event set showing a preference for one instance of art over another, there would be no statistical method to relate that event set to a new node was added to the semantic net under the category of art, for instance a node representing 'charming figurines of edible pasta'.

In large-scale database applications, pure logic is still used to retrieve semantic information, even though logic cannot resolve the inconsistencies which naturally occur in large semantic systems. The simplicity of implementing logical operators such as AND, OR and NOT has supported their popularity when disambiguating simple data, particularly when such logical operations are nested in parenthesis to build a tree-structure of logical relationships. For instance, a natural language request 'fascinating art' can be recast as a logical request 'art AND fascinating'. This request might return candidate rows of data which could then be manually winnowed down by new request 'art AND fascinating AND (NOT ugly)' which would return a more focused set of candidate rows.

By compounding logical restrictions using relational table joining operators, relational databases enable large amounts of data to be searched quickly and efficiently. Although translating requests into the form of logical operators is laborious, and translating data into the form of logically correct statements is even more laborious, if an application contains a limited variety of data, the translation can be completed within a reasonable budget. However, as databases grow to become data warehouses, they require considerable manual intervention to maintain their logical consistency as new data is added. The budget for such maintenance can often become unaffordable. For large databases such as Internet web search engine portals, such maintenance costs run into millions of dollars.

For convenience and efficiency, it would be better to automatically store and retrieve information using natural language, bypassing the labor needed to translate requests into logical operators, bypassing the labor needed to translate data into logically correct statements and bypassing the cost of manually maintaining logical consistency. At the same time, because large natural languages contain paradoxical logical contradictions which must be resolved by choosing specific contextual shades of meaning, people need a system for storing criteria by which contextual shades of meaning can be disambiguated.

For instance, the adjective 'attractive' is commonly attributed to the noun phrase 'movie star'. However, some movie stars base their appeal upon a kind of fascination with unattractiveness, by playing villainous or anti-heroic roles. In such contexts, the meaning of attractive might have to be confined to a star's "ability to attract box-office sales". To remain accurate in such contexts, a natural language processor must efficiently store criteria for differentiating between the shades of meaning which might be attributed to the word 'attractive', even if these shades of meaning cannot be immediately mapped to a logical context.

Natural language processing systems must also disambiguate the meaning of requests containing logical prepositions. In such cases, logic must be combined with contextual semantic meanings to determine which noun phrase to link to a prepositional phrase. Thus the disambiguation of meaning of natural language logical prepositions requires a precise method for combining contextual shades of meaning which themselves may not be logically defined. When servicing natural language requests for specific information from large databases, it is especially important to accurately respond to the meaning of such prepositions. For instance, 'and' and 'or' as well as 'from', 'to', and 'after' are important prepositions used to zero in on specific information. However, the meaning of prepositions vary in subtle ways within natural language discourse.

The prior art uses rules and statistics can such prepositions, but only after drastically limiting the scope of input. To handle the full complete meaning of natural language, computer-implemented natural language processors require better methods to disambiguate prepositional contextual shades of meaning.

Because of the above difficulties in dealing with prepositional contextual shades of meaning, there are a number of commercial uses for such improved methods of detecting prepositional contextual shades of meaning. For example, database languages which store and retrieve information could be bypassed in favor of direct natural language user interfaces for storing and retrieving information.

For instance, Structured Query Language (SQL) was developed to manipulate sets of data using compounded formal logic. The success of SQL attests to the ability of logic to retrieve massive data sets. However, SQL has drawbacks when handling complex data relations. Since SQL databases require that each data relation be explicitly queried by a logical expression selecting logically validated data, both the queries and the validated data require considerable expertise to create. Typically, a data base specification and a process for acquiring and validating data must be created before actual use of a database. Because of the semantic limitations of SQL, both specification and data acquisition are typically specified by a natural language, such as English. In addition, during the maintenance phase of a database, bug fixes and corrections for bad data are also typically specified in a natural language.

Since natural language typically specifies database implementation efforts throughout the life of a database, database implementation would be cheaper, faster and more accurate if databases used natural language constructs to store and retrieve information directly, rather than translating natural language specifications into logical data relations. To store and retrieve information natively in English via natural language processing methods would eliminate expenses of translating English to a database language such as SQL. However, the prior natural language processing methods have lacked the precision of SQL when retrieving requests containing prepositional meaning. SQL can easily handle logical preposition requests by selecting rows from specific tables using constraints on specific values of columns of those rows. The prior natural language processing methods do not have a similarly succinct method for responding to the precise prepositional meaning of a request.

Although natural languages such as English are perfectly capable of conveying prepositional meaning to the average person, the prior natural language processing methods have not been able to accurately process requests containing logical prepositions.

Methods for improved detection of contextual and prepositional meaning in natural language processing systems would enable a broad range of applications where a user interface on a direct human conversation level would be preferred to a menu-based or graphical user interface.

For instance, help desk services handle a large volume of customer requests. Such requests must often by handled by a human dispatcher for a significant cost on labor, or an automated menu-driven voice-response system which is inexpensive but difficult for customers to interact with a user interface on a direct human conversation level would be preferred to voice-response systems which force customers to navigate a menu tree.

Simple appliances such as washing machines and microwave ovens could also benefit from imbedded natural language processors to accept direct conversational commands. More complex appliances such as cellphones could have imbedded natural language systems to complement or even supplant menu-driven screen displays.

However, none of these desirable natural language processing applications can succeed without flexible and precise methods for detecting contextual variations in prepositional meaning.

Topological methods for semantic networks measure distances between nodes by counting the number of links along paths between nodes. In order for these distances to be meaningful, the number of links along paths between nodes must correspond to actual closeness of semantic meanings. U.S. patent application Ser. No. 09/085,830 by Au describes methods for enforcing such correspondence. Enforcing such correspondence ensures that topological distances are a reliable indicator of closeness of meaning between any two semantic network nodes.

A semantic network representing closeness in meaning as distances records the closeness in meaning for any two nodes in the semantic network. At the same time, each path through the semantic network records a picture of why two nodes are a particular distance. For instance, in a small hierarchy of nodes in which retriever, beagle and puppy inherit from dog, the path from retriever to retriever to beagle has to two links. If dog in turn inherits directly from mammal, then retriever, beagle and puppy are each two links away from mammal. The inheritance links attached to dog are thus in turn inherited by retriever, beagle and puppy, thus automatically recording any closeness in meaning added to dog on behalf of retriever, beagle and puppy. This transitivity of closeness in distance models the human ability to quickly associate new information with existing symbolic relationships. For instance, if a new link were to make dog inherit directly from pet, then retriever, beagle and puppy would also inherit from pet, each at a distance of only two links. This redundancy of links in a semantic network provides accuracy when disambiguating meaning.

For instance, the word retriever could be linked to inherit from another meaning for retriever which has a more abstract meaning, that of something which fetches an object. A sentence of "A database as a better retriever of information than a card catalog," refers to the more abstract meaning of retriever. On the other hand, the sentence "My golden retriever is a puppy," would refer to the more concrete meaning of retriever which inherits from dog. By using a semantic network to measure the average distance to other words in a sentence, the shorter distance between meanings can be used to disambiguate meaning. For instance, for the second sentence, the distance between puppy and the concrete meaning of retriever is only two links, whereas the abstract meaning of retriever is three links away. For the second sentence, the more concrete meaning of retriever would thus be chosen. Since a sentence is made of multiple words, each word in a sentence relates to a set of paths through a semantic network. By choosing the shortest paths from that set, the multiple words in a sentence can be used as a redundant pointers to the most appropriate meaning of each word in the sentence. This semantic redundancy models the human ability to ignore noise and grammatical errors in natural language discourse.

Since the number of links along paths between nodes is a positive number, distances between nodes are also positive numbers; there are no negative distances. Some prior art semantic networks contain negation links to represent negative connections between ideas. By combining negation links with non-negation links, some prior art logical rules estimate the degree to which nodes are negations of each other, but such rules are not reliable for general-purpose semantic networks where degrees of negation varies by context. There are additional problems with prior art: many paths will contain two or more negation links. The meaning of paths containing two or more negation links varies from context to context, and as noted above, natural language contains too many contexts to model logically.

To accurately store and retrieve negation concepts, the present invention stores and retrieves the meaning of negation as the relative absence of a close connection. The absence of a close connection is computed relative to a contextual set of nodes. Thus the problem of how to consistently represent negation is solved by measuring relative distances within a context. As described by U.S. patent application Ser. No. 09/085,830 by Au, traversal functions for traversing between nodes can be used to constrain search to a requested category. Such topological methods can identify a node closest to a particular context, even if that context is a combination of many individual nodes. For contexts composed of multiple nodes, the average or minimum distance to the set of nodes can be used to measure closeness.

The present invention combines topological methods for categorization with topological methods for contextual filtering, to disambiguate the meaning of negated symbols, as well as symbols relative to other prepositions such as 'and' and 'or'. By constraining contextual searches to specific categories, precise logical relationships implied by semantic networks can be accurately detected. Thus the precise logical functionality of database languages such as SQL can be provided by the present invention while eliminating the cost of maintaining data-relationships and queries by hand.

With an accurate basis for storing and retrieving semantic network information according to logical prepositions, semantic networks can be used in place of relational databases, to bypass the tedious and error-prone process of translating natural language data into data relations. In addition, fine shades of contextual meaning can be automatically stored for each phrase-context pair without explicitly defining a relational join for each phrase-context pair.

Another advantage of using a natively natural language database comes from the elegance with which new meanings can be stored directly as parse trees of conversational input. Even while parsing a conversational flow of natural language, new shades of semantic meaning can be stored. Phrases encountered in the beginning of a paragraph can be stored as new shades of meaning which help disambiguate the meaning of phrases encountered later in a conversation. The present invention also contains methods to transform meanings encoded as parse trees into standard semantic inheritance trees, thus automatically updating shades of meaning during conversational input with a user.

This ability to update shades of meaning helps greatly when processing explanatory dialog, defined as texts in which terms are introduced early in the dialog and later used as building blocks of meaning later in the dialog.

The present invention improves computer-implemented natural languages processors, so that they can be used as user interfaces to a variety of commercial applications. FIG. 1 shows a fully networked support system for customer support, in which various supporting activities are coordinated by a natural language processor in a shared central computer, in accordance with one embodiment of the present invention.

At the top of FIG. 1 is a customer, shown on the left, interfacing through a camcorder (or web-cam) to a networked personal computer. In this manner, a customer's image and verbal requests can be relayed across the Internet to a private network, shown at the middle of FIG. 1. Other customers may input verbal request over devices such as the cellphone and telephone shown in FIG. 1.

When requests reach the private network, they could be monitored and handled by support staff, also equipped with camcorder (or web-cam) to assist customers over a kind of a video-phone connection. Alternatively, requests might be dispatched to the appropriate support staff by a natural language processor, as shown in FIG. 1. Supporting functions which may be orchestrated by a natural language processor as shown in FIG. 1 include scanning of archives, stored in micro film and requesting attention from operators of archives (all shown in the lower left of FIG. 1). Archives may include email messages which can be scanned in terms of their natural language meaning, to correlate previous current requests with previous requests and responses. For instance, requests for explanation of bills may be correlated to billing records and emails described returned merchandise. Alternatively, requests for news clippings could be correlated with previous requests for specific kinds of news of interest and requests to ignore other kinds of news. Other applications include matching of open job descriptions to resumes and matching of email messages to topics requested by email list subscribers, and indexing of email archives by topic. A natural language processor to orchestrate all of these functions could greatly increase the efficiency of customer service for the above businesses.

Figure 2:
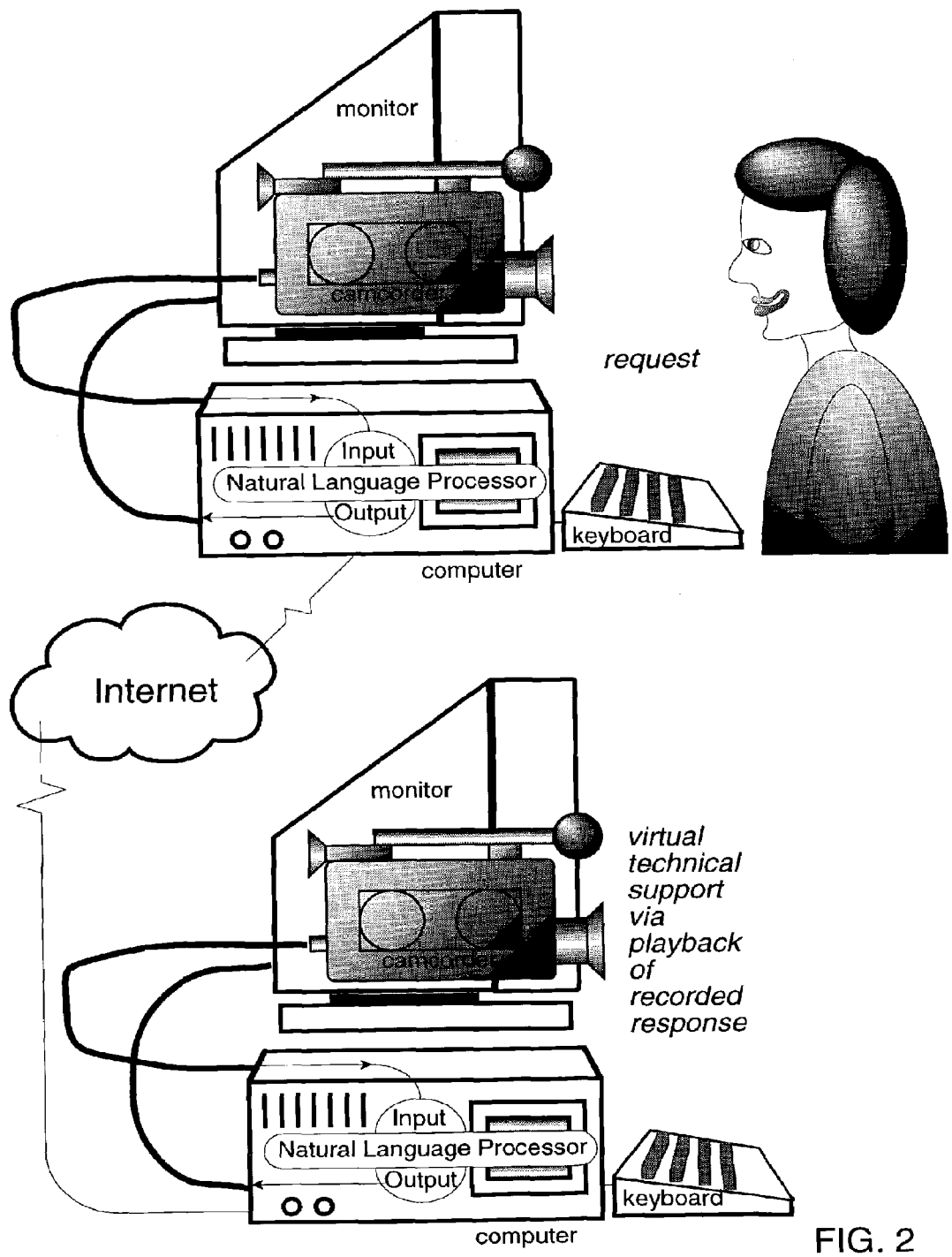
FIG. 2 shows a natural language processing system deployed on computers connected by peer-to-peer Internet connections, to provide technical support to customers, in accordance with an embodiment of the present invention.

FIG. 2 shows a natural language processing system deployed on computers connected by peer-to-peer Internet connections, to provide technical support to customers, in accordance with one embodiment of the present invention. To bypass automated-support user interfaces such as graphical user interfaces and menu-driven interfaces, a conversational natural language interface can be supported by a natural language processor in each computer, to exchange semantic information across the Internet as shown. To provide audio and visual linguistic input to the natural language processor in the upper computer, a camcorder (or web-cam) is shown. To provide similar audio and linguistic input back to the user shown in the upper half of FIG. 2, a camcorder (or web-cam) is used to store pre-recorded images and sounds for playback as orchestrated by the natural language processor in the lower computer. Alternatively, the images and sounds sent back to the user can be synthesized by either the lower or upper computer as needed. Peer-to-peer natural language computer systems with these configurations could be useful ways to interactively share and disseminate information that otherwise would have to be interactively disseminated in more labor-intensive lectures, workshops and video-conference sessions.

Figure 3:
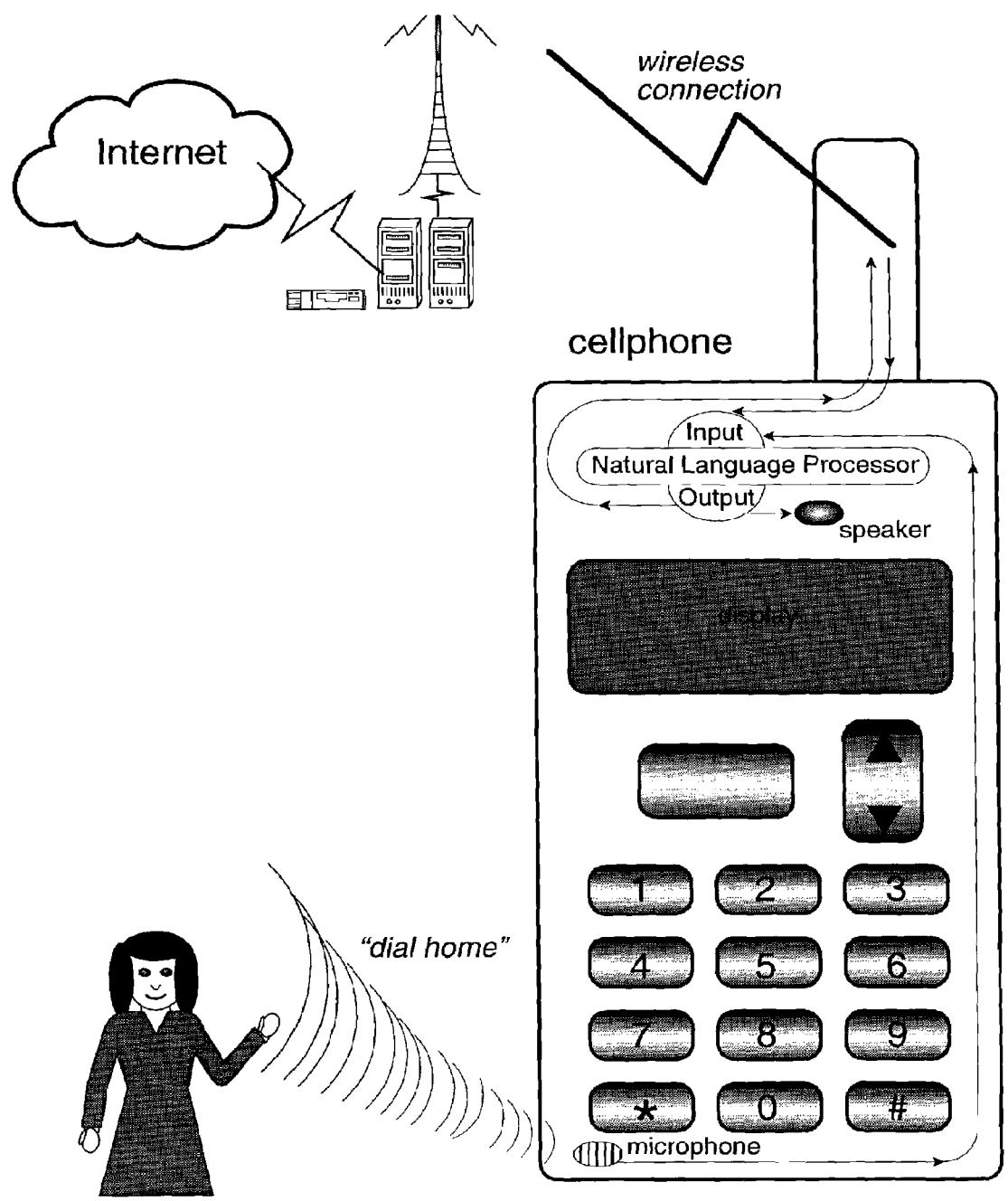
FIG. 3 shows a natural language processing system deployed on a cellphone connected to the Internet, to provide a natural language user interface for dialing, storing and retrieving names, phone numbers from personal address book information, in accordance with an embodiment of the present invention.

FIG. 3 shows a natural language processing system deployed on a cellphone connected to the Internet, to provide a natural language user interface for dialing, storing and retrieving names, phone numbers from personal address book information, in accordance with one embodiment of the present invention. Such a systems would be capable of searching, downloading and uploading information on the Internet, as well as monitoring the progress of requests to buy, sell, or inquire about merchandise or services on the Internet. Using a natural language interface bypasses the difficulty in learning menu-driven and graphical user interfaces for such activities.

Figure 4:
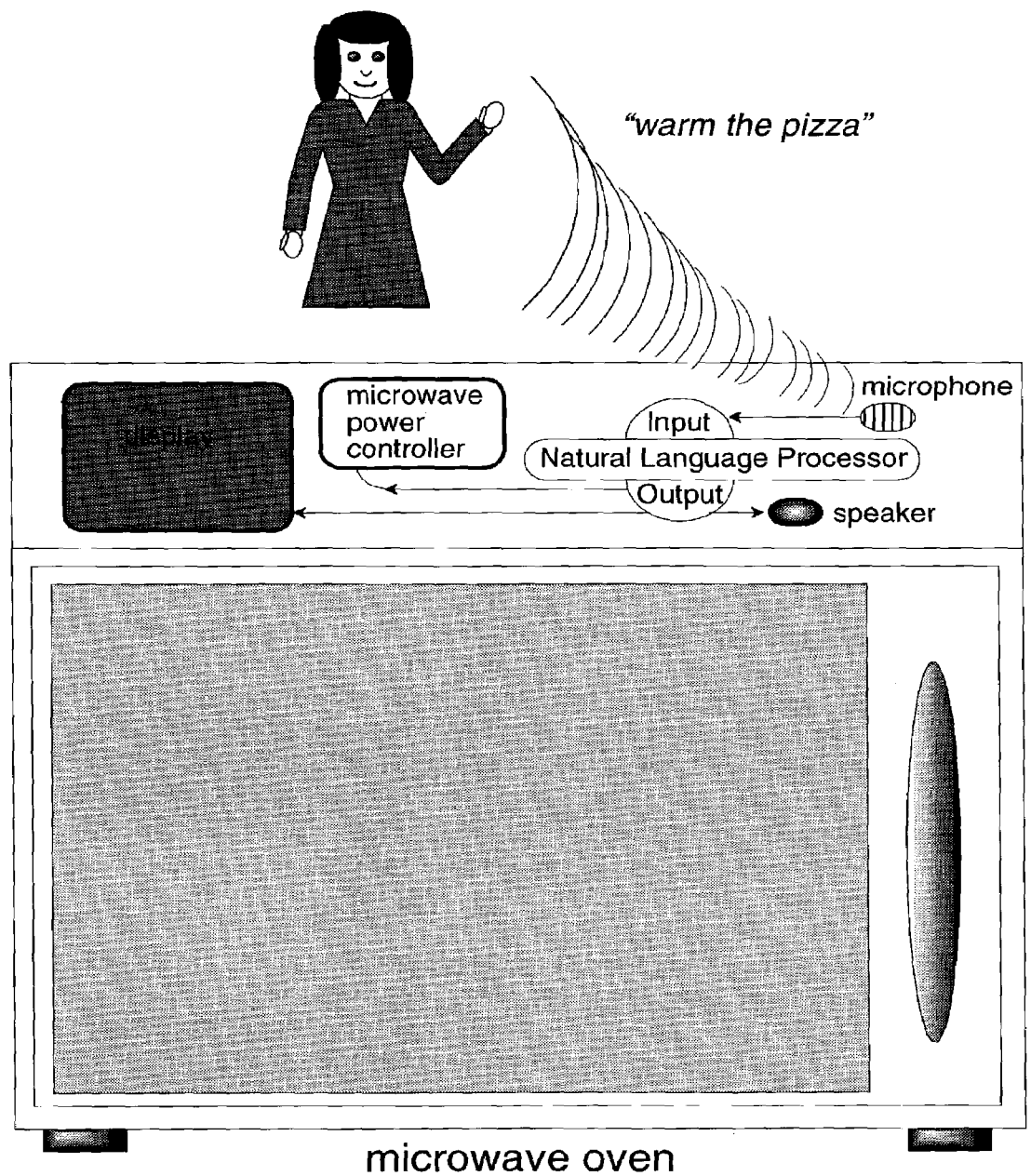
FIG. 4 shows a natural language processing system deployed on a microwave oven home appliance, to provide a natural language user interface for operating oven controls, in accordance with an embodiment of the present invention.

FIG. 4 shows a natural language processing system deployed on a microwave oven home appliance, to provide a natural language user interface for operating oven controls. Using a natural language interface bypasses the difficulty in learning menu-driven and graphical user interfaces for operating such appliances, as well as provides a convenient way to report status of operations back to the user. By learning new vocabulary from the user, through conversation, an appliance with such a natural language interface can adapt to a style of conversation convenient for individual users.

The present invention uses natural language reasoning, parsing and pattern matching to process natural language in a natural language format. Components of natural language such as images, sound and text are inputs which can be correlated to semantic meanings by the present invention. FIG. 4 shows these inputs in the upper part of the figure, in accordance with one embodiment of the present invention. Using a semantic network to store parsed versions of the inputs, the present invention can then retrieve the stored versions of the inputs using uses natural language reasoning, parsing and pattern matching. FIG. 4 shows these storage and retrieval operations as the pair of arrows in the middle of the figure. The confirmation and results of these operations are produced as output such as images, sound and text. FIG. 4 shows these inputs in the lower part of the figure.

Figure 5:
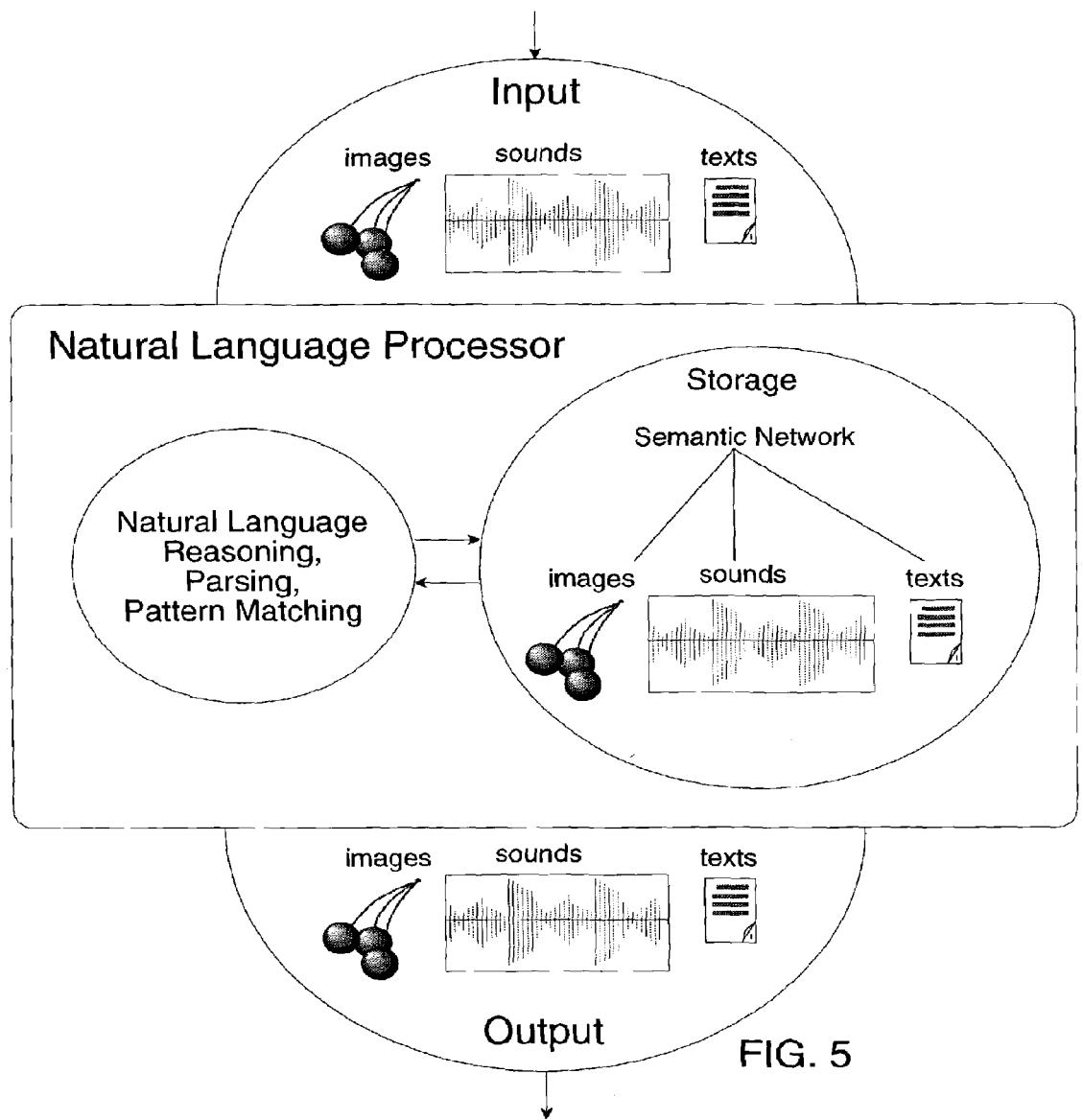
FIG. 5 shows a natural language processing system having inputs, storage, and outputs in the form of images, sounds and texts, in accordance with an embodiment of the present invention.

In contrast, the prior art database systems rely upon logic, query parsing and relational indexing to process inputs and produce outputs. When operating on data from a broad range of contexts, logic must be supported by numerous structures. These structures include structured queries, typically using Structured Query Language (SQL) and database maintenance commands, such as 'create table', 'update table' and 'create index'. FIG. 5 shows these structures as inputs in the upper part of the figure, in accordance with one embodiment of the present invention. Once these structured inputs have been received by a data base processor, they are parsed into a query plan structure used to operate upon table structures categorizing data into rows and columns of symbols. In order for structured queries to succeed, the symbols in these rows and columns must be logically ordered. The standard for this logical ordering is commonly called database normalization, and it requires that relationships between data be logically consistent. FIG. 5 shows data relationships as curved lines labeled as 'relationship-a', relationship-b', relationship-c'. Unfortunately, logical inconsistencies are so common that most database systems sacrifice the quality of logical ordering to achieve a reduction in database cost. The magnitude of this sacrifice is generally larger for larger databases, because the relationships between rows of data create a combinatorial explosion of logical inconsistencies between data rows.

The present invention bypasses the need for logical consistency by representing data in a semantic network where meaning is recorded redundantly by multiple paths over semantic links connecting semantic network nodes.

Figure 6:
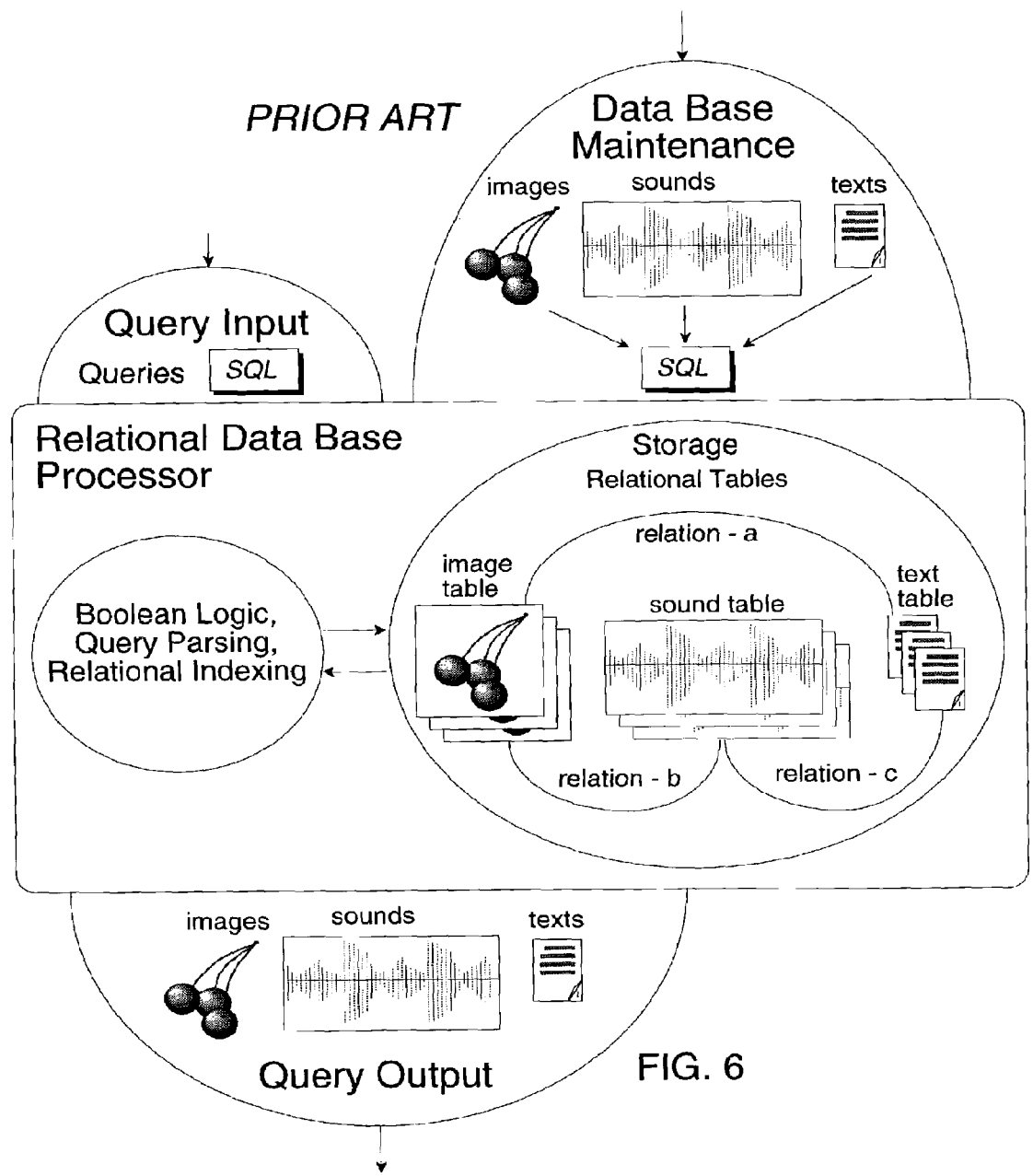
FIG. 6 shows a database system having inputs of SQL commands, a relational database processor, and output in the form of images, sounds and texts, in accordance with an embodiment of the present invention.

The input structures shown in the upper portion of FIG. 5 are also difficult to use. They require users to know formal logic and programming languages. To make the data in database more accessible to the general public, natural language processors have been added as pre-processors to database inputs. FIG. 6 shows the database system of FIG. 5, but showing in the upper left hand corner of FIG. 6 a natural language processor similar to FIG. 4. This architecture allows the general public to access data, but not to maintain the database. When tables or relationships must be added to the database, such modifications must be done by people skilled in formal logic and programming languages.

Figure 7:
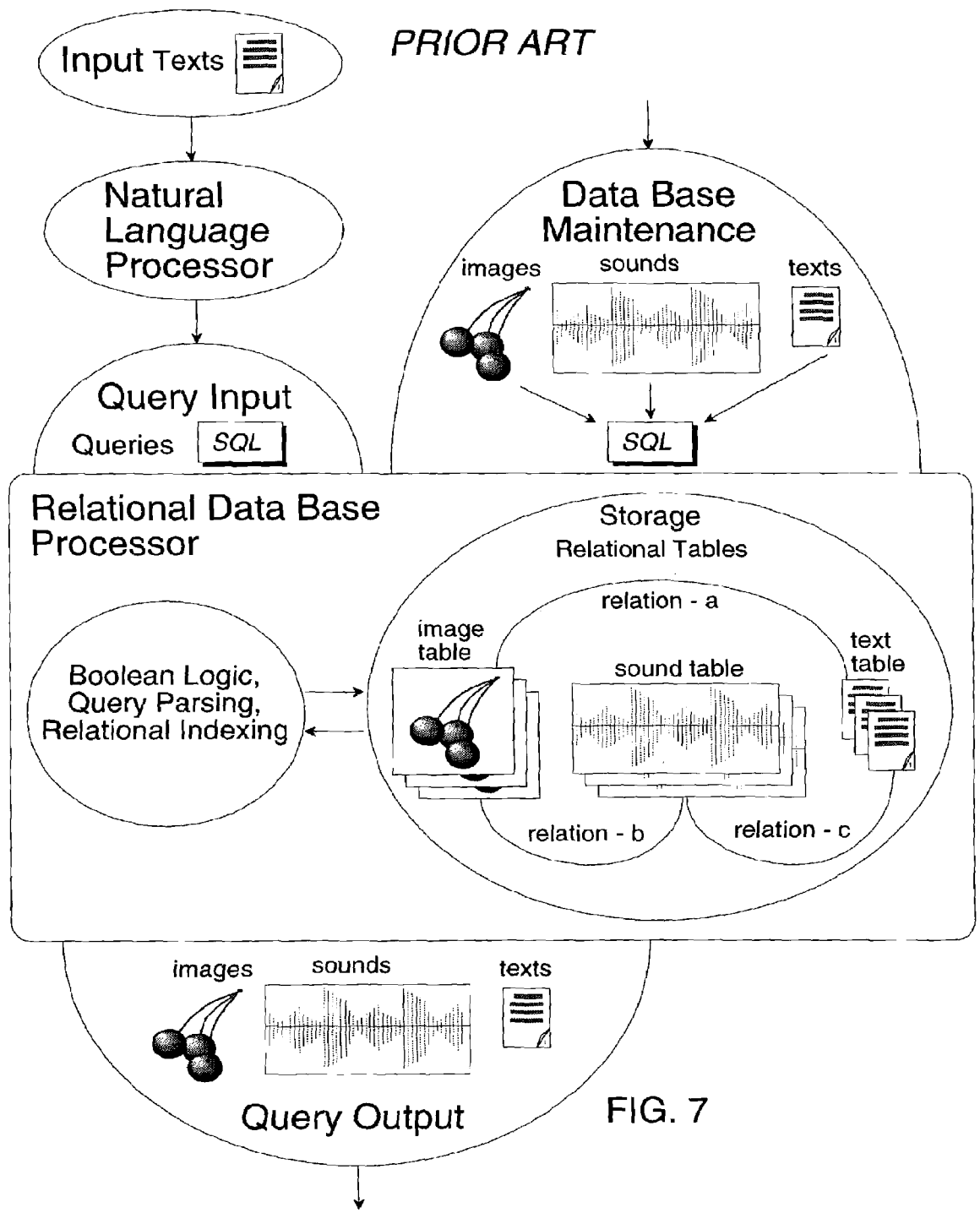
FIG. 7 shows the database system of FIG. 2. with a natural language processor added for converting natural language text input to SQL commands, in accordance with an embodiment of the present invention.

An example of the complex and esoteric structure required by the prior art to process simple natural language requests is shown in FIG. 7. A prior art system as shown in FIG. 7 might get a request for "fascinating art not ugly". Using prior art natural language processing techniques, this simple phrase would translate into the SQL query shown in the upper part of FIG. 8.

The query comprises three clauses: a 'select' clause, a 'from' clause, and a 'where' clause. The beginning of each clause is shown in bold. The processing order of SQL clauses is 'from' clause, then 'where' clause, then 'select' clause. The 'from' clause requests data from two tables, art and artAdjective.

The first line of the 'where' clause joins rows from the art table to rows in the artAdjective table, finding matching pairs of rows where the artAdjectiveNum column matches the num column. For instance, the first two rows of artAdjective have a num of 10 which matches the first row of art which also an artAdjectiveNum of 10. Similarly, the third through sixth rows of artAdjective match the second row of art, and the seventh through eleventh rows of artAdjective match the third row of art. Each of these joined rows is filtered by the second logical requirement in the 'where' clause, specifying that adjective=fascinating. This filters all but the two of the joined rows, shown in bold in FIG. 8: "20—fascinating (joining) 2-20—delicately charming figures of pasta" and "30—fascinating (joining) 3-30—stained glass statues of people". The third line of the 'where clause' filters out rows where artAdjectiveNum is among a proscribed the set of artAdjectiveNum values related to the adjective 'ugly'. Since the artAdjectiveNum of 30 shown in italics in FIG. 8 is therefore proscribed, that artAdjectiveNum's corresponding joined row "30—fascinating (joining) 3-30—stained glass statues of people" is filtered out, leaving only the joined row: "20—fascinating (joining) 2—20—delicately charming figures of pasta".

The 'select' clause selects values from two columns from the art table, 'num' and 'artDescription'. These are displayed for the joined row returned by the query, shown in the bottom of FIG. 8.

Many problems arise from logical representations of semantic relationships as shown in the prior art of FIG. 8. Since the strength of a relation between an adjective and a noun varies by context, a separate table is required for each context. For instance, the meaning of 'ugly' might be less significant if the context were industrial art instead of art. Since there are as many different contexts as there are combinations of nouns, adjectives and verbs, there is no practical way to represent all the different contexts as logical table structures. Other problems with logical representation arise from subjectivity. One person's opinion relating 'ugly' to a noun will vary from another person's opinion. Logic does not easily model differences in subjective opinion, because the subjectivity is based mostly on implied relationships for which no explicit logical relationship has been defined.

Figure 11:
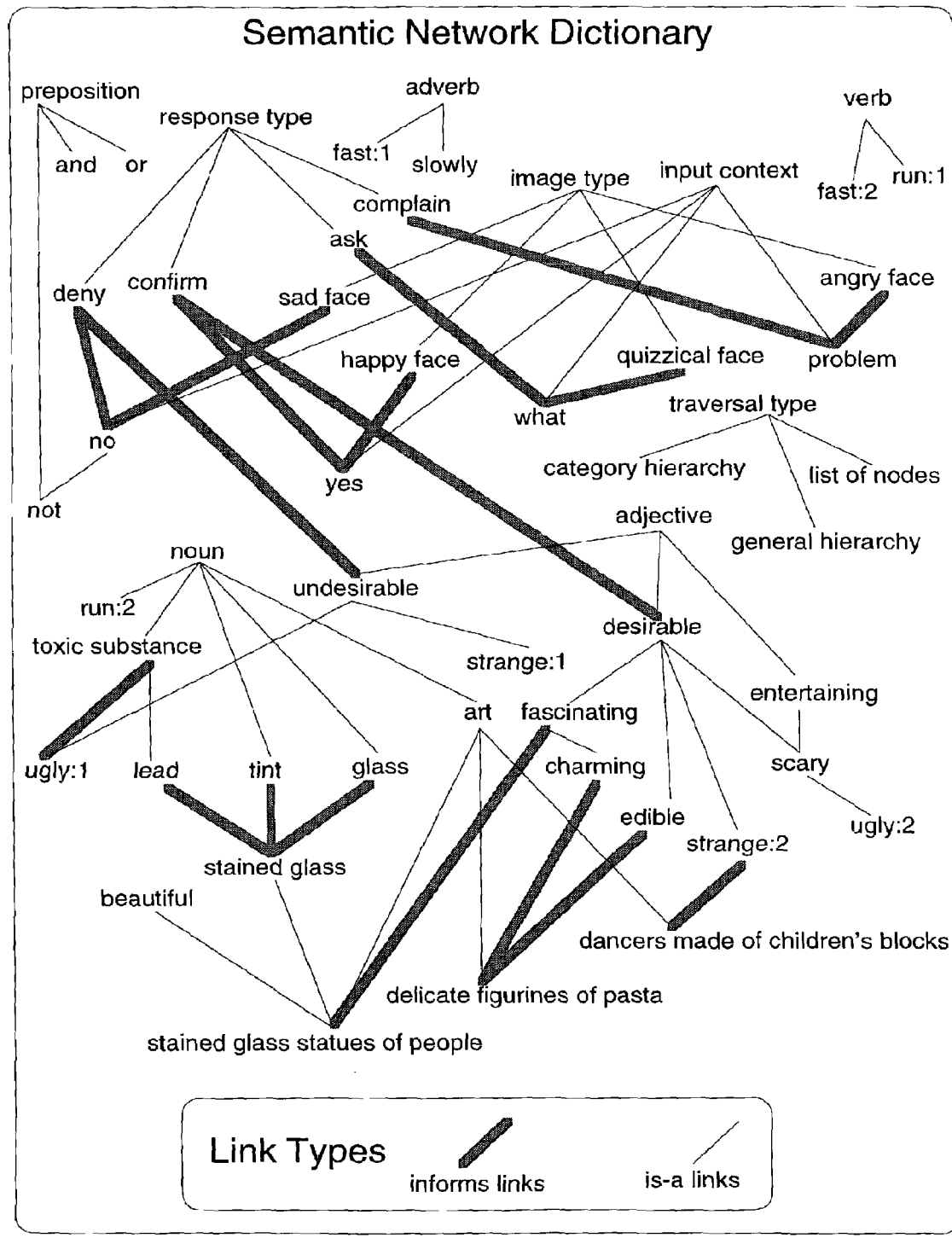
FIG. 11 shows a semantic network storing the logical relations of FIG. 8 as semantic nodes and links, in accordance with an embodiment of the present invention.

These problems in logical representations can be bypassed by representing semantic relationships directly in a semantic network dictionary. FIG. 11 shows a small semantic network dictionary, in accordance with one embodiment of the present invention, for representing the nouns and adjectives of FIG. 8. By replacing table relations with direct links between nodes, the semantic network of FIG. 11 succinctly maps adjectives like 'fascinating' and 'ugly' to noun phrases like "stained glass statues of people." Since semantic links can be used to store various relationships such as 'is-a', 'part-of' and 'because-of', most semantic networks label the link lines with similar labels. However, for simplicity, FIG. 11 shows each 'is-a' links with a thin dark line, and each link of any other type with a fat gray line. Generally 'is-a' links are strict categorization links. For instance, 'art' is a 'noun', and 'desirable' is an adjective. The gray links are less strict in meaning. For instance, lead is linked to stained glass. Strictly speaking, lead 'is-a-component-of' stained glass, along with tint and glass. FIG. 11 does not label each direct link above stained glass with 'is-a-component-of' because of the clutter that would cause. Instead, simple gray lines are used to show that some aspect of lead, tint, and glass informs the nature of stained glass. Similarly, as semantic network can be implemented with just two link types, one for storing 'is-a' links, and the other for storing 'informs' links.

To correlate visual and audio input with written input, natural language processor systems often rely upon input processors to map raw input data to specific semantic nodes. FIG. 9 shows a high level overview of a prior art image processor for mapping face expressions to semantic nodes signifying a person's emotions, in accordance with one embodiment of the present invention. The mapping takes place in four steps. The first step abstracts information from the pixels of an image by tracing simple contours around the mouth. The second step abstracts information from contour shapes by measuring the direction and magnitude of their curvature. The last step abstracts information from contour directions and magnitudes by mapping from classes of contour directions and magnitudes to specific semantic nodes of "happy face", "sad face", "quizzical face" and "angry face".

FIG. 10 shows an example of a the prior art sound processor design for mapping sounds to words, in accordance with one embodiment of the present invention. In step 1, sounds are input as air pressure amplitude fluctuations over time. In step 2, bands of vibration frequencies are identified from fluctuations in amplitude by a fast Fourier transformation. Each band is identified as a range of frequencies defined in cycles per second also known as Hertz (HZ). The persistence of each detected band of frequencies is mapped over time by the fast Fourier transformation. In step 3, the identification of phonemes is abstracted from specific combinations of frequency bands. For instance, 'sh' is a broad band of frequencies, whereas the consonants 'o' and 'a' are narrower bands. In step 4, the identification of word nodes is abstracted from sequences of phonemes.

The semantic network of FIG. 11 stores both the semantic image nodes from FIG. 9 and semantic word nodes FIG. 10. The semantic network of FIG. 11 also stores implied logical relationships. These relationships are implied by the semantic links. For instance, 'fascinating' is linked via an inheritor link to "stained glass statues of people". This stores the same meaning as the row of artAdjective table "30—fascinating" joined by relation-b to the row of art table "3-30—stained glass statues of people" in FIG. 8. To retrieve nodes corresponding to logical relationships from the semantic network of FIG. 11, the method of FIG. 12 combines topological categorization with topological contextual filtering.

Figure 12:
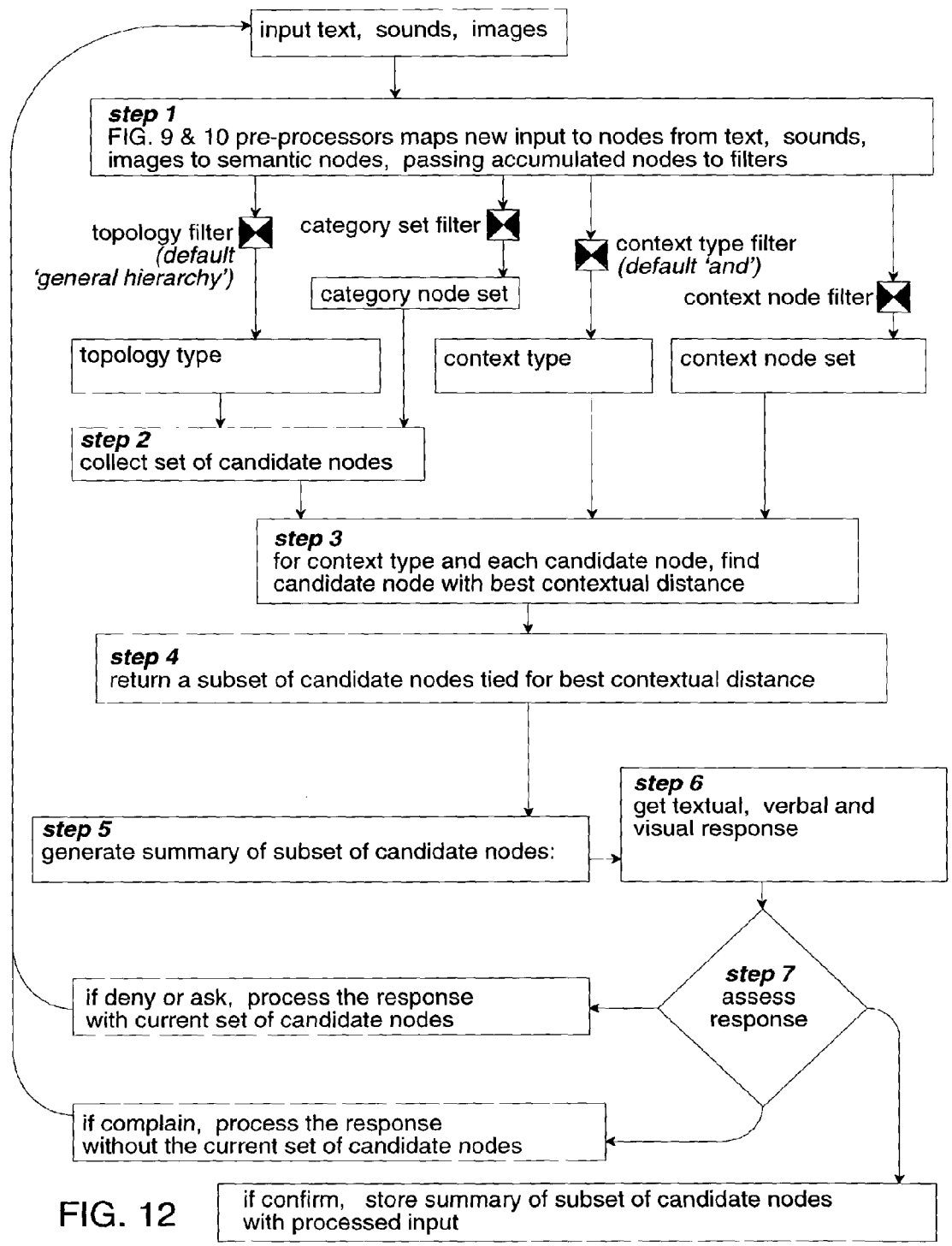
FIG. 12 shows a method for combining topological categorization with topological contextual filtering, in accordance with an embodiment of the present invention.

The method of FIG. 12 starts by automatically mapping inputs to specific semantic nodes in a semantic network, in accordance with one embodiment of the present invention. FIG. 12 step 1 automatically identifies any existing semantic nodes which can be which can be mapped to input data, as well as creating new semantic nodes for input which cannot be mapped to existing semantic nodes. After step 1, the semantic nodes identified by step 1 are presented to filters which determine what role each identified node can play in steps 2 and 3 of the method.' Filters which supply nodes for these roles are shown as 'traversal type filter', 'category node filter', 'context type filter', and 'context node filter'. FIG. 13 is a table showing acceptable nodes for each filter type, at various stages of a natural language conversation, in accordance with one embodiment of the present invention. For the start of a conversation, FIG. 13 has rows where stage is marked 'start'. For mid-conversation input, when dialog has already led to some agreement, FIG. 13 has rows where stage is marked 'middle'. This allows filtering to shift to take advantage of information which emerges about a conversation, as a conversation develops. Alternatively, the transition from start to middle of the conversation can be automatically detected when the context node set grows to an optimal size, typically about seven nodes. In other implementations of the present invention, at user request, the context node set can be diminished or entirely flushed, to transit the conversational state from middle back to start.

FIG. 13 defines the filters themselves in terms of the semantic network of FIG. 11. For instance, 'traversal type filter' accepts only nodes which are traversal types. The semantic network of FIG. 11 shows three nodes which inherit from 'traversal type': 'category hierarchy', 'general hierarchy' and 'list of nodes'. These three nodes would thus be the only nodes acceptable by the traversal type filter. Similarly, the category set filter accepts only nodes which inherit from 'adjective' or 'adverb' in FIG. 11.

Default values are indicated for 'input traversal type' and 'input context type". In case no nodes pass through the filters to perform these roles, default nodes are substituted. For instance, if no input traversal type nodes are found in the input, the default node 'general hierarchy' substitutes for the input traversal type node. Similarly, if no input context type nodes are found in the input, the default node 'and' substitutes for the input context type.

So that priority could be given toward filling each specific role, a priority-based dispatching mechanism could be used as an alternative to filtering. A dispatching mechanism would be more complex to maintain but could be more accurate. For instance, if the symbols 'fast run' were input, fast could either be an adverb (fast:1) for the input category set or a verb (fast:2) for the context node set. On the other hand, run could either be an noun (run:2 meaning a small brook or stream) or a verb (run:1) both for the context node set. To identify both an input category set and a context node set, fast could be identified with fast:1 and run identified with run:1 or run:2. The dispatcher could reject the alternative of identifying fast with fast:2 because this would prevent identification of an input category set.

To perform step 2 of FIG. 12, both an input traversal type node and an input category node set must be elicited from step 1. In cases where no input traversal type node passes the traversal type filter, a default traversal type may be substituted for step 2 instead. For instance, FIG. 12 shows a default traversal type of 'general hierarchy'. In cases when special semantics are involved, other default traversal types may be chosen instead, such as 'category hierarchy' when semantics are more formal.

Step 2 of FIG. 12 automatically collects a set of candidate nodes, traversing from an input category node set according to traversal functions described in FIG. 14, in accordance with one embodiment of the present invention. For each possible input traversal type, FIG. 14 shows a corresponding traversal function. For instance, the default traversal type 'general hierarchy' corresponds to the traversal function 'any inherited links'. The contextual meaning chosen by the overall of FIG. 12. is limited to the set of candidate nodes returned by the traversal function.

Step 3 of FIG. 12 automatically computes a best contextual distance for each candidate node, given a context type passed from the context type filter. The default context type is 'and' which in FIG. 15. corresponds to a best contextual candidate function of 'minimum average distance.' Step 3 uses this best contextual candidate function to choose a subset from the set of candidate nodes returned by step 2.

Figure 61:
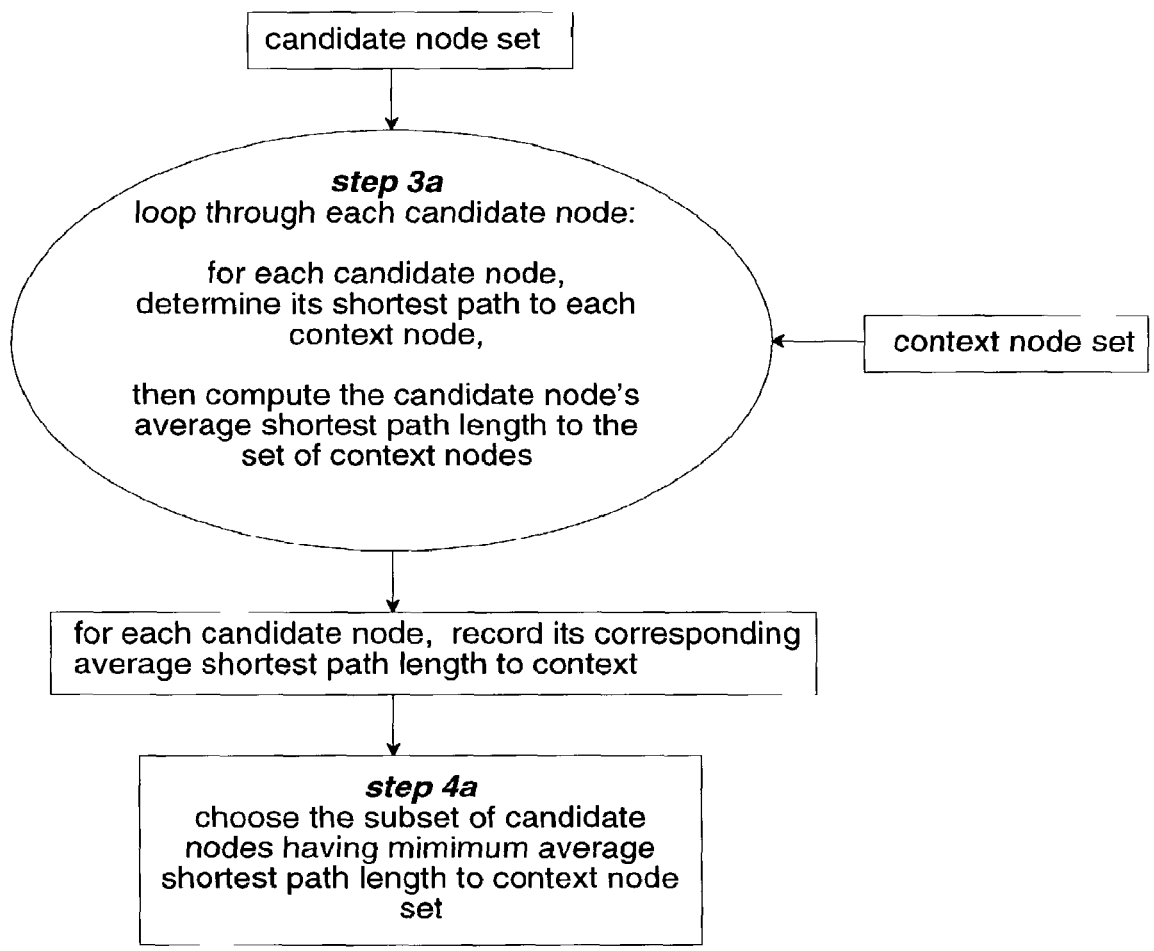
FIG. 61 shows a method for identifying nodes in a candidate node set having a minimum average distance between a candidate node and a context node set within a semantic network, in accordance with an embodiment of the present invention.

FIG. 15 is an example of a table of other context types and their corresponding best contextual distance functions, in accordance with one embodiment of the present invention. For instance, the input context type 'and' corresponds to a best contextual distance of 'minimum average distance'. A minimum average distance can be calculated from the topology of a semantic network, by determining the shortest path, in semantic links, between each candidate node and each context node, then averaging those shortest paths and choosing a subset of nodes having minimum average shortest path length to context. FIG. 61 is a flowchart showing how minimum average distance can be calculated, in accordance with one embodiment of the present invention. Step 3a of FIG. 61 is a loop which iterates through each node of the candidate node set. For each pass through that loop, the shortest path from a single candidate node to each node of the context node set is identified. When the shortest paths to each context node have been identified for the candidate node, step 3a calculates the average length of those shortest paths and stores that average number for the candidate node. Step 3a then returns to the top of the loop to process the next candidate node until all candidate nodes have been processed. Step 3b then determines the minimum average shortest path length recorded by Step 3a over all candidate nodes, and chooses the subset of candidate nodes having that minimum average shortest path length to context. By choosing the minimum average, the method of FIG. 62 finds the closest nodes to context, in accordance with one embodiment of the present invention.

Figure 62:
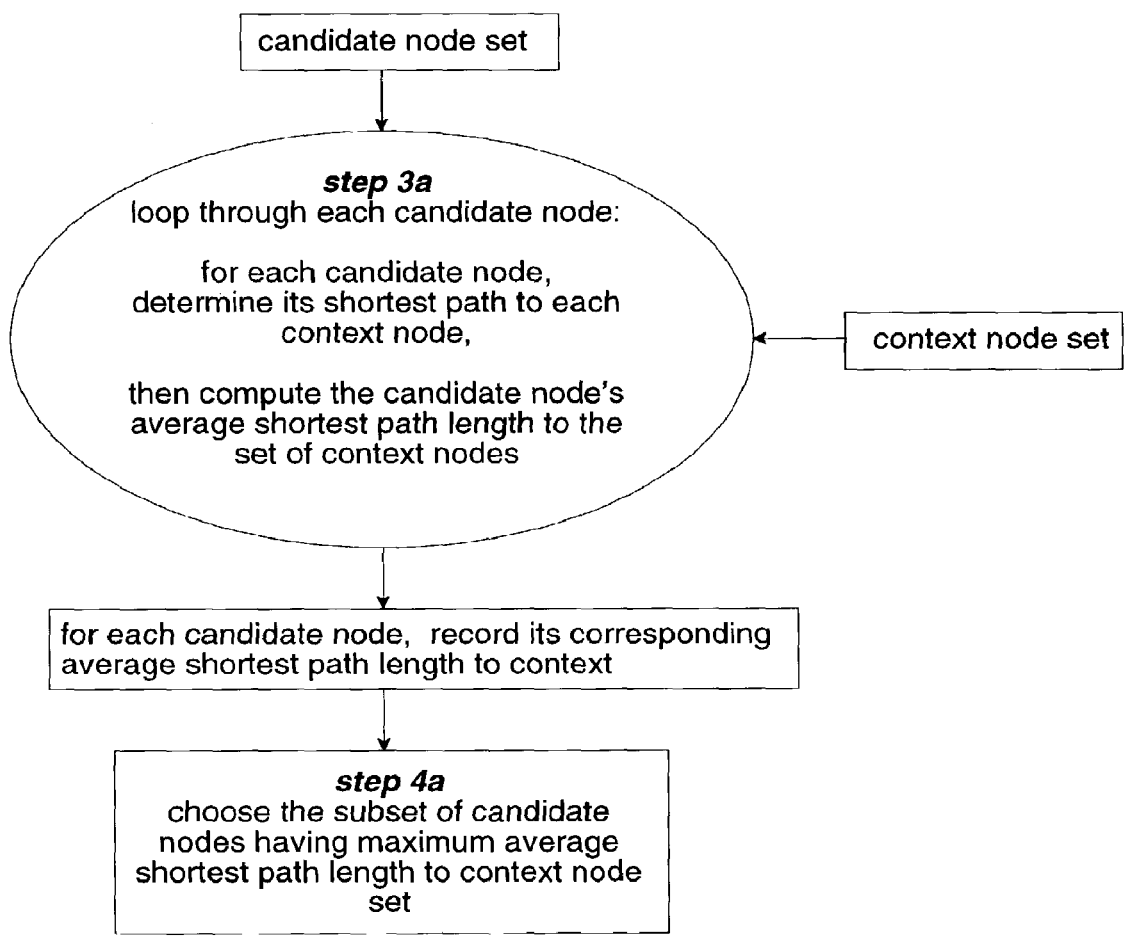
FIG. 62 shows a method for identifying nodes in a candidate node set having a maximum average distance between a candidate node and a context node set within a semantic network, in accordance with an embodiment of the present invention.

Other input context types correspond to other best contextual distance functions, according to the meaning of that context type. For instance, the input context type 'not' corresponds to a best contextual distance of 'maximum average distance'. FIG. 62 is a flowchart showing how maximum average distance can be calculated. This calculation is identical to minimum average distance except for the last step. In step 3b of FIG. 62, instead of determining the minimum average shortest path length recorded by FIG. 61 step 3b over all candidate nodes, FIG. 62 step 3b determines the maximum average shortest path distance recorded over all candidate nodes. By choosing the maximum rather than minimum average, the method of FIG. 62 finds the farthest nodes from context, to satisfy requests for symbols which are NOT like the context.

Figure 63:
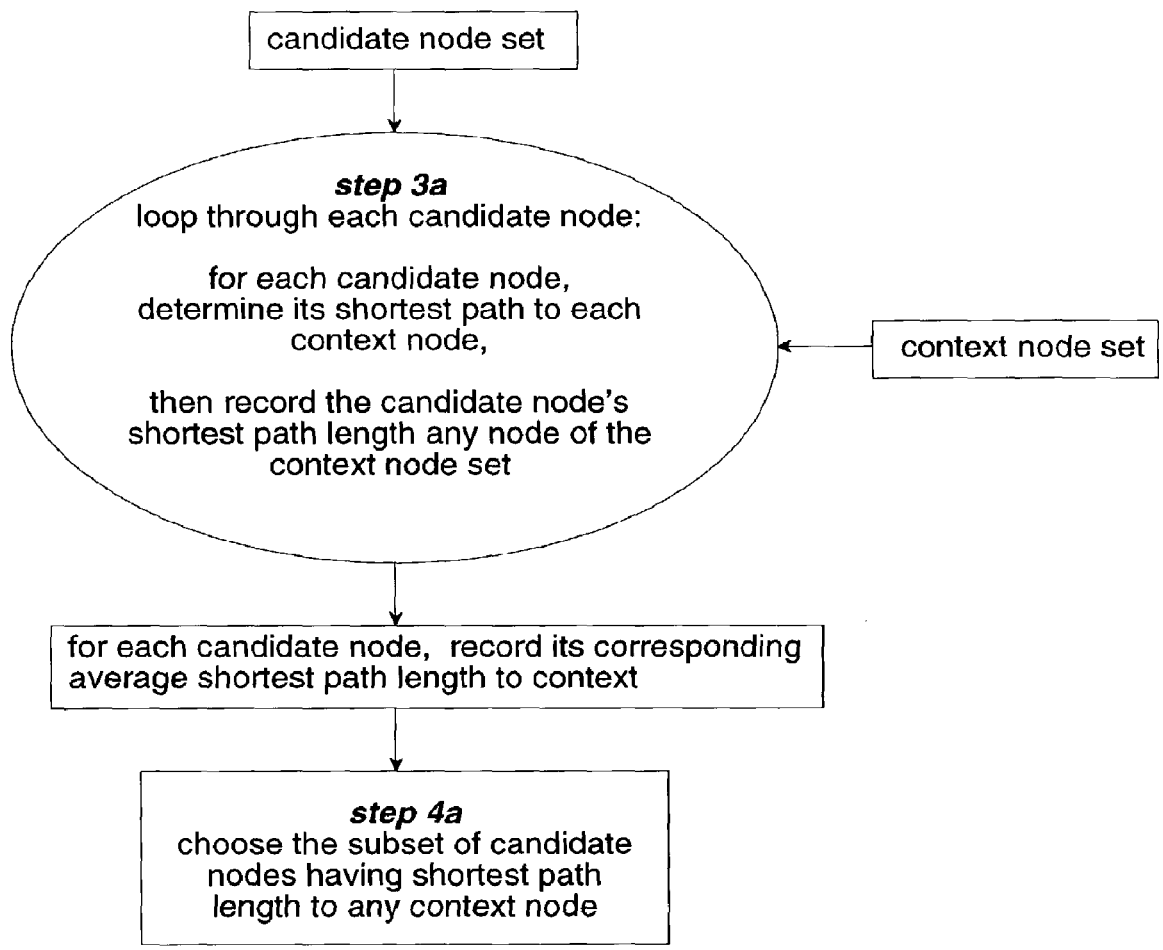
FIG. 63 shows a method for identifying nodes in a candidate node set having a minimum distance between a candidate node and a context node set within a semantic network, in accordance with an embodiment of the present invention.

There are other context types which correspond to different best contextual distance functions. The context type 'or' corresponds to a best contextual distance function of 'minimum distance'. FIG. 63 is a flowchart showing how minimum distance can be calculated, in accordance with one embodiment of the present invention. Step 3a of FIG. 63, records only the shortest path length between a candidate node and of any node of the context node set, rather than the average shortest path length between a candidate node and all nodes of the context node set as is done in step 3a of FIG. 61 and FIG. 62. By recording the shortest rather than average path length, the method of FIG. 63 emphasizes candidate nodes which are close to some context nodes even if they are very far from other context node. The result of this emphasis allows divergent contextual semantic meanings to be identified. The methods of FIGS. 61 and 62, in contrast, emphasize convergent semantic meanings, by penalizing candidate nodes which are far from some context nodes even if they are near to other context nodes. In FIG. 63, step 4a identifies the candidate nodes having the shortest path length to any context node.

Figure 64:
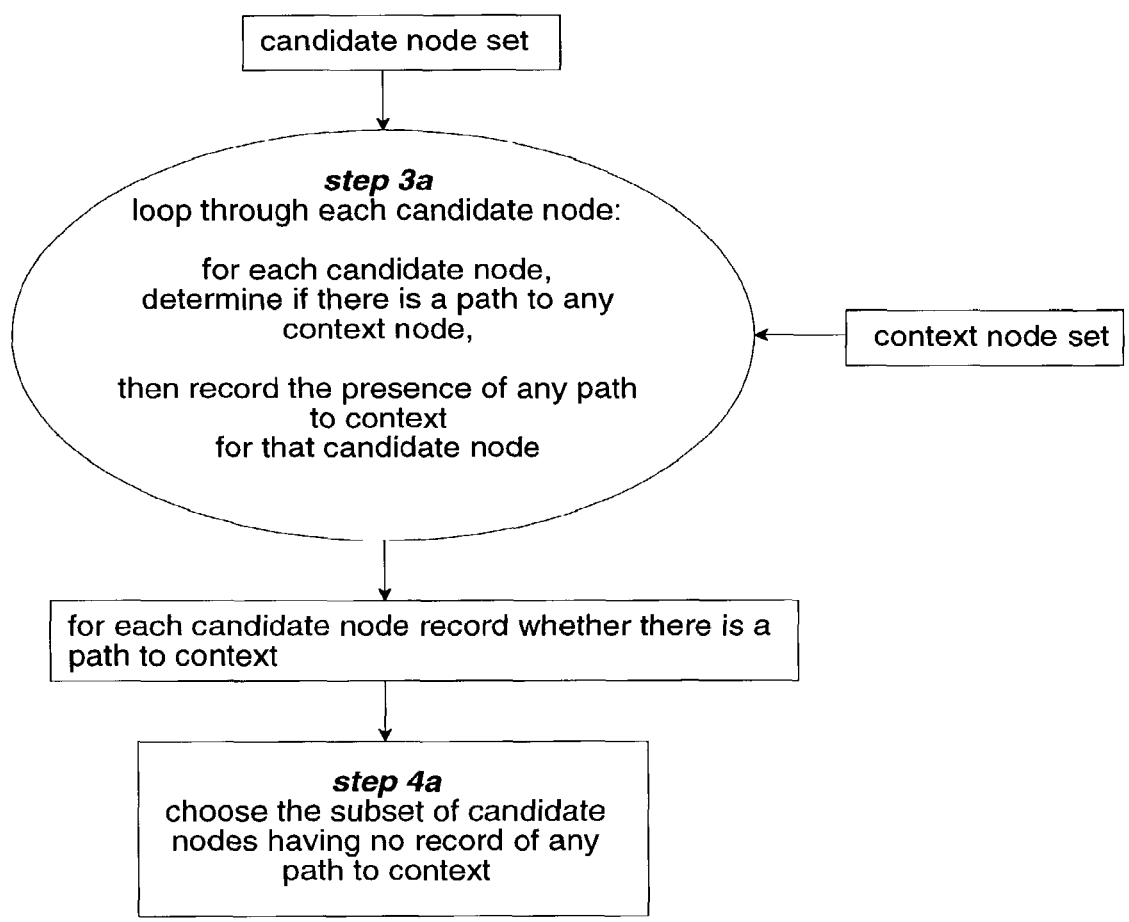
FIG. 64 shows a method for identifying nodes in a candidate node set having an infinite minimum distance between a candidate node and a context node set within a semantic network, in accordance with an embodiment of the present invention.

Other context types require highly stringent best contextual distance functions. The context type 'absolutely not' is a more stringent then the context type 'not'. Its corresponding best contextual distance function 'infinite minimum distance' is also more focused. FIG. 64 is a flowchart showing how infinite minimum distance can be calculated, in accordance with one embodiment of the present invention. Step 3a of FIG. 64 determines only if there is any path from a candidate node to any context node, unlike step 3a of FIG. 62 which determines the shortest path from a candidate node to each context node. Step 4b of FIG. 64 chooses only candidate nodes which have no path to any context node, unlike step 4b of FIG. 62 which chooses the candidate nodes having maximum average path to context nodes. By choosing only nodes which have no path to context, FIG. 64 step 3 thus chooses a subset of the nodes chosen by FIG. 62.

Best contextual distance functions can also be made more stringent or more lenient by different methods of tallying distances along paths between candidate nodes and context nodes. Different types of inheritance links can be given different weightings when counting the links in a path to tally the distance along the path. For instance, in FIG. 15, the input context type 'and equivalent' has the best contextual distance function 'minimum average distance, not counting is-a links.' This best contextual distance function would be identical to that outline by FIG. 61, except that when computing the candidate node's average shortest path length, is-a type inheritance links would not be counted, so that they would have no effect on the path length. By not counting is-a links, all nodes in a is-a inheritance hierarchy are considered equivalent to each other in meaning, for the context type 'and equivalent'. Such a distance function would thus measure contextual equivalency of meaning of candidate nodes.

Step 3 and 4 of FIG. 12 can be automatically performed by any of the contextual distance functions suggested above. After step 4 has returned a subset of candidate nodes tied for best contextual distance, step 5 of FIG. 12 can generate a summary of that subset for presentation to a user of the computer system. Then in step 6, the user's response to that presentation can be acquired, to be assessed in step 7 of FIG. 12. The assessment can be made using a contextual distance function as outlined above by FIG. 61, 62, 63 or 64. The assessment step categorizes which of the four possible categories of response the user's response best matches: deny, ask, confirm, or complain. FIG. 12 shows branches leading from step 7 for each of these categories of response.

For user responses categorized as 'deny' or 'ask', the response can be processed by passing along with the additional input received in step 6 along with the current set of candidate nodes to the beginning of another pass through the method of FIG. 12. This branch flows into the line along the left edge of FIG. 12.

For responses categorized as 'complain', the response can be processed by passing the additional input received but without the current set of candidate nodes. Dropping the current set of candidate nodes, allows the user to start from scratch without having to deal with parsing problems of the previous input. This branch also flows into the line along the left edge of FIG. 12.

For responses categorized as 'confirm', the subset of candidate nodes returned by step 4 can be stored in a semantic network along with the processed input. By generating new semantic links to store all of these nodes in the semantic network, new semantic meanings can be later retrieved by other input fed to step 1 of FIG. 12. Thus the method of FIG. 12 enables new semantic meanings to be stored and later retrieved by other natural language input. By storing and retrieving natural language information directly as semantic meanings, the method of FIG. 12 can supercede relational databases and other databases by enabling greater ease of use and better tools for handling of diverse kinds of data.

Other categories of response may be needed to handle user responses. For instance, rather than responding directly, the user may respond with a further question. To handle such responses, an additional category response node 'digress' can be added to the 'response type' hierarchy of FIG. 11, and a corresponding branch of action leading from step 7 in FIG. 12.

Figure 16:
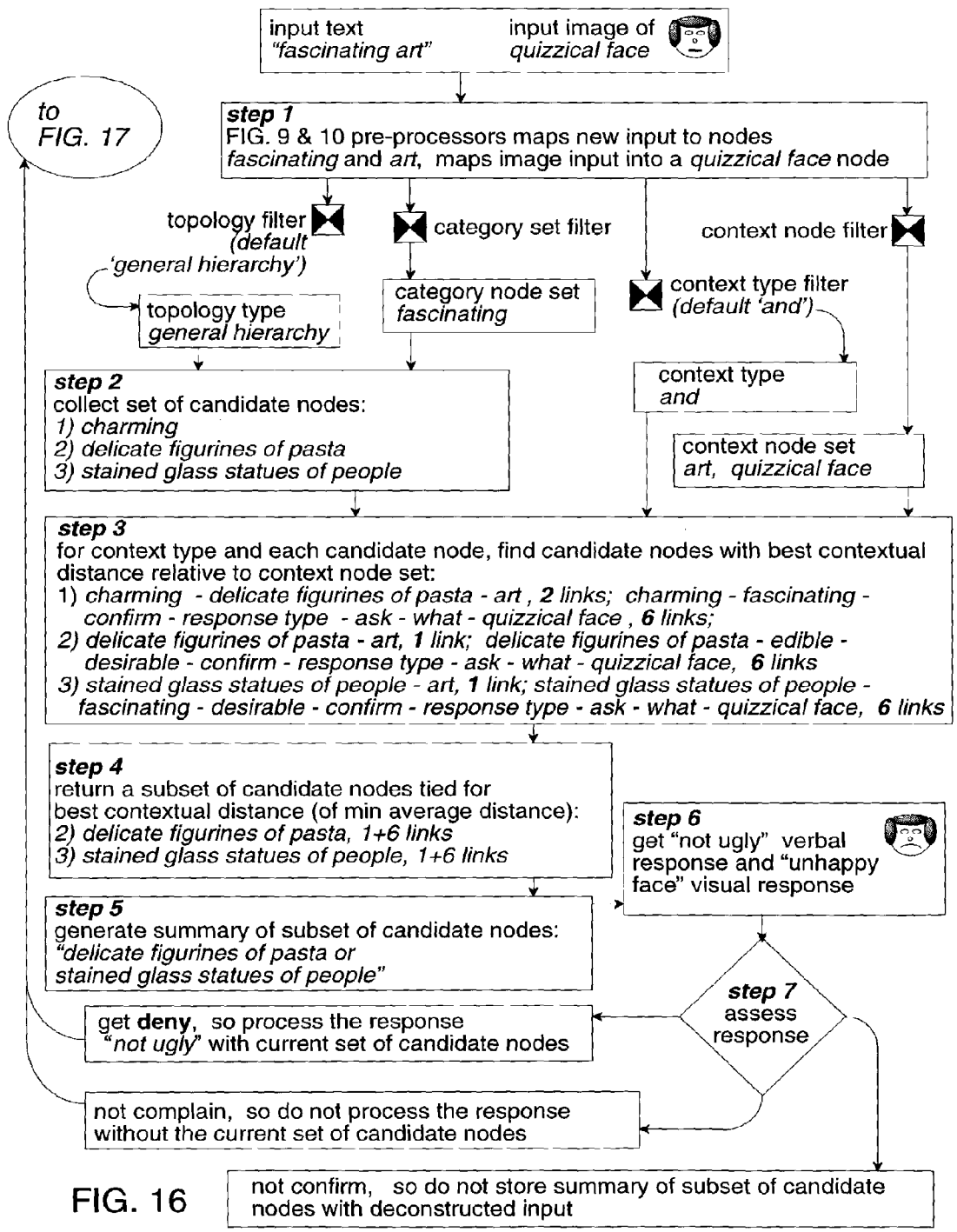
FIG. 16 shows an example of parsing the natural language text "fascinating art" using the method of FIG. 12, in accordance with an embodiment of the present invention.
Figure 17:
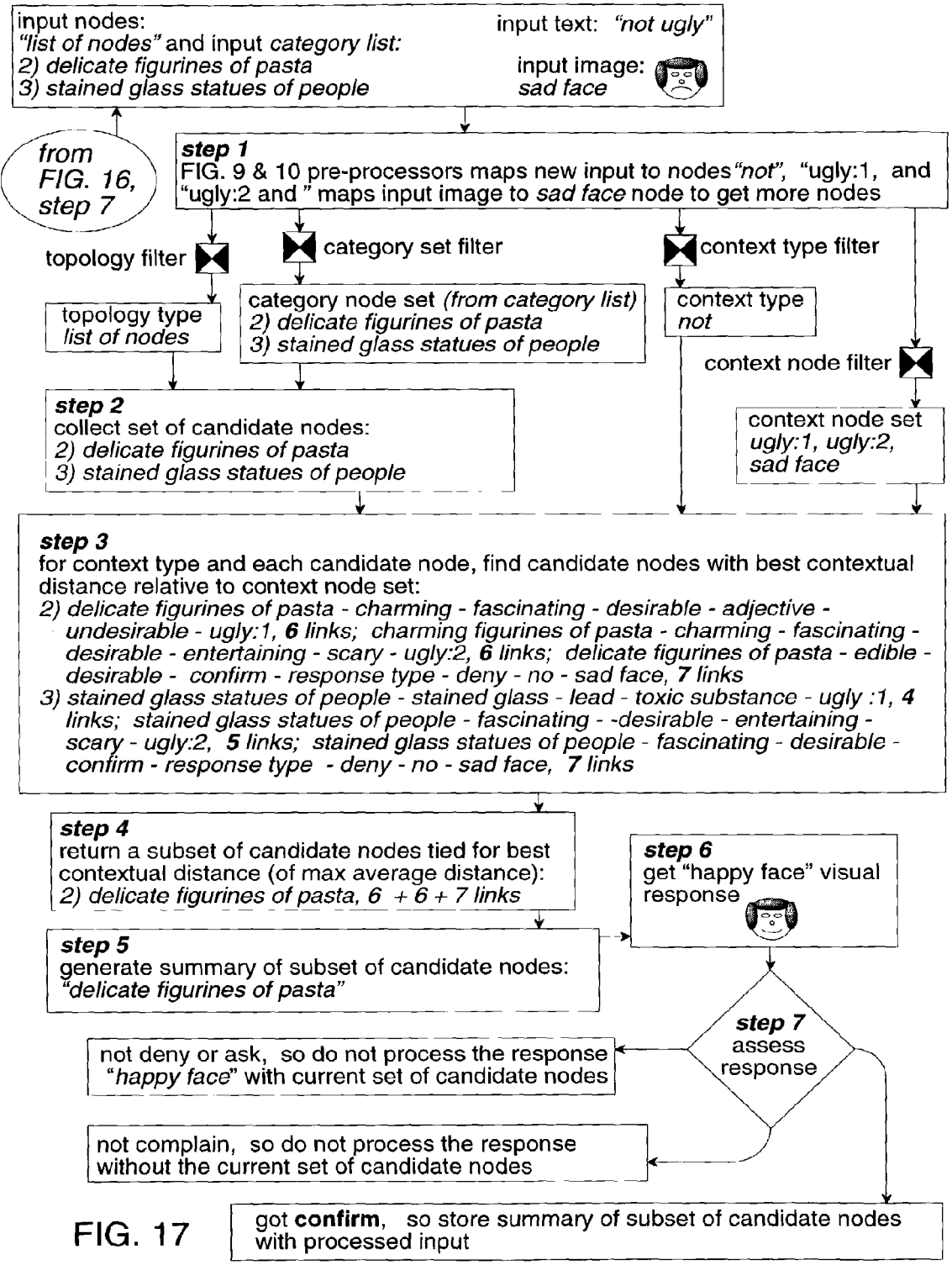
FIG. 17 shows an example of parsing "fascinating art not ugly" using the method of FIG. 12 to filter the output of FIG. 16, in accordance with an embodiment of the present invention.

FIGS. 16 and 17, in accordance with one embodiment of the present invention, show the method of FIG. 12 handling specific input data similar to the SQL Query shown in FIG. 8. To retrieve records from a relational database corresponding to 'fascinating art not ugly', the eight line SQL query at the top of FIG. 8 selects information from two joined tables, seeking 'fascinating' from one table and avoiding 'ugly' in the other table. FIGS. 16 and 17 show how the method of FIG. 12 can more elegantly retrieve similar information from a semantic network corresponding to 'fascinating art not ugly'. FIG. 16 shows the retrieval of nodes corresponding to 'fascinating art' and FIG. 17 shows now these nodes can be winnowed down to correspond to 'not ugly'.

FIGS. 16 and 17 also handle visual inputs of a user's face, to show how image processing as shown in FIG. 9 can be useful when disambiguating the meaning of user input. At the top of FIG. 16, the user input text 'fascinating art' and a visual input node of 'quizzical face' are received. In step 1, similarly to FIG. 12, these inputs are passed to four filters: a traversal type filter, a category filter, a context type filter, and a context node filter, whose filtering actions are directed by the table in FIG. 13 for the start of a conversation. The traversal type filter does find any node inputs in FIG. 11 inheriting from the node 'traversal type', so the traversal filter passes on its default traversal node of 'general hierarchy.' The category set filter finds the node 'fascinating' in FIG. 11 inheriting from 'adjective', allowing 'fascinating' to pass on as the input category set. The other input nodes 'art' and 'quizzical face' do not inherit from 'adjective' or 'adverb' in FIG. 11, so they are not passed on as nodes of the input category set. The context type filter does not find any input nodes inheriting from 'and', 'or', or 'not', so it passes the default context type of 'and'. The context node filter finds two input nodes 'art' and 'quizzical face' which inherit from 'noun' in FIG. 11, so it passes them on as an input context node set.

FIG. 16 step 2 receives the input category set 'fascinating' and the input category set 'general hierarchy'. Step 2 maps 'general hierarchy' via FIG. 14 to a corresponding traversal function 'any inherited links'. Step 2 uses this traversal function to traverse from the node 'fascinating' in FIG. 11 downward to each inheritor of 'fascinating': 'charming', 'delicate figurines of pasta' and 'stained glass statues of people.' These three nodes are then collected into the set of candidate nodes passed to step 3.

FIG. 16 step 3 loops through the set of three candidate nodes, computing for each candidate node a best contextual distance to the input context node set. Step 3 uses the table of FIG. 15 and the context type passed into step 3 of 'and' to determine that the best contextual distance function is 'minimum average distance'. FIG. 61 shows the steps in applying the minimum average distance function. FIG. 16 step 3 shows results of applying FIG. 61 step 3*a* to the semantic network of FIG. 11. From the candidate node 'charming', the shortest path to 'art' has 2 links: from 'art' to 'delicate figurines of pasta' to 'charming'. From the candidate node 'charming' to the other context node 'quizzical face' the shortest path has 6 links. Thus the average shortest path from 'charming' to the two context nodes is (2+6)/2=8/2=4 links. In contrast, two other candidate nodes have shorter average shortest paths. The shortest path from 'delicate figurines of pasta' is just one link long to 'art'. The shortest path from 'delicate figurines of pasta' to 'quizzical face' is six links long. So the average shortest path from 'delicate figurines of pasta' to the two context nodes 'art' and 'quizzical face' is (1+6)/2=7/2=3.5 links. Similarly, the average shortest path from 'stained glass statues of people' to the two context nodes 'art' and 'quizzical face' is also 3.5 links. These shortest paths are outline in step 3 of FIG. 16.

In step 4 of FIG. 16, a subset of the candidate nodes are chosen having best contextual distance. Since candidate nodes 'delicate figurines of pasta' and 'stained glass statues of people' have the minimal average distance, as described by FIG. 15 for the input context type 'and', they are chosen, eliminating the candidate node 'charming'. Elimination of the candidate node 'charming' results from the relatively distant position of 'charming' from 'art' in the semantic network of FIG. 11. From a linguistic point of view, this corresponds to the notion that art is less directly connected to the adjective charming than it is to specific instances of art. In larger semantic networks, structured according to methods outline by was described in patent application Ser. No. 09/085,830 by Au, 'art' may head a larger subtree, increasing the distance from 'art' to various instances of art, but the distance between 'art' and the adjective 'charming' would also increase, remaining greater.

In step 5 of FIG. 16, the subset of candidate nodes chosen in step 4 are described as two nodes texts connected by 'or' for presentation to a user. Other presentations to the user may also be useful, such as a simple scrolling list or a list integrated into a graphical user interface relating parsed user input items to list elements.

Step 6 of both FIG. 12 and FIG. 16 gathers from the user a response to the presentation of step 4. The purpose of gathering a response is to validate that the candidate nodes displayed by step 5 are desired. Step 6 of FIG. 16 shows an example of a response, which includes the text 'not ugly' and the visual input node of 'unhappy face'. This response is assessed in terms of its input nodes in step 7 by a method outlined in FIG. 18.

Figure 18:
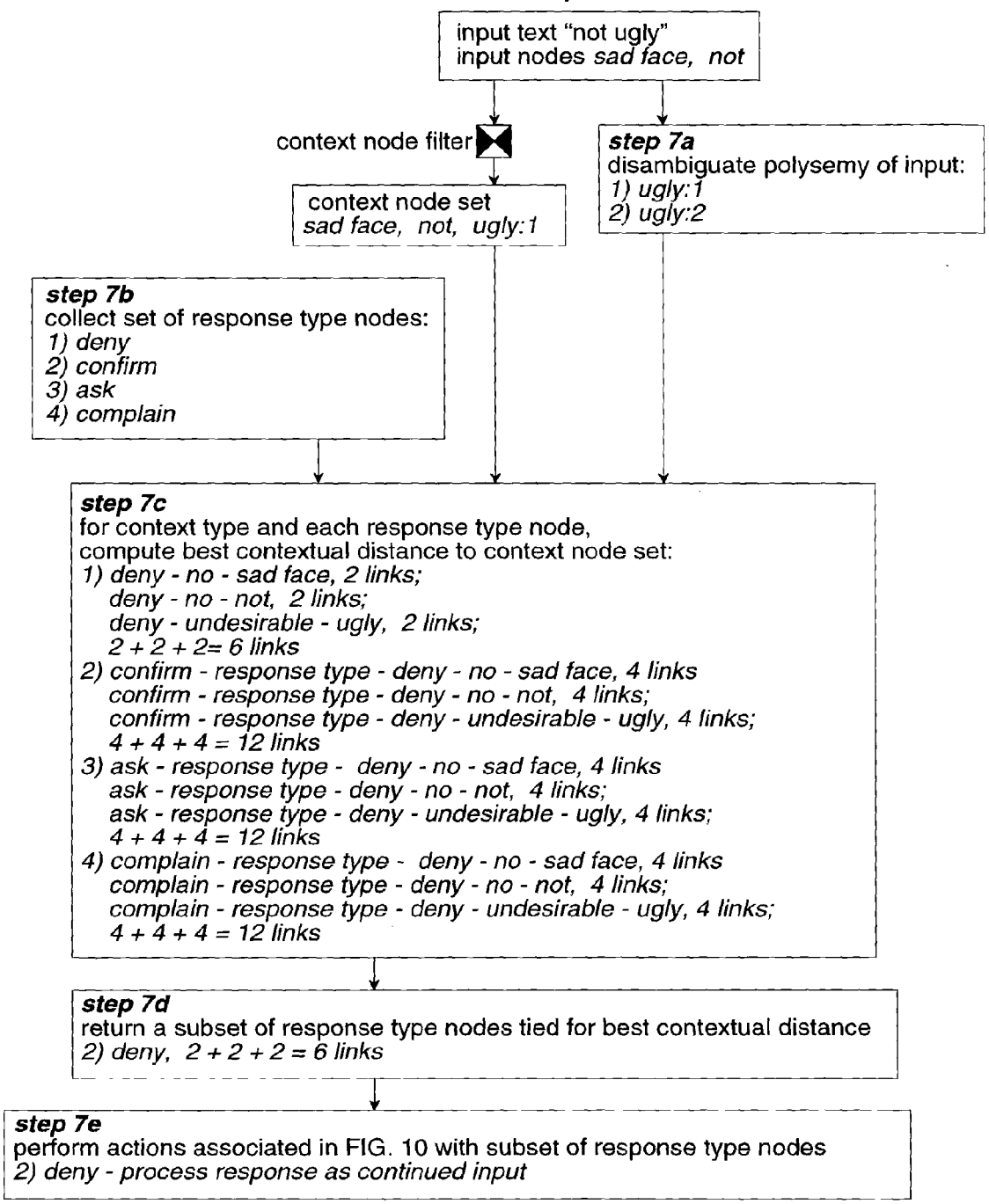
FIG. 18 shows an example of a method applicable to step 7 of FIG. 16 to assess a visual response, in accordance with an embodiment of the present invention.
Figure 19:
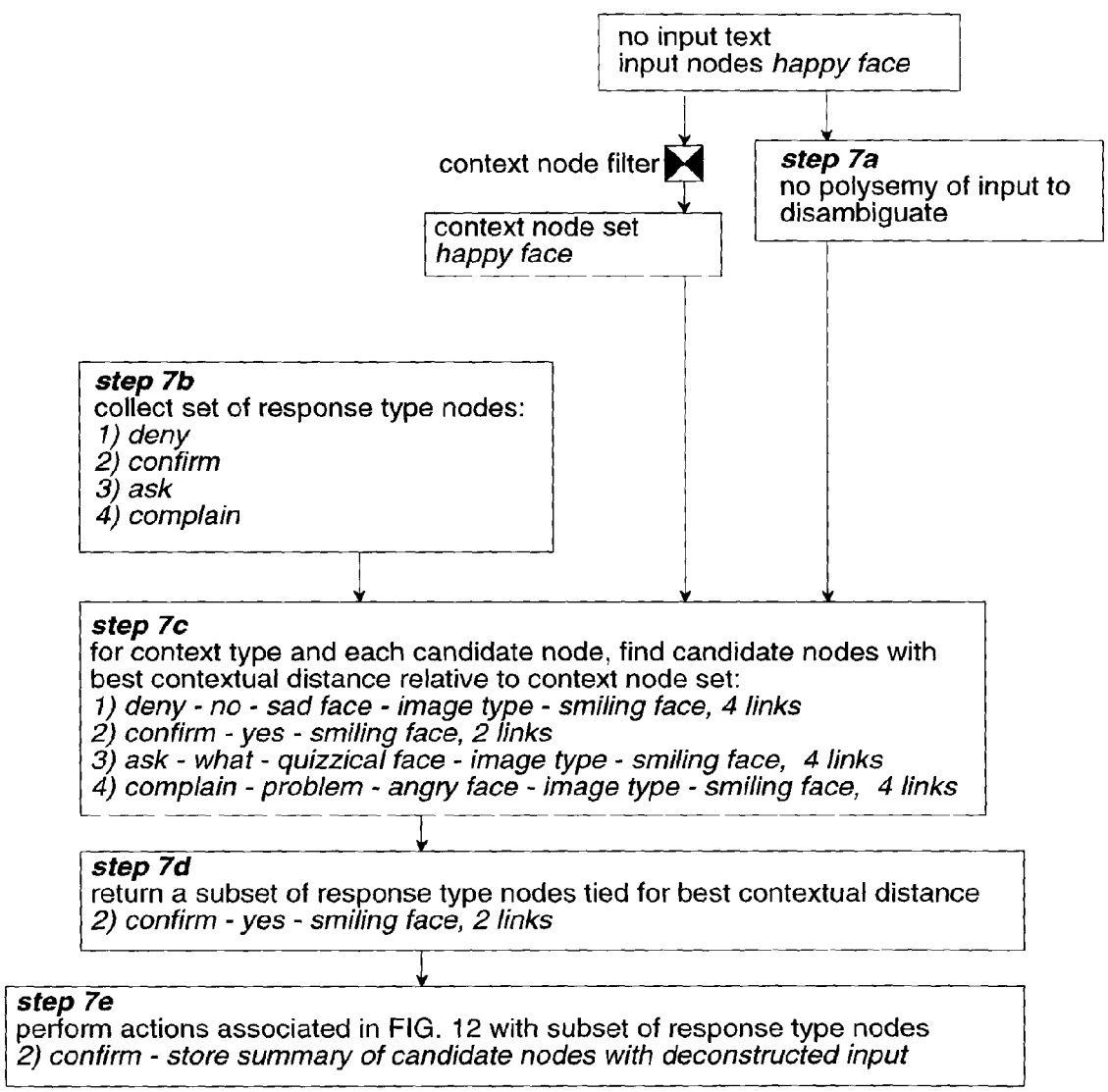
FIG. 19 shows an example of a method applicable to step 7 of FIG. 17 to assess a visual response, in accordance with an embodiment of the present invention.

The method in FIG. 18, in accordance with one embodiment of the present invention, is a variation on the topological classification of an input response shown in FIG. 12. The method of FIG. 18 begins with of a set of response nodes in step 7*a*, and, by determining which response type node most closely corresponds to the set of input nodes. The method of FIG. 18 begins by checking for polysemy in the input text. Polysemy can be detected as an input word or input phrase which can be associated with two or more nodes of the same spelling in a semantic network. For instance, the word ugly in the input text of step 6 FIG. 16 can be associated with two nodes both spelled 'ugly' in FIG. 11: ugly:1 and ugly:2. By measuring distances in the semantic network to find the set of nodes with best contextual distance, Step 7c of FIG. 18 disambiguates which of these two nodes is most meaningful in the context of the input. Step 7d returns this set of most meaningful nodes. Step 7e returns to FIG. 12 to perform actions such as storing summaries of candidate nodes of FIG. 12 or dropping the current set of candidate nodes. FIG. 19, in accordance with one embodiment of the present invention, shows an the method of FIG. 18 with a different set of inputs having no text, only an image of a happy face. Since there is no polysemy detected, semantic distances are only compared between candidate nodes and the context node "happy face".

Figure 20:
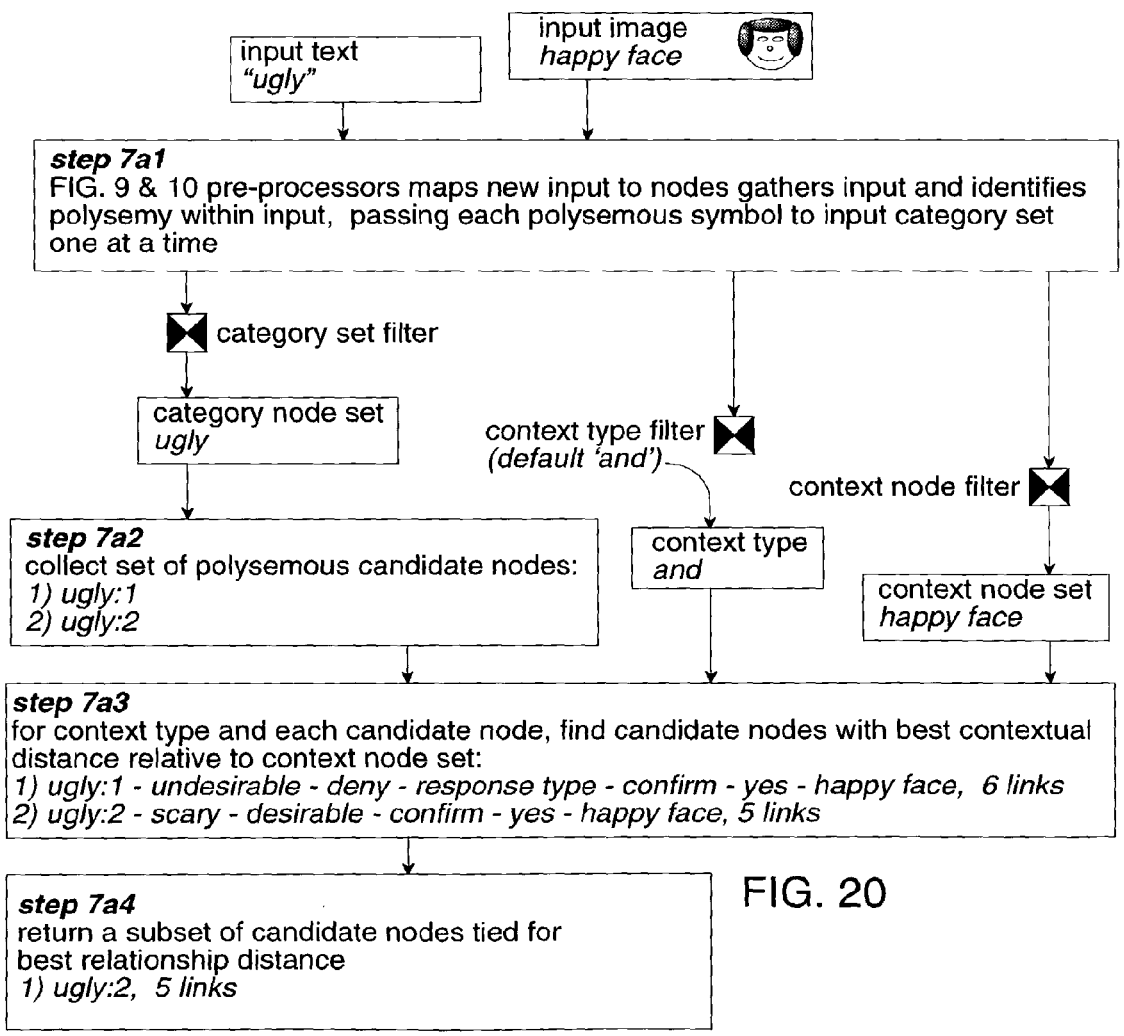
FIG. 20 shows an example of a method for disambiguating the meaning of "ugly" as defined in the semantic network of FIG. 11, from a combination of text and image inputs, in accordance with an embodiment of the present invention.
Figure 21:
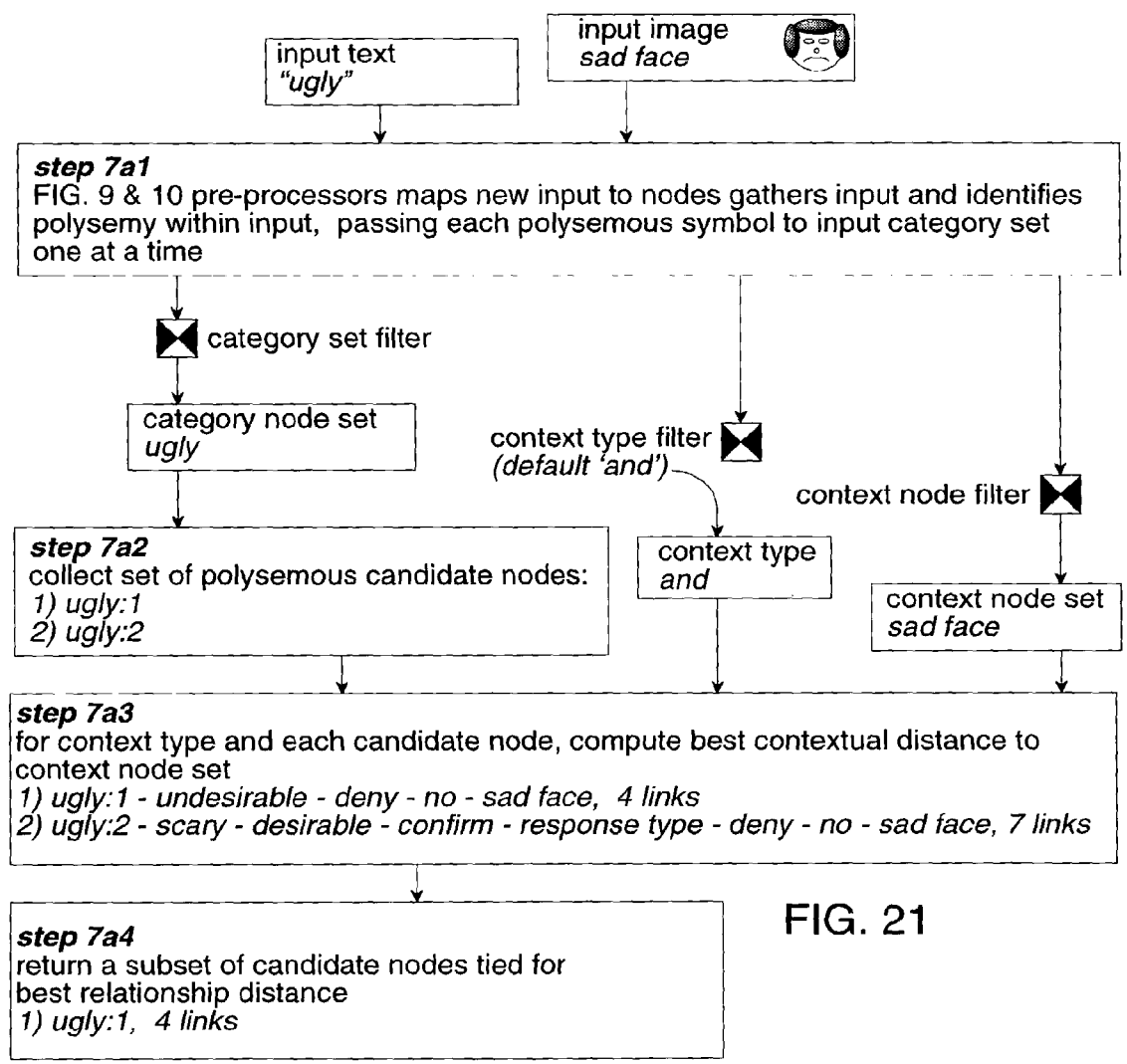
FIG. 21 shows an the example of a method in FIG. 20 for disambiguating the meaning of "ugly" as defined in the semantic network of FIG. 11, from a different combination of text and image inputs, in accordance with an embodiment of the present invention.

FIG. 20, in accordance with one embodiment of the present invention, shows details of step 7a of FIGS. 18 and 19. Similarly to the method of FIG. 12, pre-processors map inputs to nodes and pass these nodes to category set, context type, and context node filters. After filtering, candidate nodes are chosen by which node has the best contextual distance, to disambiguate polysemy by reducing the set of candidate nodes to the subset having best contextual distance. FIG. 20 shows how an input of a happy face maps to a best contextual distance for the candidate node 'ugly:2' which is ugly in the sense of desirable, scary and entertaining. In contrast, FIG. 21, in accordance with one embodiment of the present invention, shows how an input of a sad face maps to a best contextual distance for the candidate node 'ugly:1' which is ugly in the sense of an undesirable toxic substance. FIGS. 19 and 20 show how subtle shades of meaning recorded in the topology of a semantic network guide disambiguation of polysemy, by applying best contextual distance functions.

FIG. 9 through 20 show how the present invention can be used for natural language processing systems engaged in some form of dialog with a user. By repeatedly responding to a user's input while refining a context node set, the conversational context of a dialog can be detected and confirmed. Once a conversational context has been established, other contextually driven meanings can be determined from the stream of a natural language input. The use of a word to refer to a preceding phrase is highly dependent upon context. The grammatical term for this is anaphora. Common examples of anaphora involve the words it and do. For instance in the sentence "The time has come, I know it" the it refers to the phrase "The time has come." In natural language processing anaphora are difficult to map without using contextual clues. Not only key words like he, she, it, do demand mapping, but also his, her, its, was and even ellipsis, where the actual anaphora's key word has been omitted. By leaving out the 'it' the previous example becomes an example of ellipsis combined with anaphora: "The time has come, I know."

Figure 22:
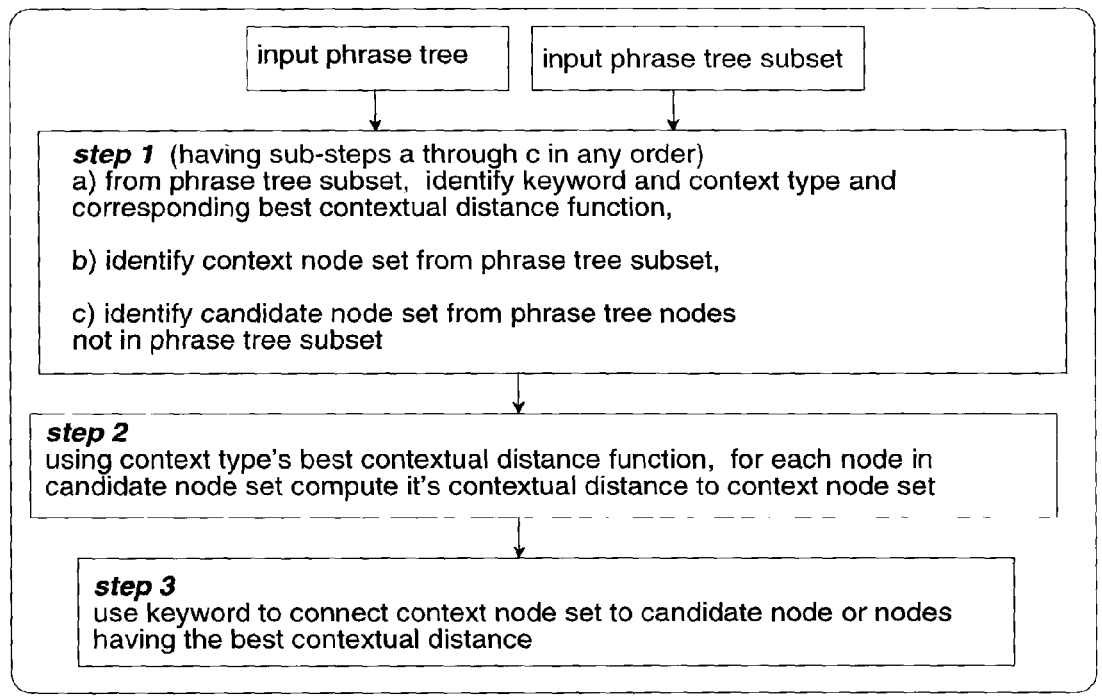
FIG. 22 shows a method for combining topological categorization with topological contextual filtering for connecting phrases to complementary phrases within a parse tree, in accordance with an embodiment of the present invention.

FIG. 22 shows a method for automatically disambiguating anaphora by connecting phrases to the branch of a phrase tree having the best match in term of a contextual distance function, in accordance with one embodiment of the present invention. Unlike the method of FIG. 12, the method of FIG. 22 does not involve user feedback, since it relies upon inputs and context information already established. Thus the method of FIG. 22 can be used for text-stream parsing and automatic summarization and translation of natural language texts. The method of FIG. 22 can also be incorporated into a methods such as FIG. 12 to support a robust parsing of input text.

Figure 23:
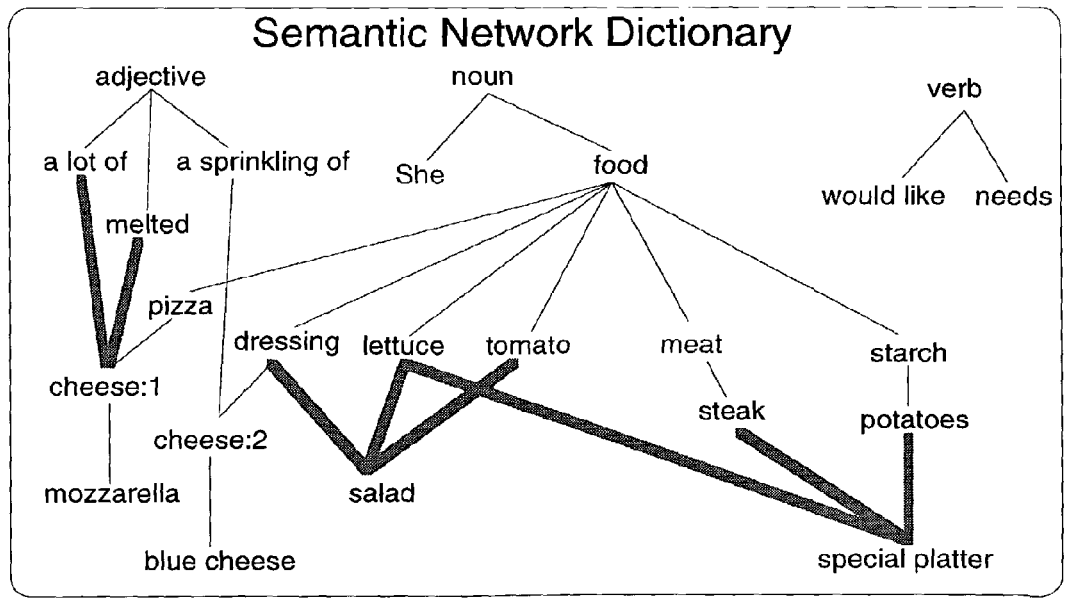
FIG. 23 shows a small semantic network dictionary for storing semantics related to conversations about ordering food in restaurants, in accordance with an embodiment of the present invention.

The method of FIG. 22 begins with inputs of a parsed phrase tree and an anaphora which is a subset of that phrase tree. Similarly to FIG. 11, FIG. 23, in accordance with one embodiment of the present invention, shows a small semantic network from which best contextual distances can be measured for the method of FIG. 22. FIG. 23 contains a dictionary of vocabulary related to ordering food in a restaurant. In step 1a of FIG. 22, as after step 1 of FIG. 12, context type and corresponding best contextual distance functions are identified using filtering or dispatching methods as discussed earlier for FIG. 12. In step 1b of FIG. 22, context node set is identified also using filtering or dispatching methods as discussed in FIG. 12, but in FIG. 22 filters or dispatches from the input phrase tree of nodes rather than an input set of nodes as in FIG. 12.

The method of FIG. 22 resolves anaphora by looking for a best possible branch of the parsed phrase tree to connect to the anaphora subset of the phrase tree. Upon resolution, the anaphora subset will be relocated to link directly to the best possible branch of the phrase tree. Thus the candidate node set in FIG. 22 comes from the set of nodes in the input phrase tree to which the anaphora subset can be connected; the candidate notes are NOT in the anaphora subset. Step 1c identifies these candidate nodes.

Step 2 of FIG. 22 identifies the best candidate branch node of the phrase tree according to the optimal contextual distance function for the context type. As in FIG. 12, the best contextual distance function is chosen according to the table in FIG. 15. For the pronoun keywords 'his', 'her' and the preposition keyword 'and' the best contextual distance function is 'minimum average distance'. In contrast, the prepositional keywords 'not' has the best contextual distance function 'maximum average distance.' FIG. 22 Step 3 reconfigures the phrase tree to connect the anaphora subset to the best candidate node, thus recording the meaning of the anaphora.

Figure 24:
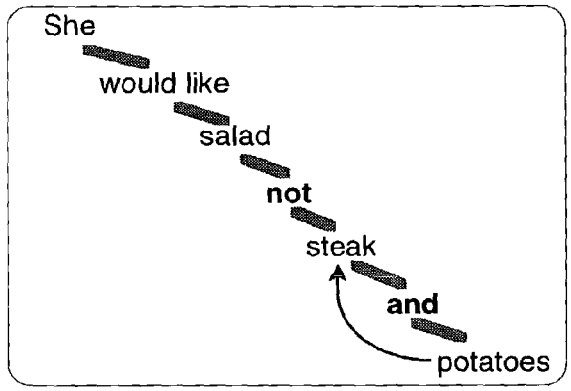
FIG. 24 shows a parse tree created from a sentence "She would like salad and not steak and potatoes, in accordance with an embodiment of the present invention.

FIG. 24 shows a simple phrase tree in which all the nodes are in a single inheritance list, in accordance with one embodiment of the present invention. As an input stream of natural language texts is processed, the structure of the input is often just a list which is then processed into a more detailed tree structure reflecting grammatical and syntactic meanings. FIG. 24 shows an example of the beginning of such a processing operation. Scanning for a keyword from the end of the list, the prepositional keyword 'and' is found. Prepositional keywords such as 'and', 'or' and 'not' are significant because each prepositional phrase must be properly connected to prepositional subject. Other anaphora keywords such as 'his', 'her', 'its' and 'this' or 'that' may also be sought when scanning for keywords. Since these connections are influenced by natural language context, the method of FIG. 22 is used to find the best branch node of the phrase tree for that connection. The anaphoric subset of FIG. 24 thus becomes the phase 'and potatoes' for which the method of FIG. 22 will find a best prepositional subject in terms of a best candidate node.

Figure 25:
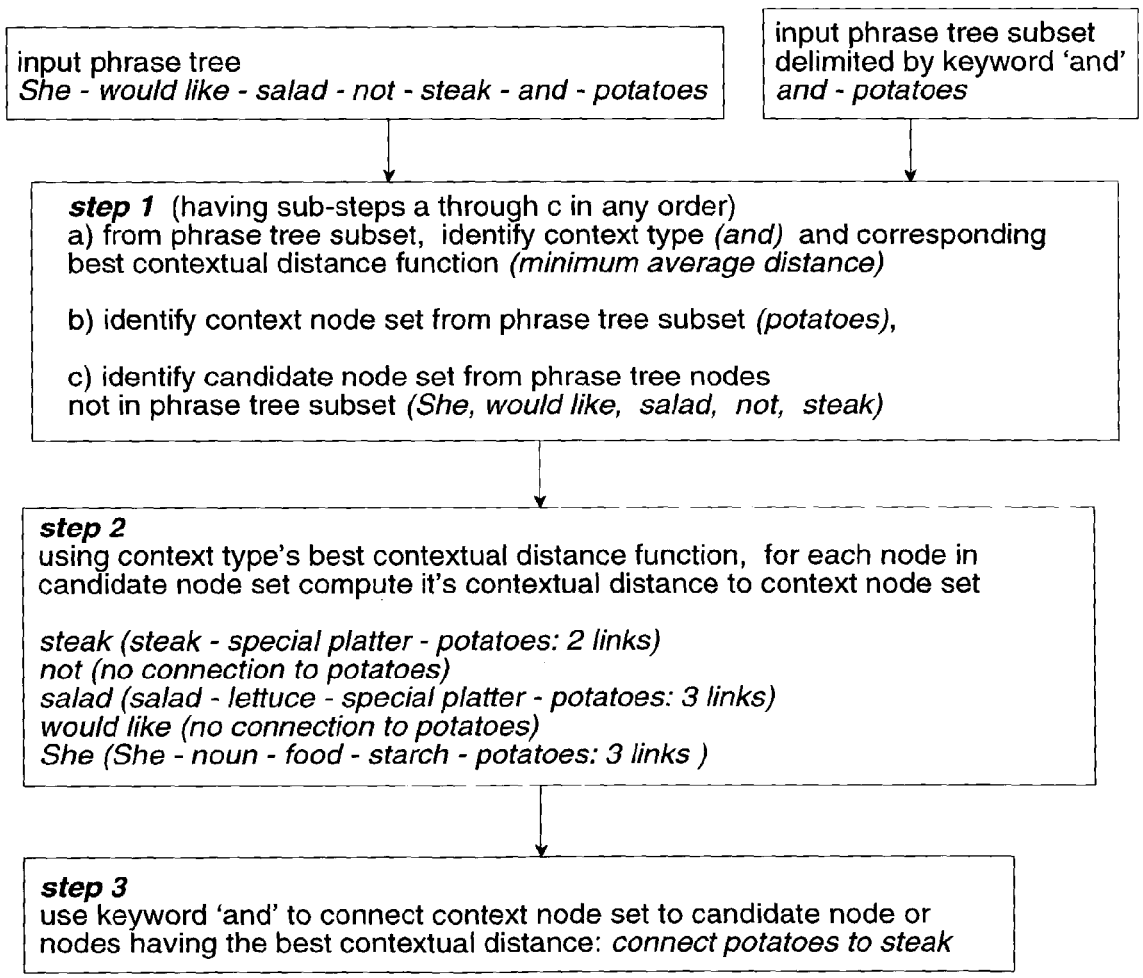
FIG. 25 shows the method of FIG. 22 used in conjunction with the semantic network dictionary of FIG. 23 to process the parse tree of FIG. 24, in accordance with an embodiment of the present invention.

FIG. 25, in accordance with one embodiment of the present invention, shows the method of FIG. 22 applied to the parse tree of FIG. 24. In step 1a of FIG. 25, filtering the input phrase tree subset 'and pototoes' produces the prepositional keyword and context type 'and' and the corresponding best contextual distance function of 'minimum average distance' from the table on FIG. 13. In FIG. 25 step 1b, filtering produces the context node set 'potatotes' In step 1c, the candidate node set is produced from the nodes of the phrase tree which are NOT in the anaphora subset of 'and potatoes'. This candidate nodes of 'She', 'would like', 'salad', 'not' and 'steak' are then measured in step 2 to find the candidate with best average contextual distance to each node in the context node set. In FIG. 25 there is one node in the context set, 'potatoes'. Other drawings will show how more nodes in the context nodes set affects the average best contextual distances measured. In step 3, since according to the semantic network of FIG. 23 the closest contextual distance from potatoes to steak, the anaphora subset of 'and potatoes' is connected to 'steak' in the parse tree.

Figure 26:
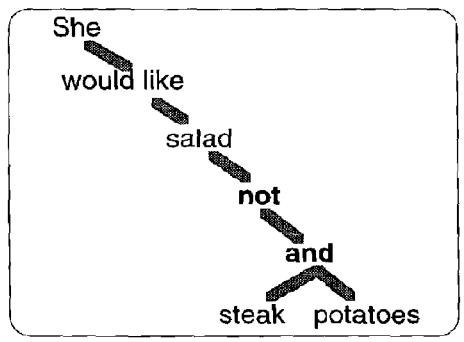
FIG. 26 shows the parse tree of FIG. 24 after processing by the method of FIG. 22 used in conjunction with the semantic network dictionary of FIG. 23, in accordance with an embodiment of the present invention.

FIG. 26, in accordance with one embodiment of the present invention, shows the parse tree of FIG. 24 after reconnecting the anaphora subset of 'and potatoes' to steak. Since the preposition 'and' refers to both steak and potatoes, the keyword 'and' node heads the subtree to which steak and potatoes are connected.

Figure 27:
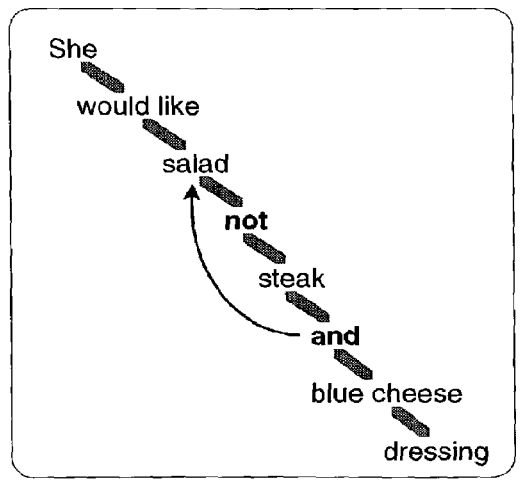
FIG. 27 shows a parse tree created for the sentence "She would like salad not steak and blue cheese dressing," in accordance with an embodiment of the present invention.
Figure 28:
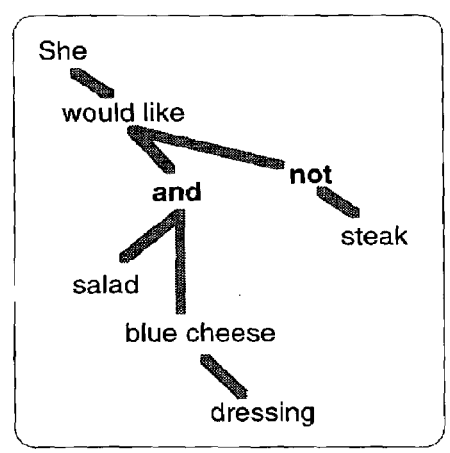
FIG. 28 shows the parse tree of FIG. 27 after processing by the method of FIG. 22 used in conjunction with the semantic network dictionary of FIG. 23, in accordance with an embodiment of the present invention.
Figure 29:
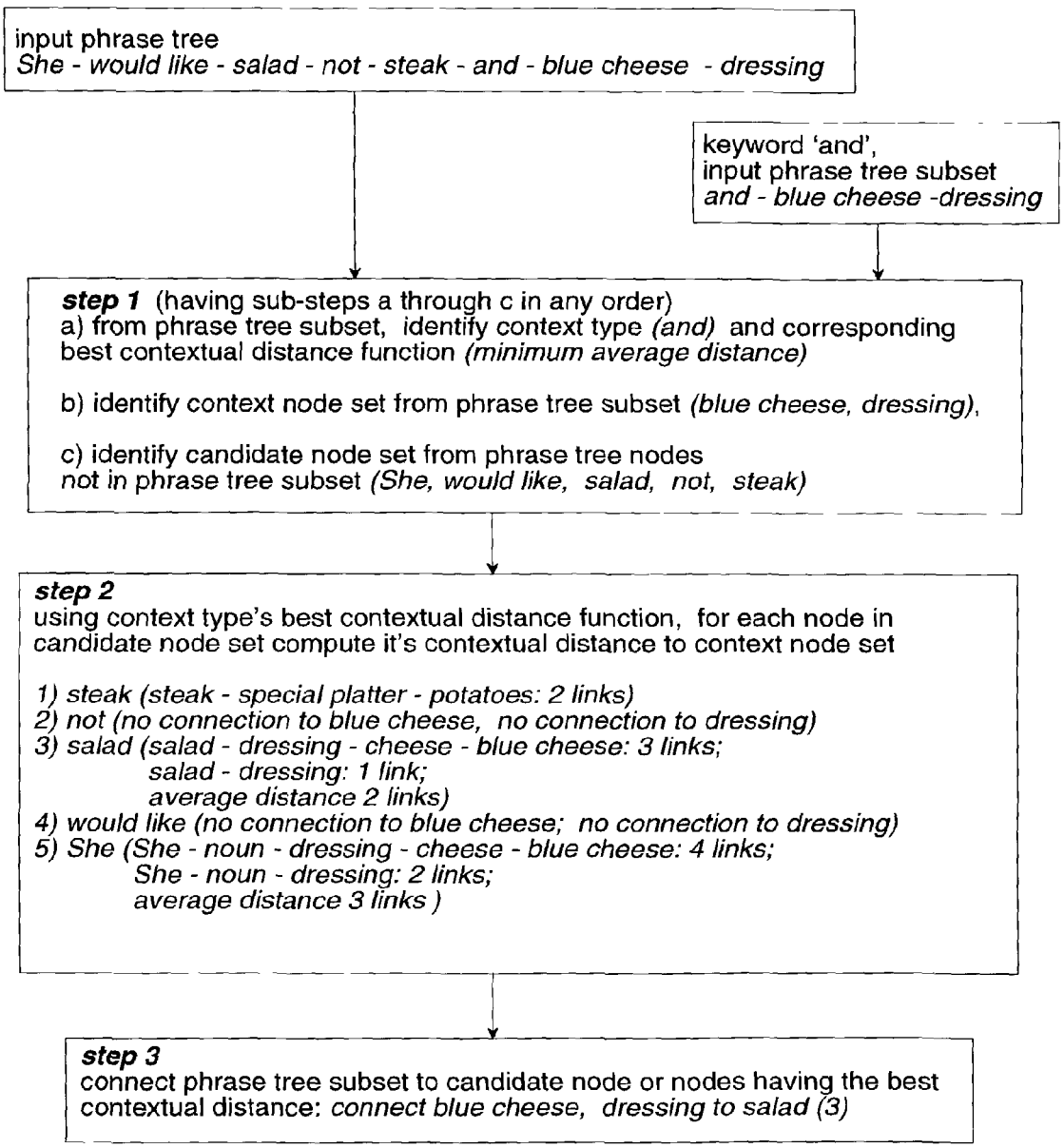
FIG. 29 shows the method of FIG. 22 used in conjunction with the semantic network dictionary of FIG. 23 to process the parse tree of FIG. 27, in accordance with an embodiment of the present invention.

FIG. 27, in accordance with one embodiment of the present invention, shows a contrasting input phrase tree in which 'and blue cheese dressing' is in place of 'and potatoes'. FIG. 28, in accordance with one embodiment of the present invention, shows the method of FIG. 22 applied to the parse tree of FIG. 27 using the same dictionary of FIG. 23. In FIG. 29 shows, in accordance with one embodiment of the present invention, in step 1b the context node set produced consists of two nodes: "blue cheese" and "dressing". In step 3 of FIG. 29, distances to this two node context node set is are evaluated for each of the candidate node. Since the dictionary of FIG. 23 shows that blue cheese and dressing are closer to salad than the other candidates, step 3 connects the anaphora subset phrase "and blue cheese dressing" to "salad". FIG. 28 shows the parse tree of FIG. 27 after step 3 of FIG. 29 has reconnected "salad" and "blue cheese dressing" under the keyword "and".

FIG. 23 shows a semantic network dictionary isolated from the parse trees of FIGS. 24, 26, 27 and 28. Since parse trees contain valuable semantic information, they can be stored directly in a semantic network together with dictionary symbol nodes. By recording how dictionary symbol nodes are actually used in parsed trees, the meaning of dictionary symbol nodes is more complete and up-to-date. At the same time, the meaning of parsed tree nodes is more accurately tied to the dictionary.

Figure 30:
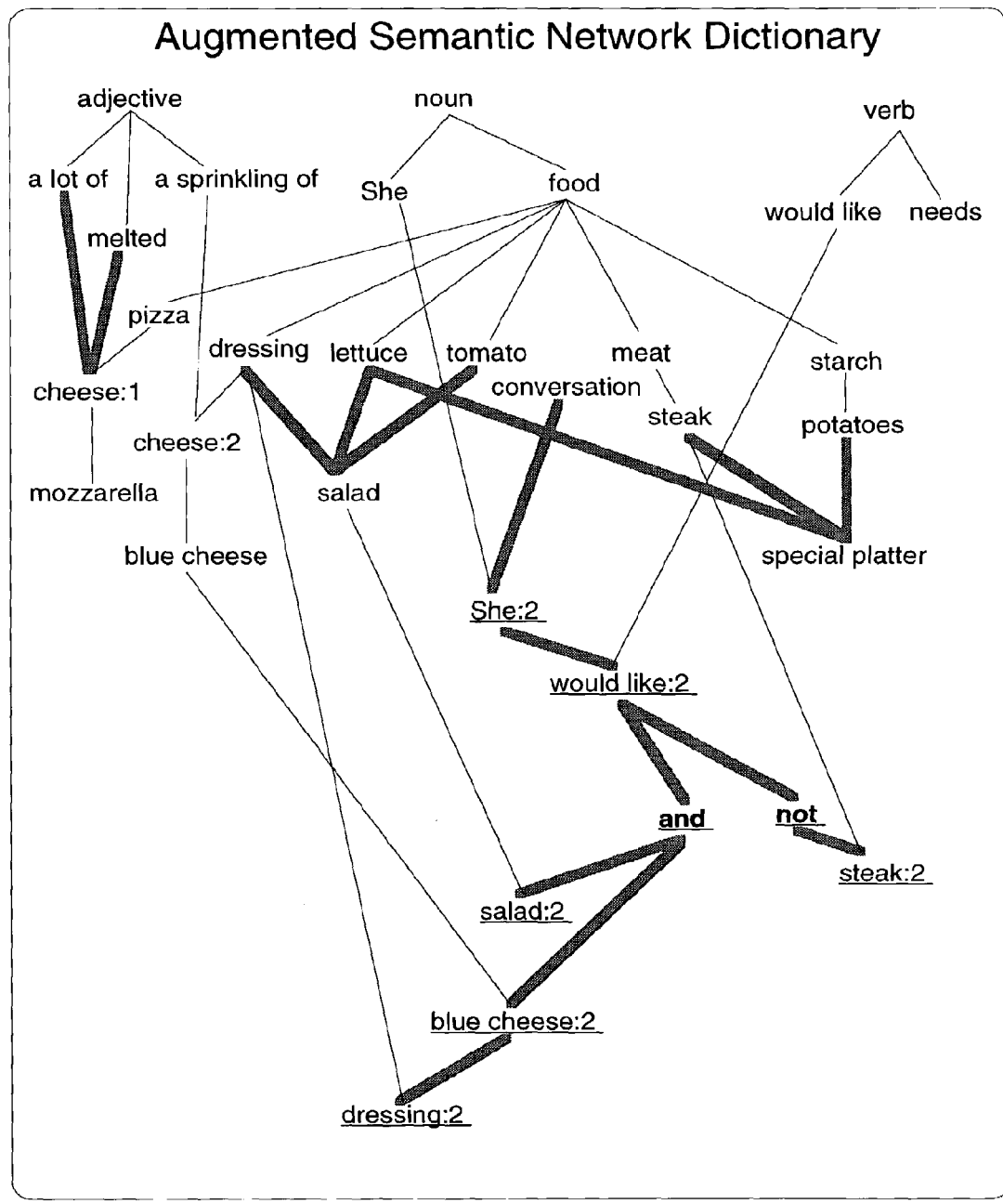
FIG. 30 shows the semantic network dictionary of FIG. 23 after augmentation with nodes from the parse tree of FIG. 28, in accordance with an embodiment of the present invention.

FIG. 30, in accordance with one embodiment of the present invention, shows the semantic network dictionary of FIG. 23 augmented by the parse trees of FIGS. 26 and 28. Since the parse trees of FIGS. 26 and 28 both begin with "She would like", they have been automatically combined under the header 'She would like' to compact their storage. The meaning of the parsed node dressing:2 inherited directly from the dictionary node 'dressing' to record that the parser has successfully disambiguated the meaning of dressing.

By combining parse trees with a dictionary as in FIG. 30, the method of FIG. 22 can adjust automatically to new meanings associated with parsed natural language input. The meaning of subsequent natural language input can be detected using meanings automatically recorded in this way.

Figure 31:
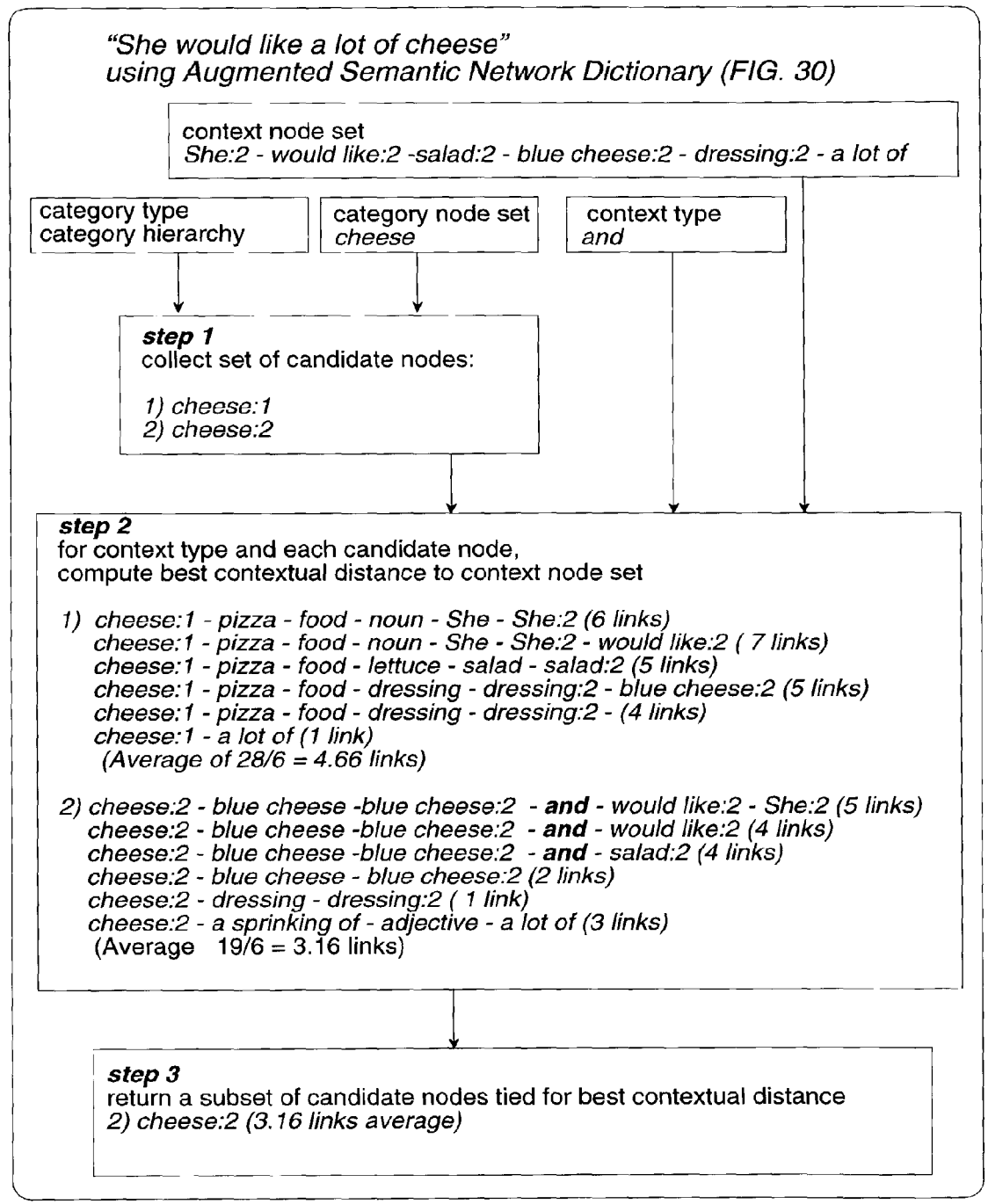
FIG. 31 shows the method of FIG. 22 used in conjunction with the semantic network dictionary of FIG. 30 to parse "She would like a lot of cheese," in accordance with an embodiment of the present invention.
Figure 33:
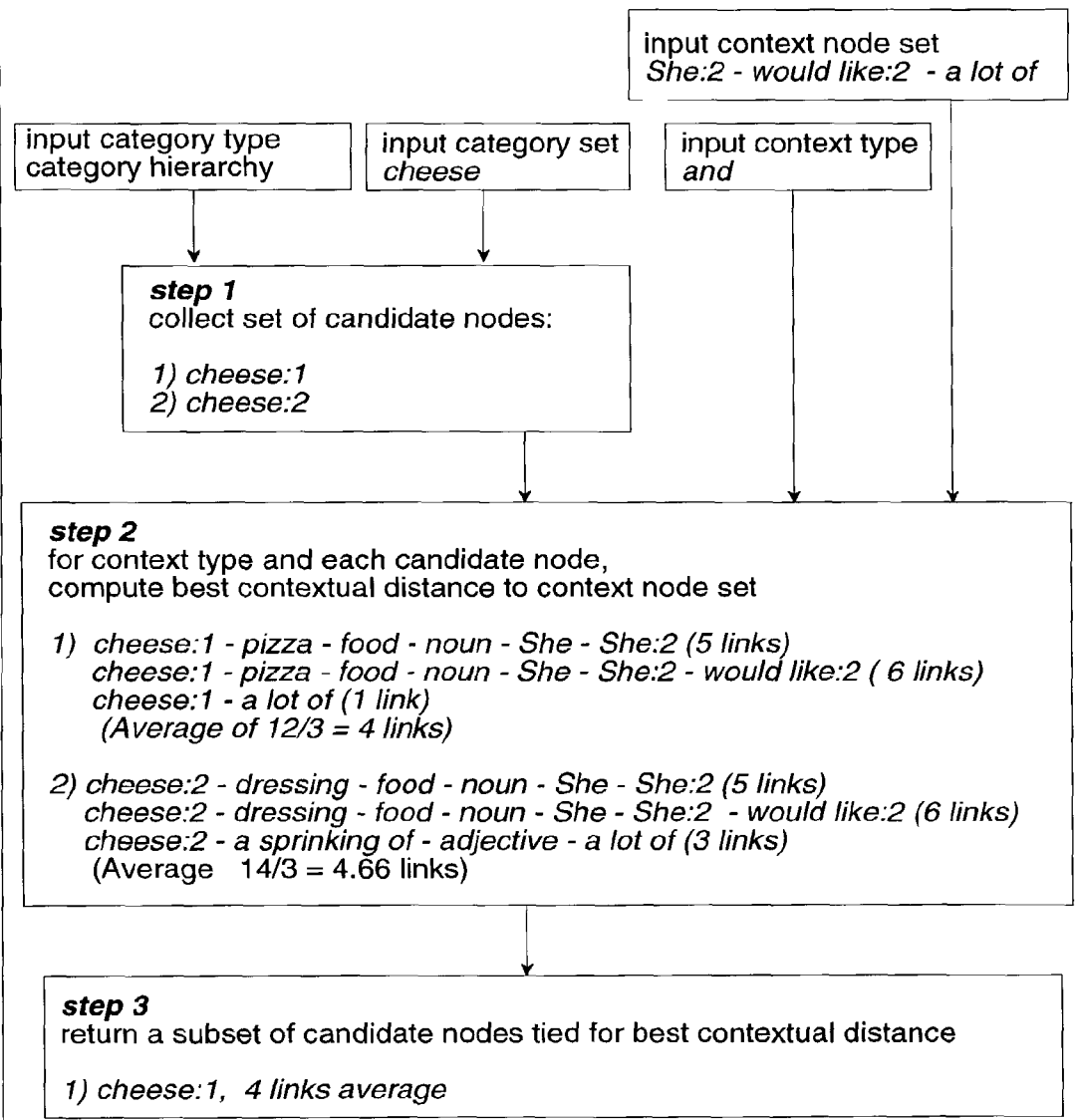
FIG. 33 shows the method of FIG. 22 used in conjunction with the semantic network dictionary of FIG. 32 to disambiguate the meaning of 'cheese,' in accordance with an embodiment of the present invention.

FIG. 31, in accordance with one embodiment of the present invention, shows how meanings automatically recorded in FIG. 30 are useful when processing subsequent natural language text. Using the same method steps outlined by FIG. 22 and using the semantic network of FIG. 30, the natural language input text of "She would like a lot of cheese" correctly maps the meaning of cheese to cheese:2 in the dictionary of FIG. 30. Cheese:2 is the cheese which more closely associated with salad dressing, as opposed to cheese:1 which is associated with pizza. In contrast, FIG. 33, in accordance with one embodiment of the present invention, shows the same natural language input text of "She would like a lot of cheese" and same method steps outlined by FIG. 22 but using the semantic network of FIG. 23. The meaning of cheese is correctly mapped to cheese:1 in FIG. 33 because cheese:1 of a pizza is more closely associated with 'a lot of' in the dictionaries of FIGS. 23 and 30.

Figure 32:
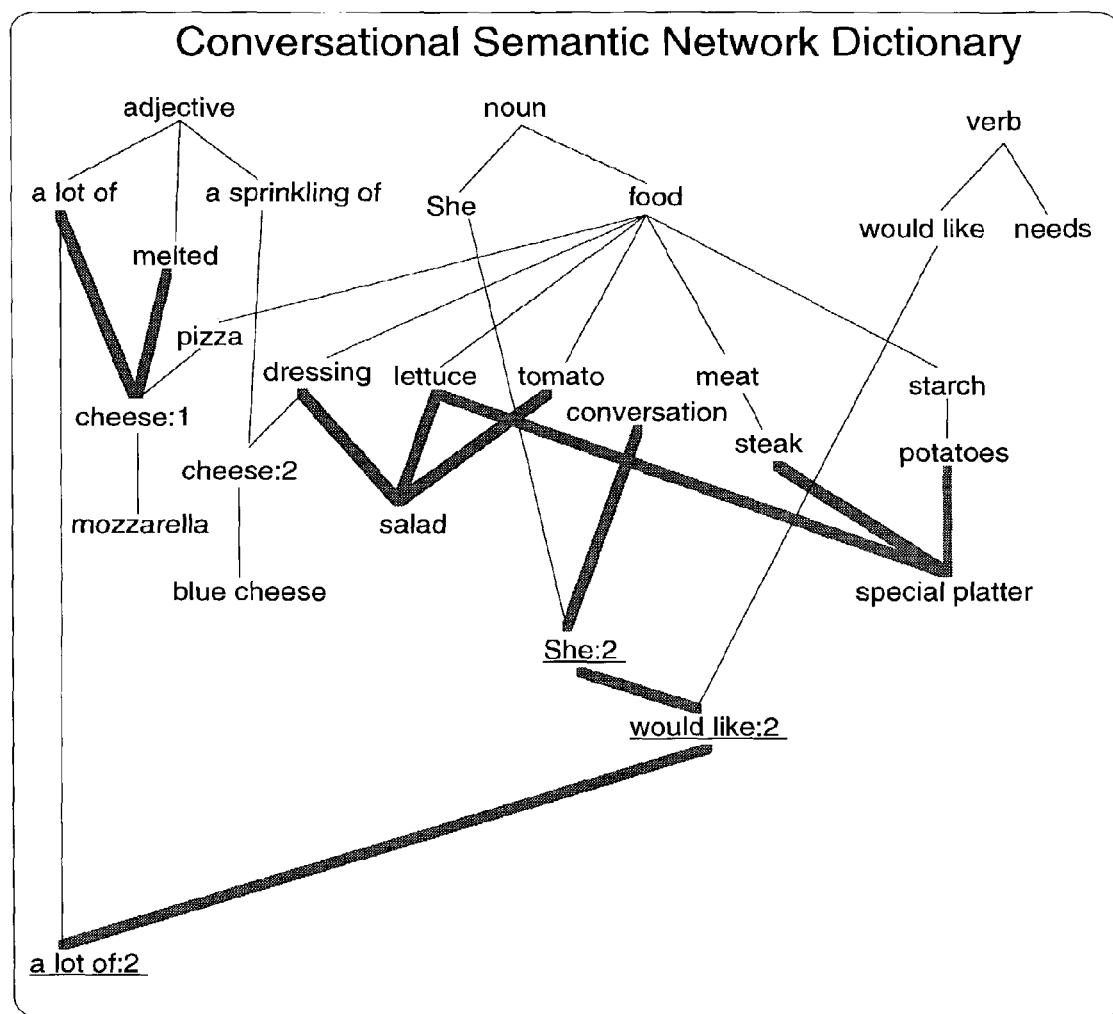
FIG. 32 shows the semantic network dictionary of FIG. 23 after augmentation with nodes from a parse tree created by parsing "She would like a lot of," in accordance with an embodiment of the present invention.

As an alternative to the semantic network dictionary of FIG. 30, FIG. 32, in accordance with one embodiment of the present invention, shows the semantic network dictionary of FIG. 23 after adding parsed nodes from the input phrase "She would like a lot of cheese." FIG. 32 shows how differently the meaning of the parsed nodes She:2 and 'would like:2' are recorded when the input "She would like a lot of cheese" precedes "She would like salad not steak and potatoes." As parsed nodes accumulate in a semantic network dictionary, the present invention uses them to more accurately attribute meanings to subsequent natural language input. However, if too many parsed nodes accumulate, their topology needs to be compacted. General methods for compacting them are outlined in patent application Ser. No. 09/085,830. Specific methods for compacting parsed nodes are outlined in drawing FIGS. 43 through 60 in the present invention.

Figure 34:
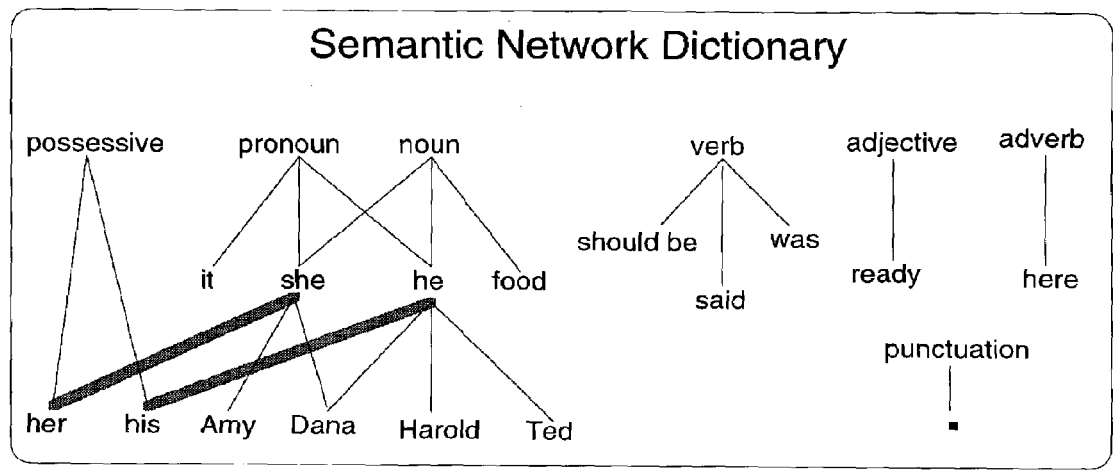
FIG. 34 shows a small semantic network dictionary for storing semantics related to pronouns, in accordance with an embodiment of the present invention.
Figure 35:
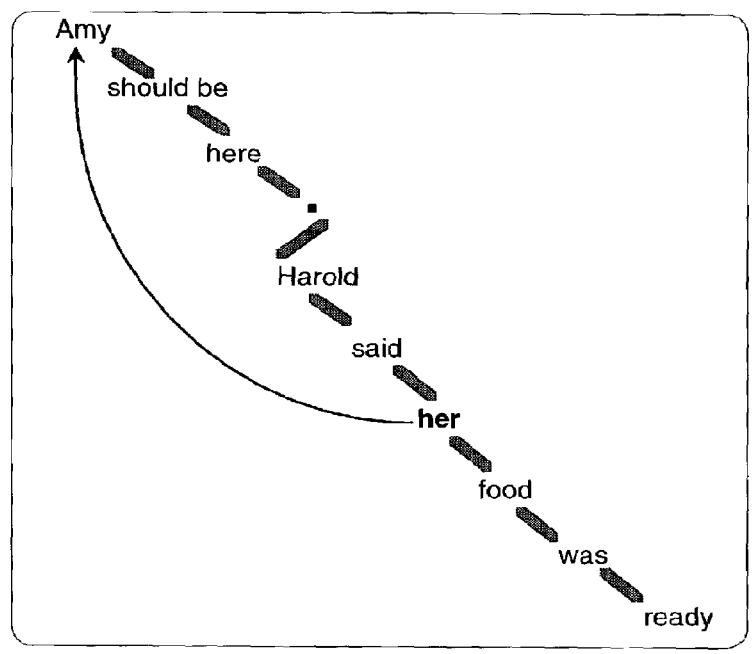
FIG. 35 shows a parse tree created for the sentences "Amy should be here. Harold said her food was ready," in accordance with an embodiment of the present invention.
Figure 36:
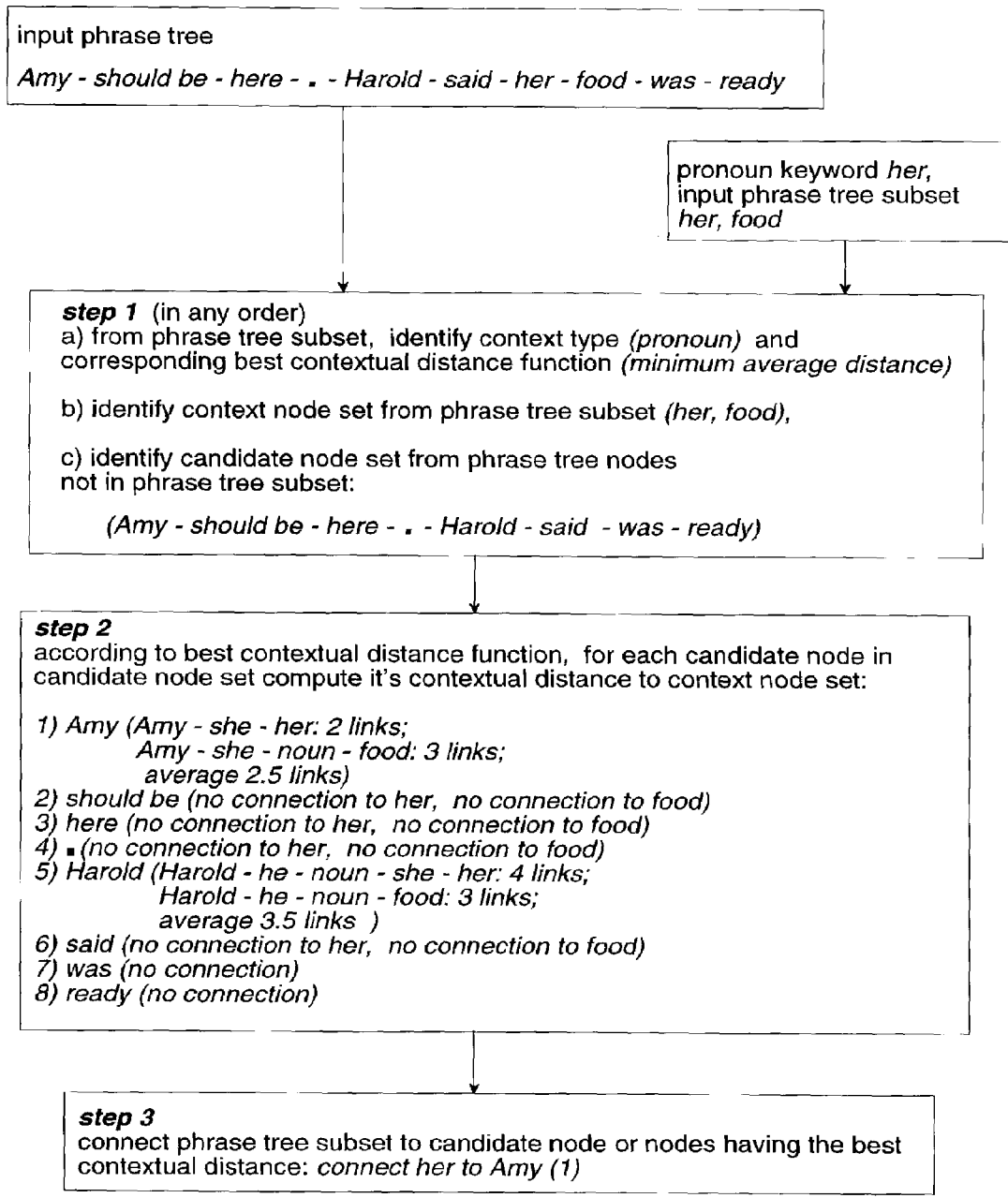
FIG. 36 shows the method of FIG. 22 used in conjunction with the semantic network dictionary of FIG. 34 to disambiguate the meaning of 'her' in the parse tree of FIG. 35, in accordance with an embodiment of the present invention.

Examples using the method of FIG. 22 to disambiguate the meaning of pronoun anaphora are shown in FIG. 34 through 38, in accordance with one embodiment of the present invention. In FIG. 34, a small semantic network dictionary is shown. FIG. 35 shows an input parse tree in the form of a list, in which the anaphora pronoun keyword 'her' has been marked to delimit the start of an anaphora subset phrase of 'her food'. The other delimiter is the verb 'was' which marks the end of the anaphora subset phrase. FIG. 36 shows how the steps of FIG. 22 can be used with the dictionary of FIG. 34 to map the anaphora subset of 'her food' to best branch node of FIG. 35. Since the name 'Amy' is closer to 'her' in the dictionary than the other candidates of 'should be', 'here', '.', 'Harold', 'said', 'was' and 'ready', step 3 reconnects 'her' and 'food' to 'Amy'.

Figure 37:
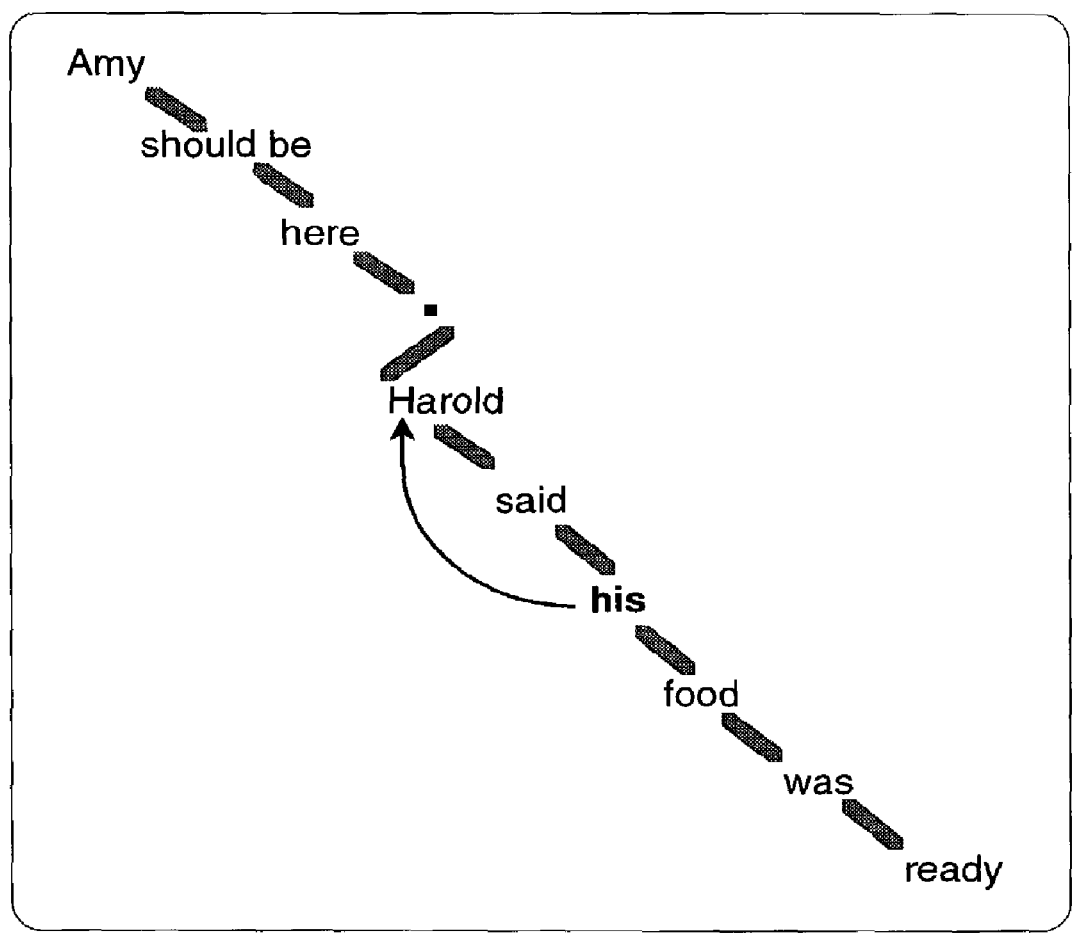
FIG. 37 shows a parse tree created for the sentences "Amy should be here. Harold said his food was ready," in accordance with an embodiment of the present invention.
Figure 38:
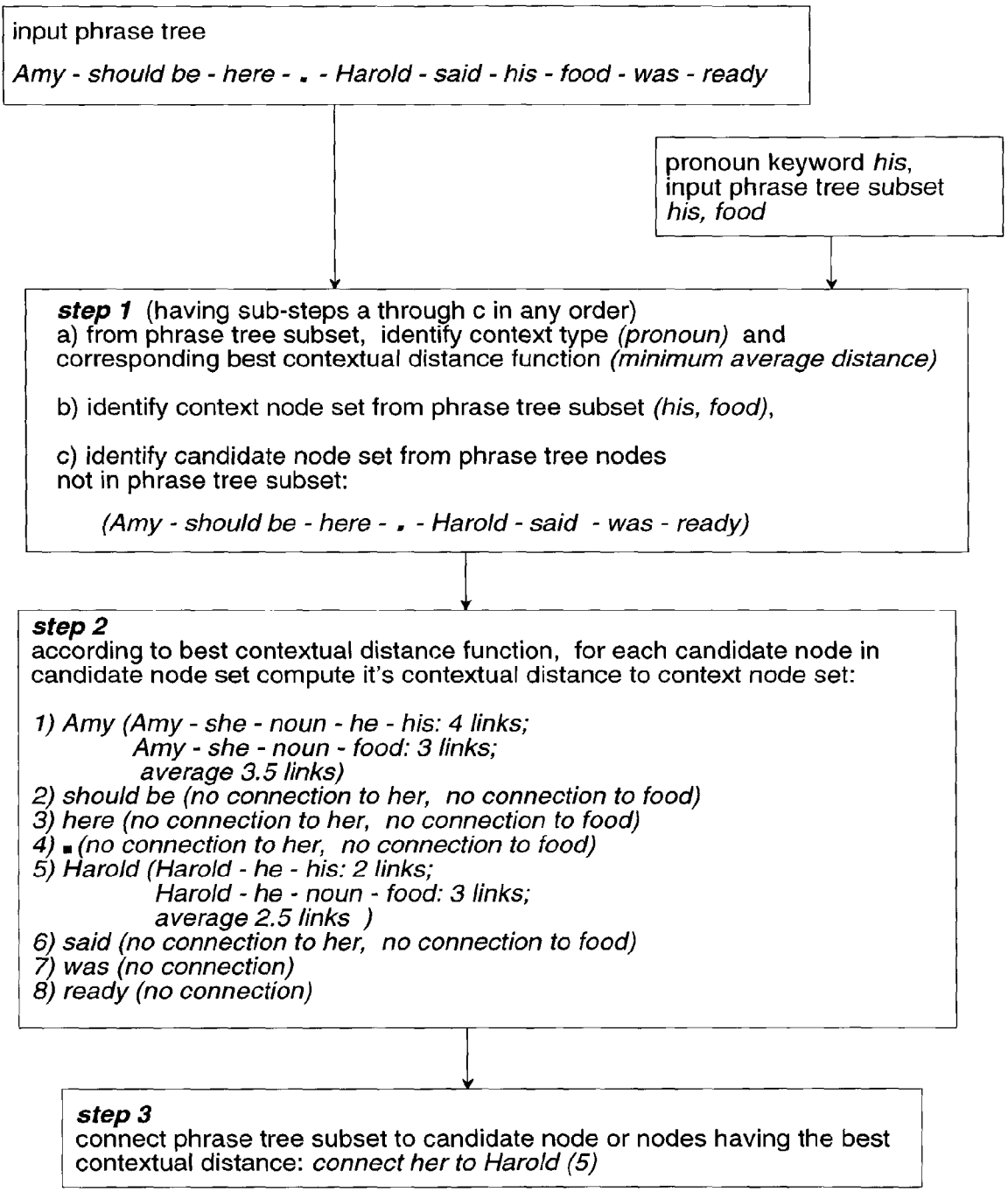
FIG. 38 shows the method of FIG. 22 used in conjunction with the semantic network dictionary of FIG. 34 to disambiguate the meaning of 'his' in the parse tree of FIG. 37, in accordance with an embodiment of the present invention.

In contrast, FIG. 37 shows an input parse tree in the form of a list, in which the anaphora pronoun keyword 'his' has been marked to delimit the start of an anaphora subset of 'his food'. The other delimiter is the verb 'was' which marks the end of the anaphora subset phrase. FIG. 38 shows the steps of the method in FIG. 22 used with the dictionary of FIG. 34 and the input phrase tree of FIG. 37. Since the name 'Harold' is closer to 'his' in the dictionary than the other candidates of 'Amy', 'should be', 'here', '.', 'Harold', 'said', 'was' and 'ready', FIG. 38 step 3 reconnects 'his' and 'food' to 'Harold'.

Figure 39:
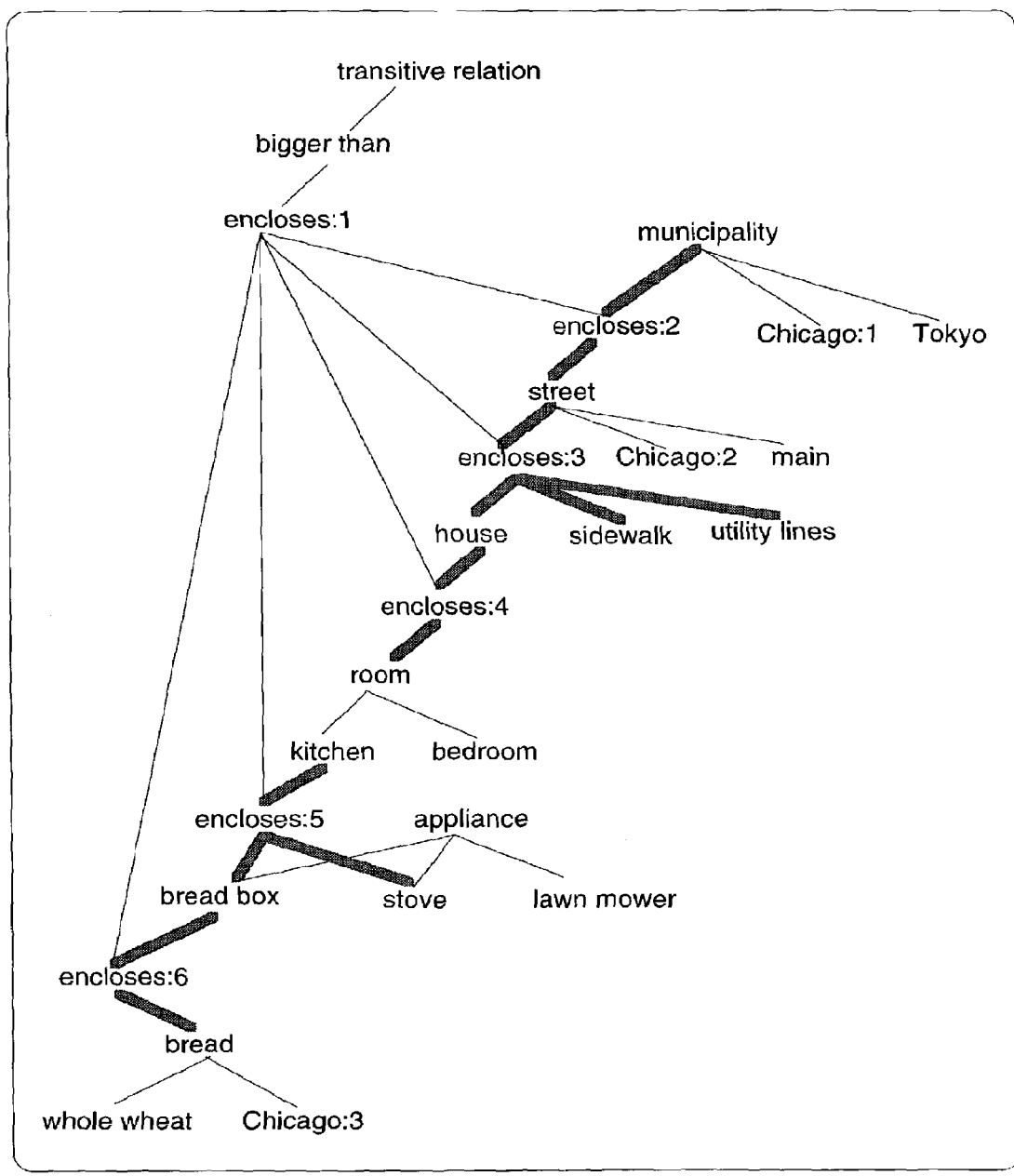
FIG. 39 shows a small semantic network dictionary for storing semantics related to the transitive relation of 'bigger than,' in accordance with an embodiment of the present invention.
Figure 40:
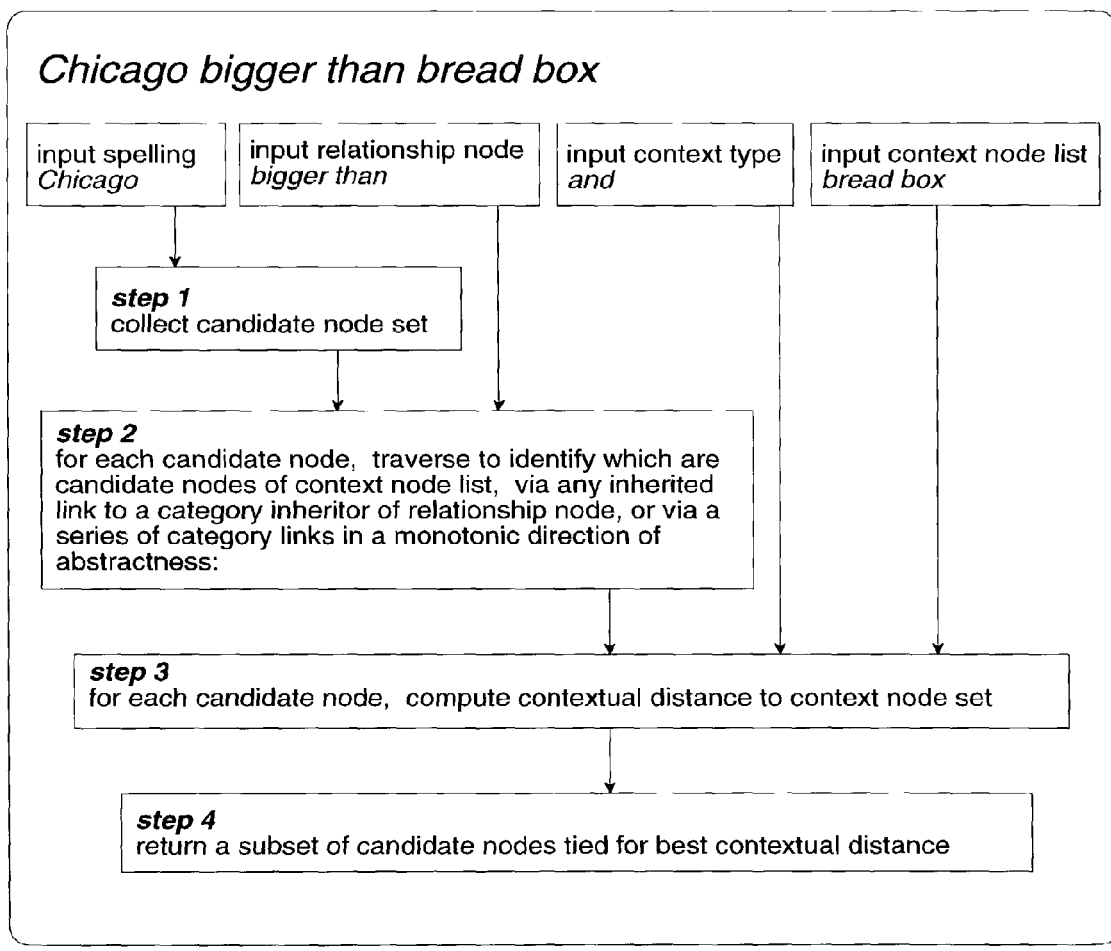
FIG. 40 shows a variation of the method of FIG. 12, amended to categorize nodes by spelling and by a complex traversal function, to disambiguate the meaning of "Chicago bigger than a bread box?", in accordance with an embodiment of the present invention.

FIG. 39, in accordance with one embodiment of the present invention, shows a small semantic network dictionary emphasizing how long chains of categorization hierarchy links can classify various meanings for the symbol 'Chicago'. FIG. 40, in accordance with one embodiment of the present invention shows a variation of the method of FIG. 12, amended to categorize nodes by spelling and by a complex traversal function, to disambiguate the meaning of the phrase "Chicago bigger than a bread box?"

Figure 41:
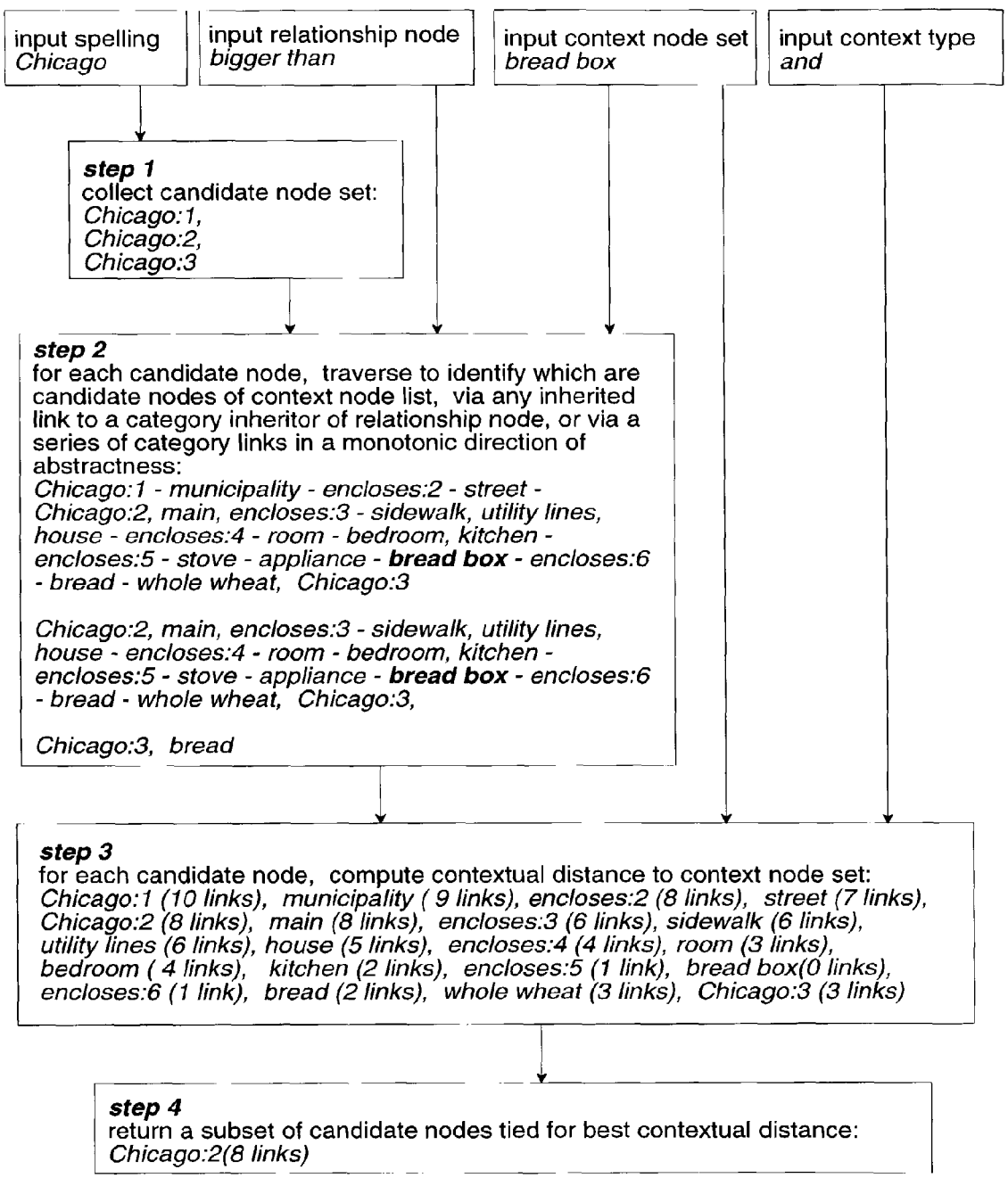
FIG. 41 shows the method of FIG. 40 used in conjunction with the semantic network dictionary of FIG. 39 to disambiguate the meaning of 'Chicago' in "Chicago bigger than a breadbox?", in accordance with an embodiment of the present invention.

Step 2 of FIG. 40 describes the complex traversal function, which travels long chains of categorization hierarchy links to retrieve a set of candidate nodes. These candidate nodes are compared using a best contextual distance function as in FIG. 12. FIG. 41, in accordance with one embodiment of the present invention is an example of how the method of FIG. 40 can be used to map candidates of Chicago:1, Chicago:2 and Chicago:3 to a context node set of "bread box", correctly identifying Chicago:2 as the best meaning of Chicago in "Chicago bigger than bread box."

As shown earlier, in FIG. 30, a semantic network dictionary combined from dictionary node symbols and parsed natural language node symbols can be used to automatically add parsed semantic information to a large semantic dictionary. When a large number of parsed natural language nodes is added to a dictionary, the topology of the dictionary grows irregular and often repeats the same parse tree fragments. To compact the dictionary, FIG. 43, in accordance with one embodiment of the present invention, shows a method to convert parsed node subtrees to corresponding is-a link dictionary nodes. In accordance with one embodiment of the present invention, Is-a links are standard classification hierarchy links, shown as narrow black lines in FIG. 44, as opposed to the more vague 'informs' links shown as wide gray lines in FIG. 44. In step 1 of FIG. 43, parse trees marked for compaction are detected by their inheritance link to the key node 'inversion' (shown in bold). In step 2 of FIG. 43, the subjects of these parse tree are marked, and semantic links to the subjects are reconfigured to inherit from the predicate via direct is-a link. Since the parse tree has now been recorded as a standard dictionary node, step 3 of FIG. 43 deletes the redundant nodes from the parse tree to compact the semantic network. Step 3 then returns to steps 1 as a loop, to automatically compact other parse trees.

Figure 44:
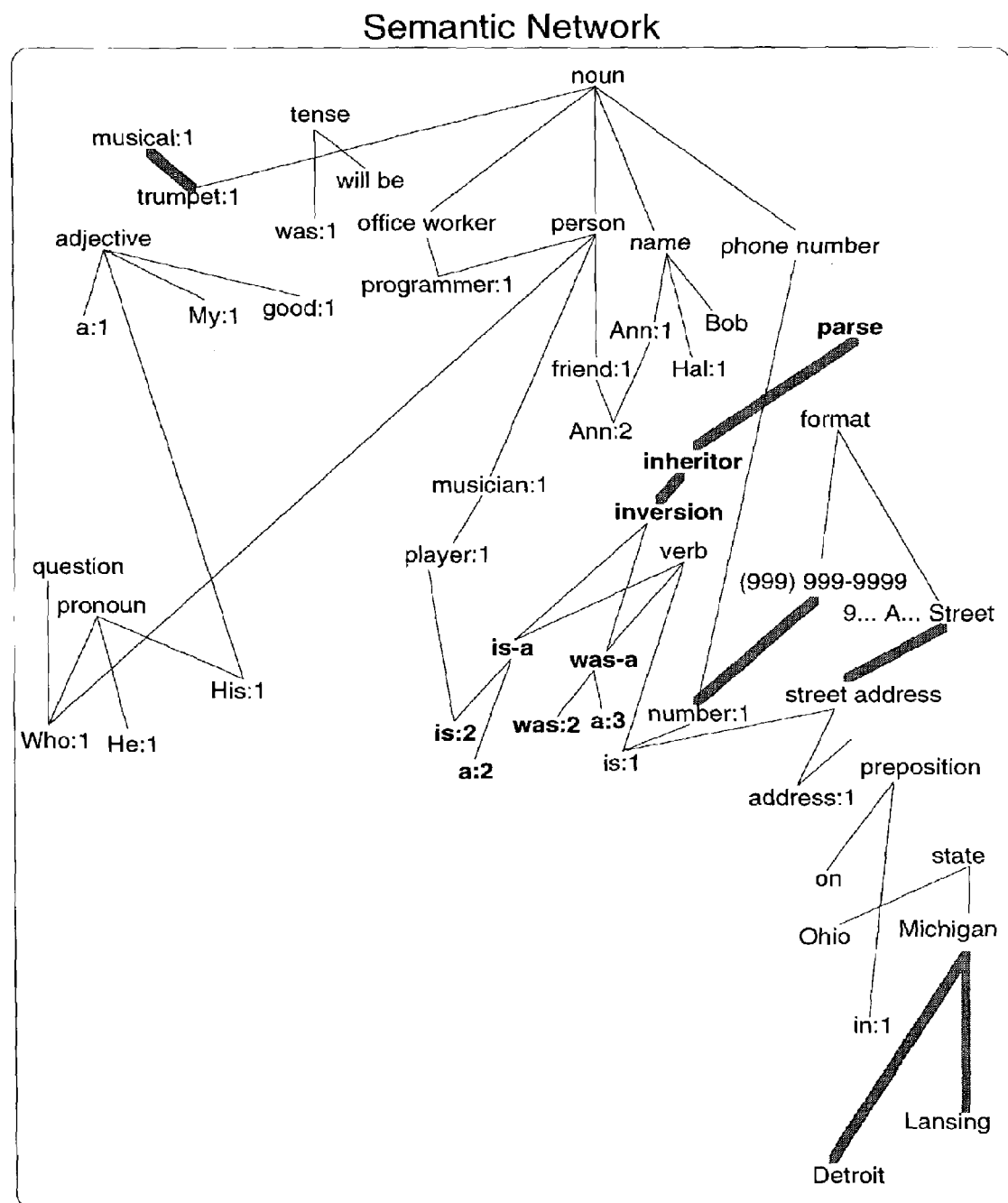
FIG. 44 shows a small semantic network for storing semantics related to personal address book information, in accordance with an embodiment of the present invention.
Figure 45:
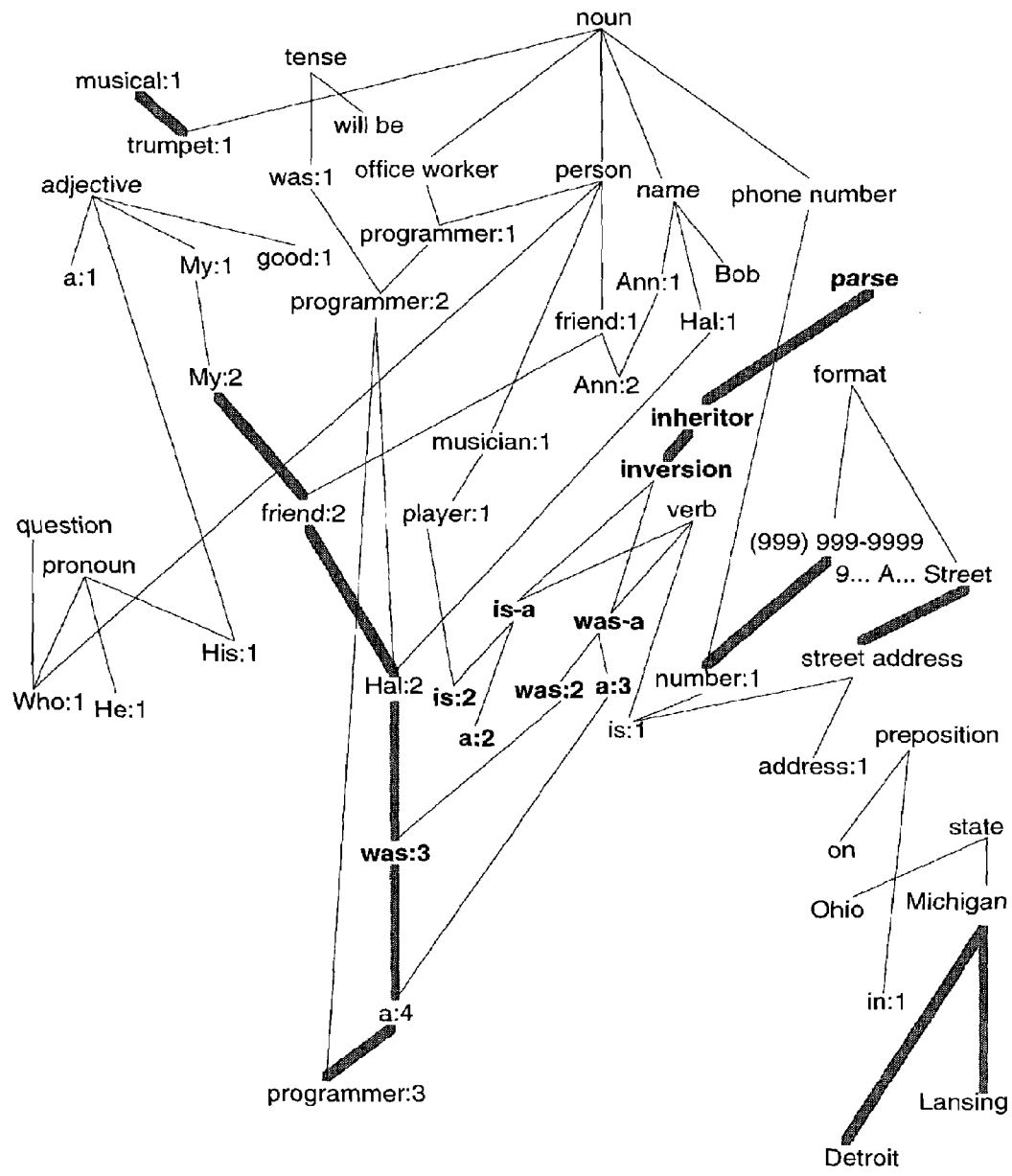
FIG. 45 shows the semantic network of FIG. 44 augmented by the first sentence of the dialog in FIG. 42, after applying step 1 of FIG. 43, in accordance with an embodiment of the present invention.

FIG. 42, in accordance with one embodiment of the present invention shows an example of a series of natural language inputs to be recorded by a semantic network by methods of FIG. 22 and FIG. 43. FIG. 44, in accordance with one embodiment of the present invention, shows a small semantic network dictionary for use by methods of FIGS. 22 and 43 to record the inputs shown in FIG. 42. FIG. 45 shows the input sentence "My friend Hal was a programmer" recorded into the semantic network of FIG. 44 by method of FIG. 22. The node was:3 is shown in bold to indicate that it inherits from 'inversion' and therefore will be detected by the method of FIG. 43 for inversion to dictionary format.

Figure 46:
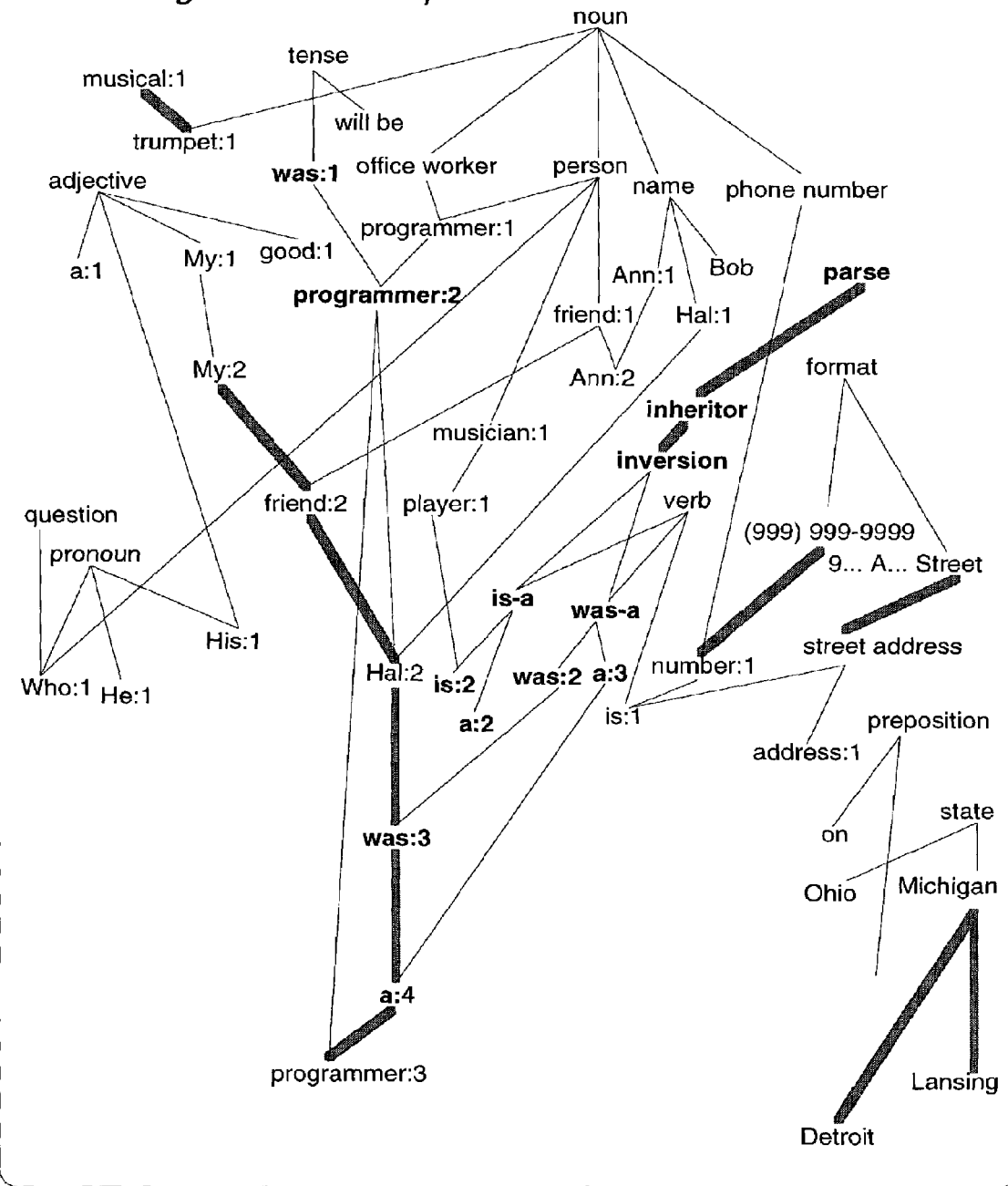
FIG. 46 shows the semantic network of FIG. 45 after applying step 2 of FIG. 43 to create an is-a link between programmer:2 and Hal:2, in accordance with an embodiment of the present invention.
Figure 47:
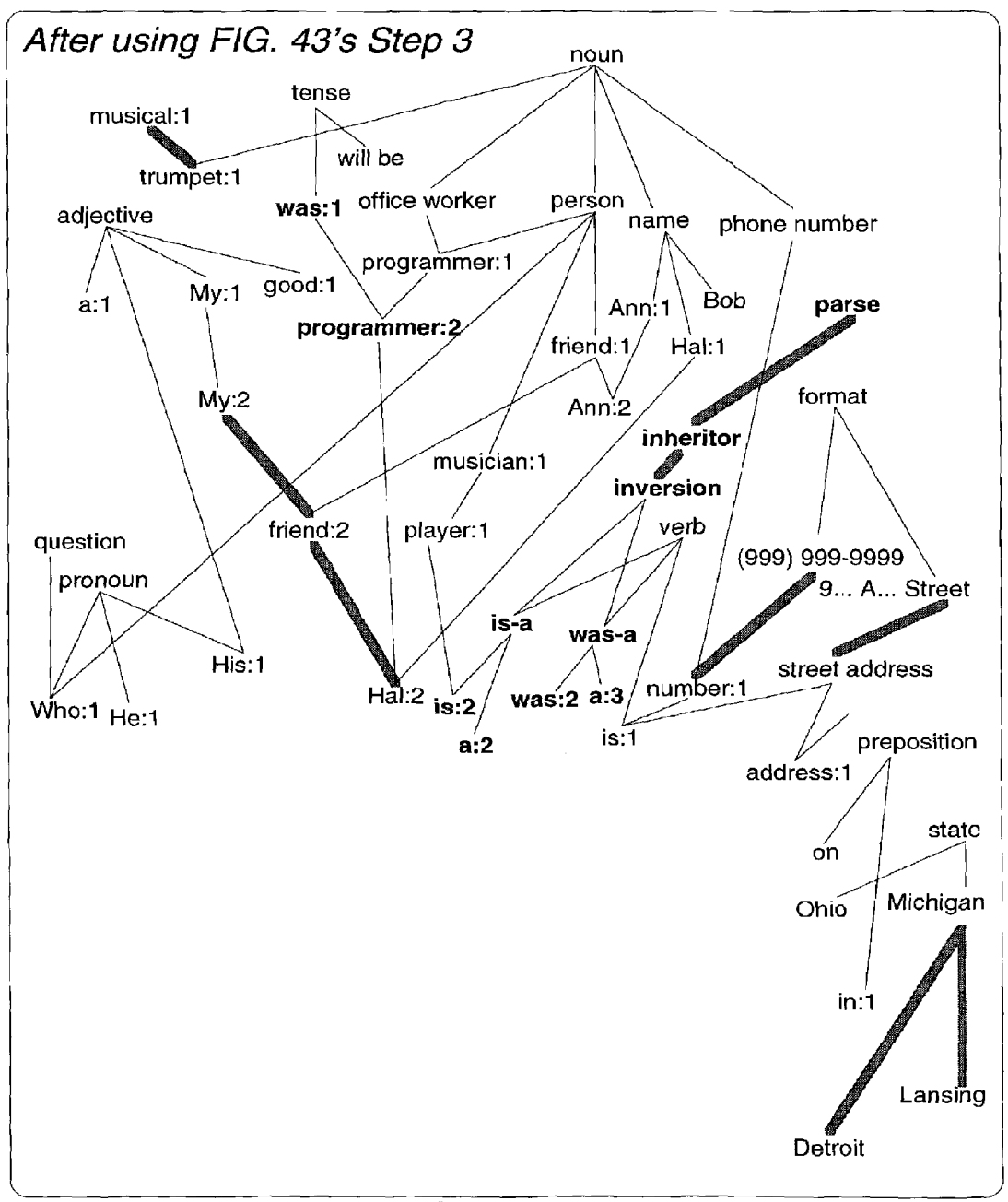
FIG. 47 shows the semantic network of FIG. 46 after applying step 2a of FIG. 43 to remove redundant semantic information, in accordance with an embodiment of the present invention.

FIG. 46, in accordance with one embodiment of the present invention, shows how the subtree of was:3 is inverted to dictionary format node programmer:2 inheriting from was:1 and programmer:1. Since step 1 also links Hal:2 to inherit from programmers, the subtree of was:3 has now been fully inverted to dictionary format. Hal:2 now inherits the meaning of programmer:2 directly from an is-a link, exactly as a standard dictionary node instead of a parse tree node. In FIG. 47, in accordance with one embodiment of the present invention, the redundant subtree nodes was:3, a:4 and programmer:3 nodes are deleted, to compact the semantic network.

Figure 48:
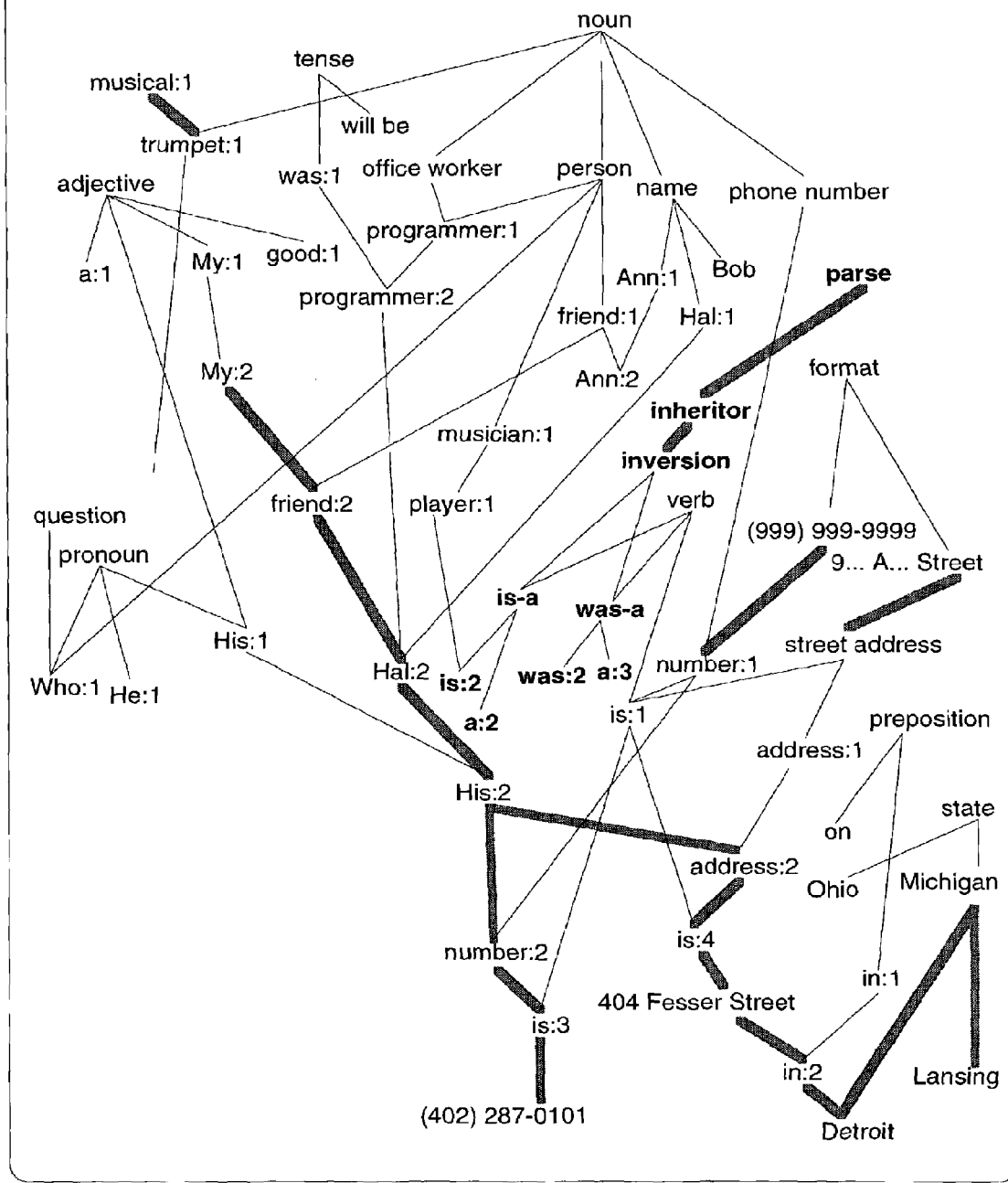
FIG. 48 shows the semantic network of FIG. 47 after applying step 4 after step 3 of FIG. 43 to add semantic information from the second and third sentences of FIG. 42, in accordance with an embodiment of the present invention.

The next two lines of input from FIG. 42 are recorded by the method of FIG. 22 to augment the semantic network of FIG. 47. These inputs are "His number is (402) 287-0101. His address is 404 Fesser Street in Detroit." This augmented semantic network is shown in FIG. 48, in accordance with one embodiment of the present invention. Since number and address as predicate concepts are not intrinsic to their subjects, the is:1 node associated with number:1 and address:1 are do not inherit from 'inversion'. This prevents the method of FIG. 43 from improperly inverting parse node subtrees which inherit from is:1. Since is:1 is closer in the semantic network to number:1 and address:1, the method of FIG. 22 connects the parse node is:4 to is:1 rather than is:2.

Figure 49:
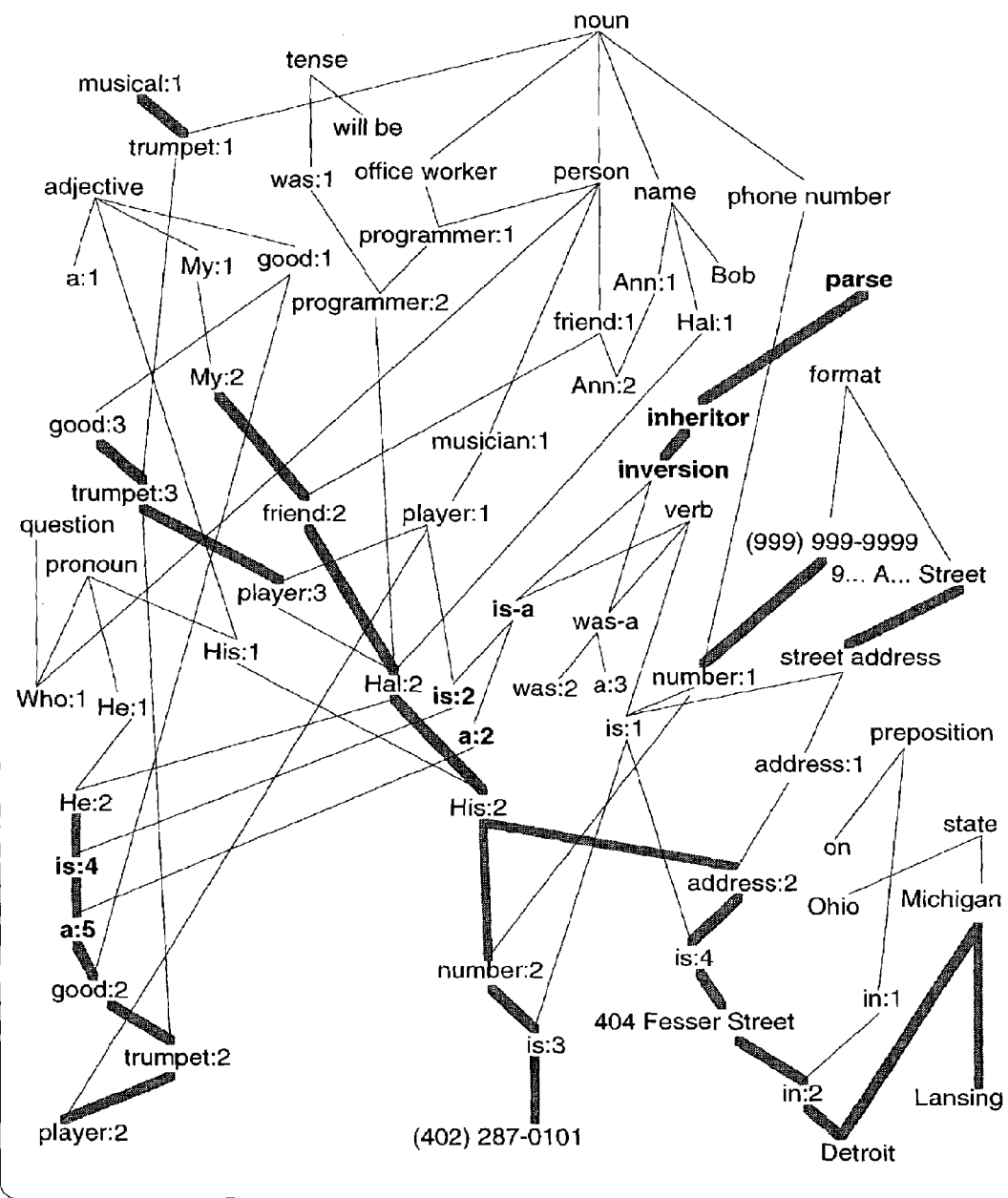
FIG. 49 shows the semantic network of FIG. 48 after applying step 2 of FIG. 43 to copy the new phrase tree's "good trumpet player" portion to be inherited by an is-a link by Hal:2, in accordance with an embodiment of the present invention.

FIG. 49, in accordance with one embodiment of the present invention, shows the semantic network of FIG. 48 after applying the method of FIG. 22 on the fourth input line of FIG. 42: "He is a good trumpet player." Since is:2 is closer to player:1 than is:1 in FIG. 48, the method of FIG. 22 connects the parse node is:5 to is:2 rather than is:1. This permits the method of FIG. 43 to correctly invert the parse node subtree is:5 to standard dictionary node is-a links, shown in FIG. 50.

FIG. 43 through 50, in accordance with one embodiment of the present invention thus show how semantic information can be automatically parsed into standard semantic network dictionary format, to automatically create large semantic network dictionaries without manual intervention by lexicographers and linguists. These labor-saving methods can be extended to also automatically record semantic information contained questions posed to a natural language processor.

Figures 51, 52:
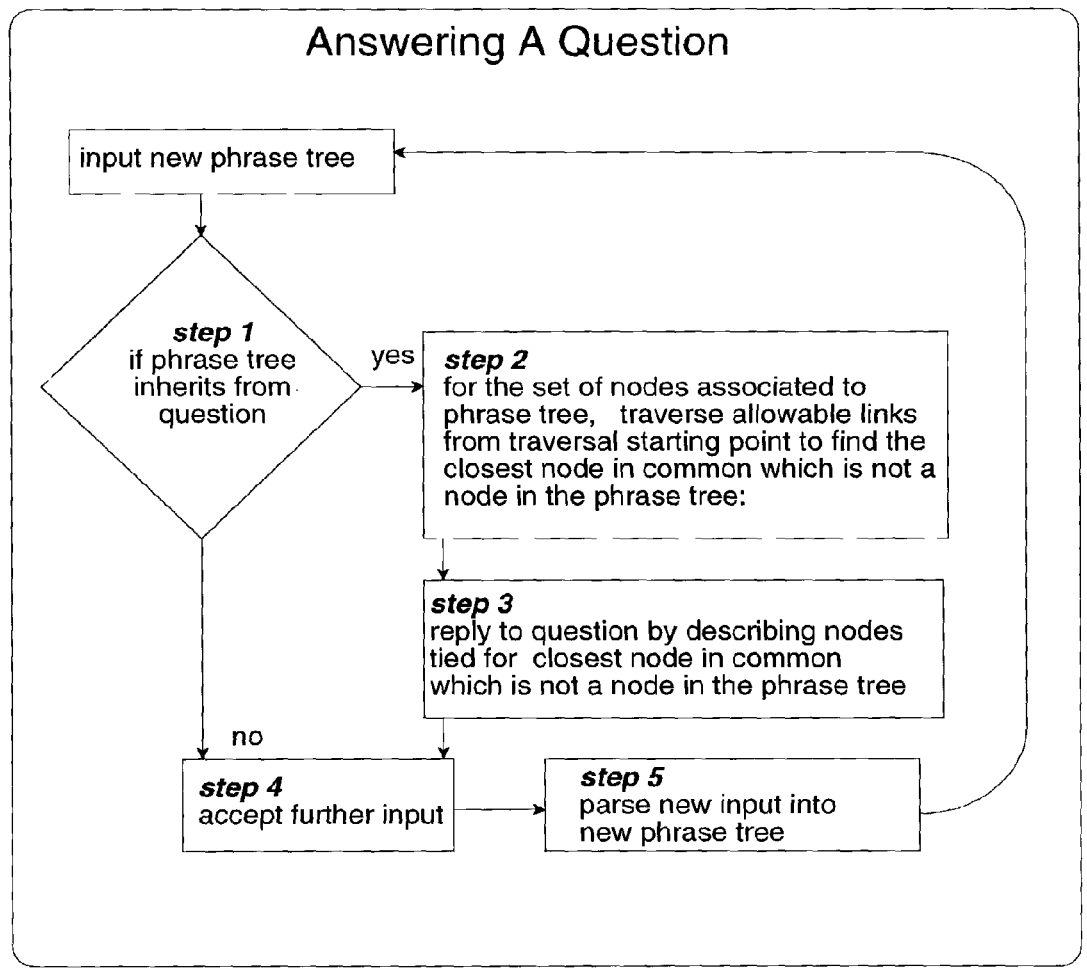
FIG. 51 shows an example of a method to detect and answer a question encountered in a dialog input phrase tree, in accordance with an embodiment of the present invention.
FIG. 52 shows an example of a table mapping from an input phrase tree's input node types to allowable links and traversal starting points of step 2 in FIG. 51, in accordance with an embodiment of the present invention.
Figure 58:
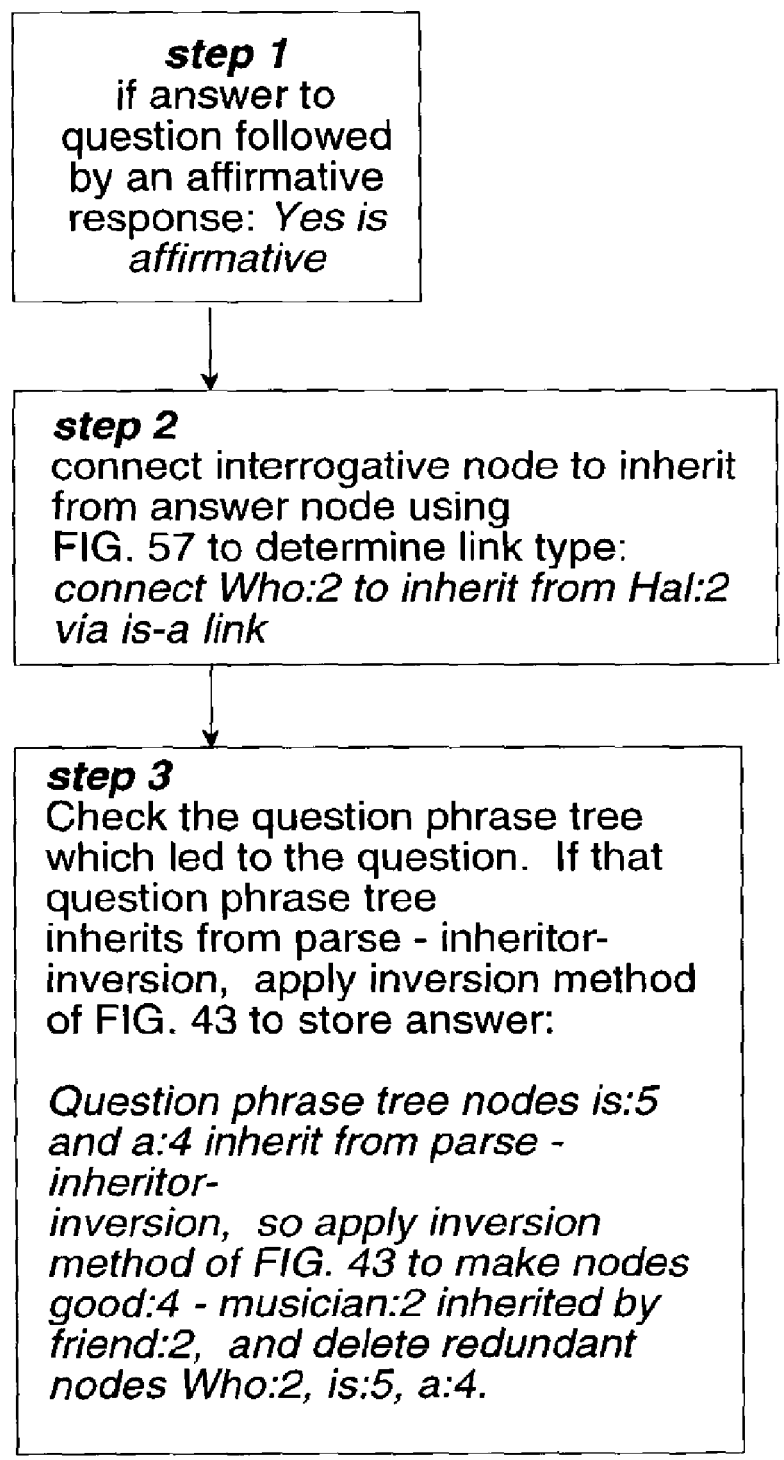
FIG. 58 shows the method of FIG. 56 applied to the semantic network of FIG. 53 to store the confirmed answer to the question "Who is a good musician friend," in accordance with an embodiment of the present invention.
Figure 59:
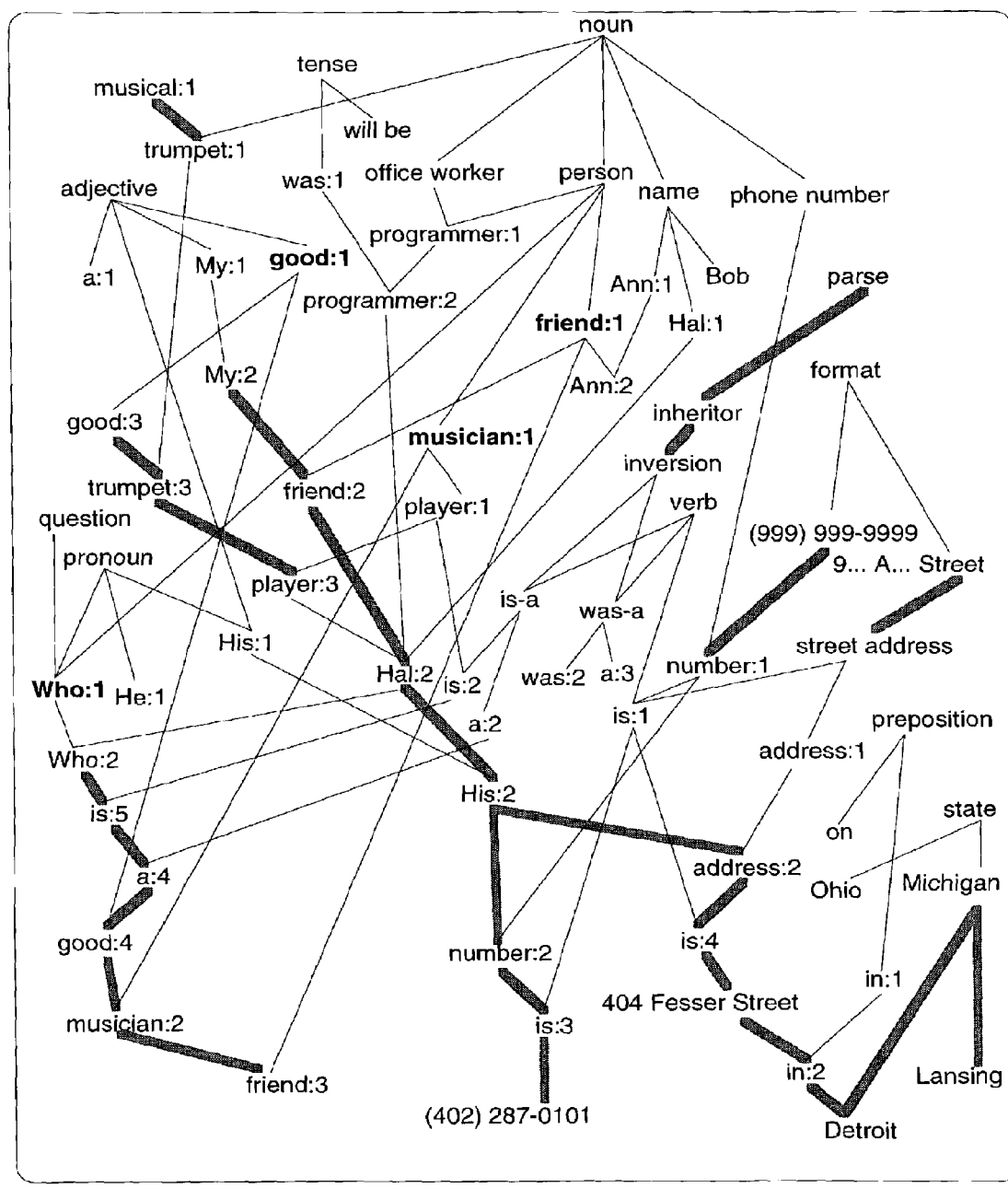
FIG. 59 shows the semantic network of FIG. 53 after step 2 of FIG. 56 has added a new is-a link between Who:2 and Hal:2, in accordance with an embodiment of the present invention.
Figure 60:
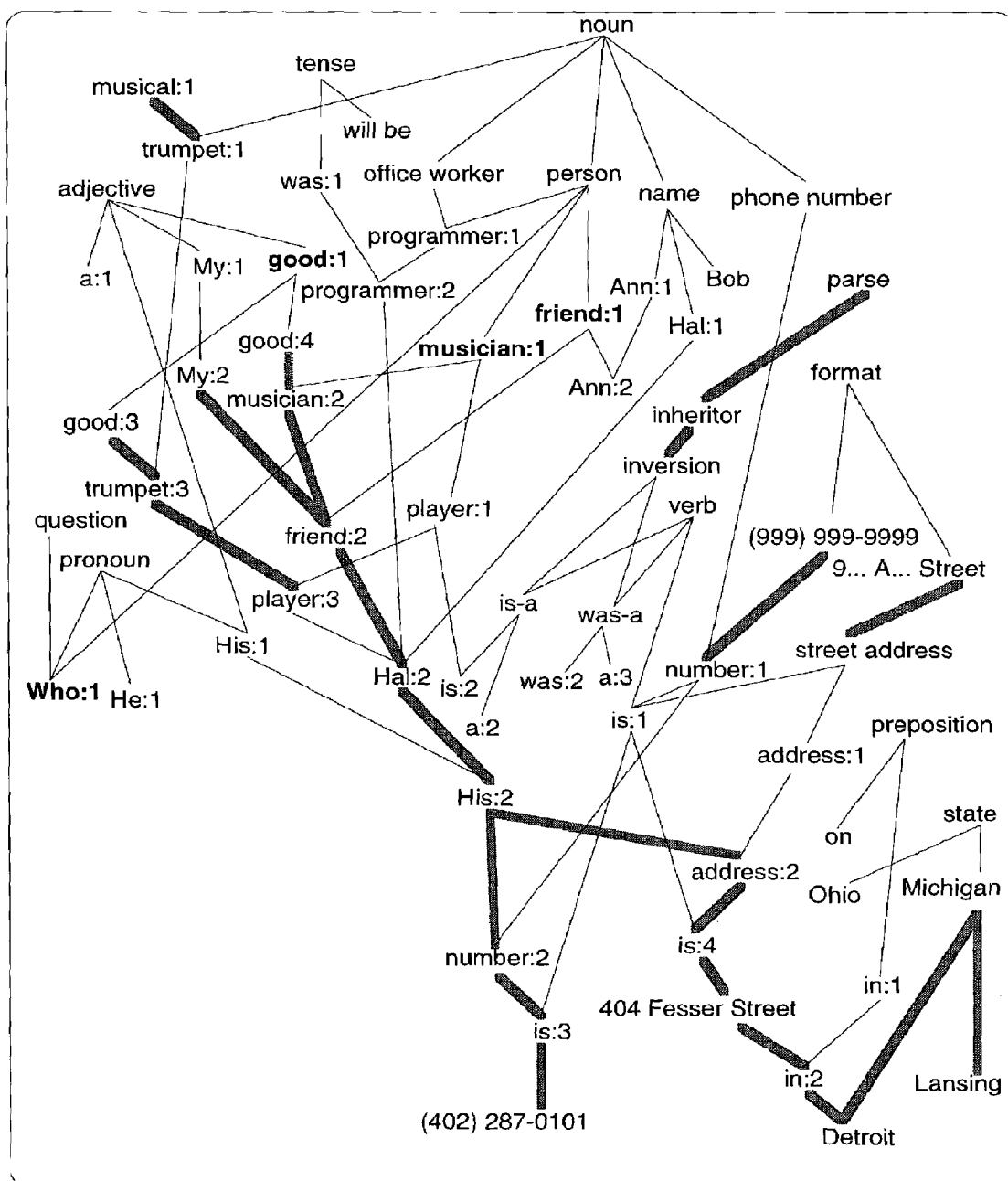
FIG. 60 shows the semantic network of FIG. 59 after step 3 of FIG. 56 has applied the inversion method of FIG. 43 to invert the input phrase tree for "good musician friend," in accordance with an embodiment of the present invention.

FIG. 51 through 60, in accordance with one embodiment of the present invention, show how parsed questions can be stored in a semantic network dictionary just as parsed statements can be stored. The parsed questions can be marked for later linking to their answers, as shown in FIG. 59, and entire question-answer parsed subtrees can be inverted to standard dictionary is-a link nodes as shown in FIG. 60. The method shown in FIG. 58 shows how to invert questions into is-a links. FIG. 51 shows how to generate an answer to a question, by describing nodes which best in the sense of a best contextual distance to the question nodes. FIG. 52 shows how to map question node types to traversal functions to fetch candidate nodes for answering questions. A set of candidate nodes having best contextual distance to the question nodes can then be chosen as an answer to questions.

Figure 50:
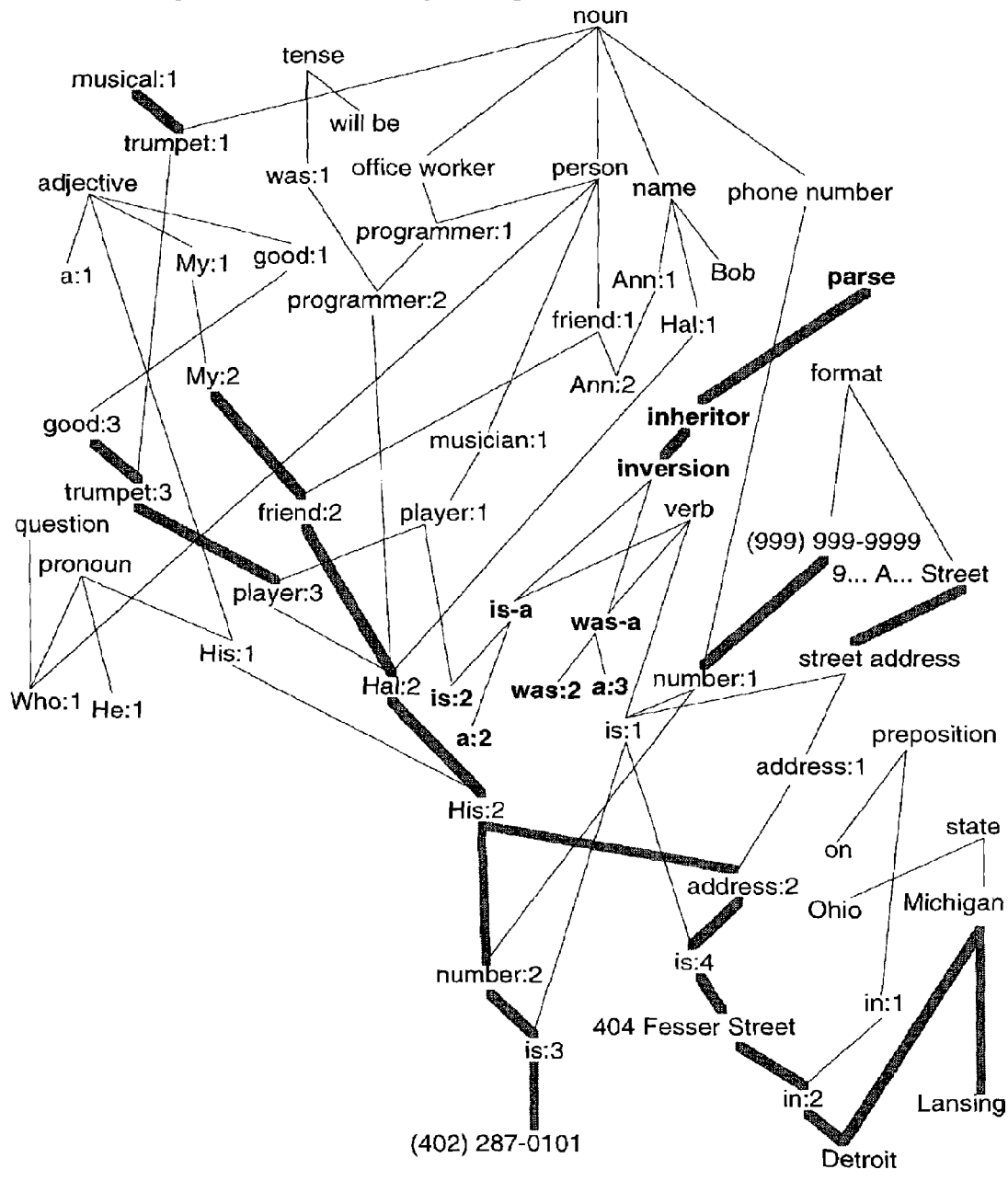
FIG. 50 shows the semantic network of FIG. 49 after applying step 2a of FIG. 43 to remove redundant semantic information, in accordance with an embodiment of the present invention.
Figure 53:
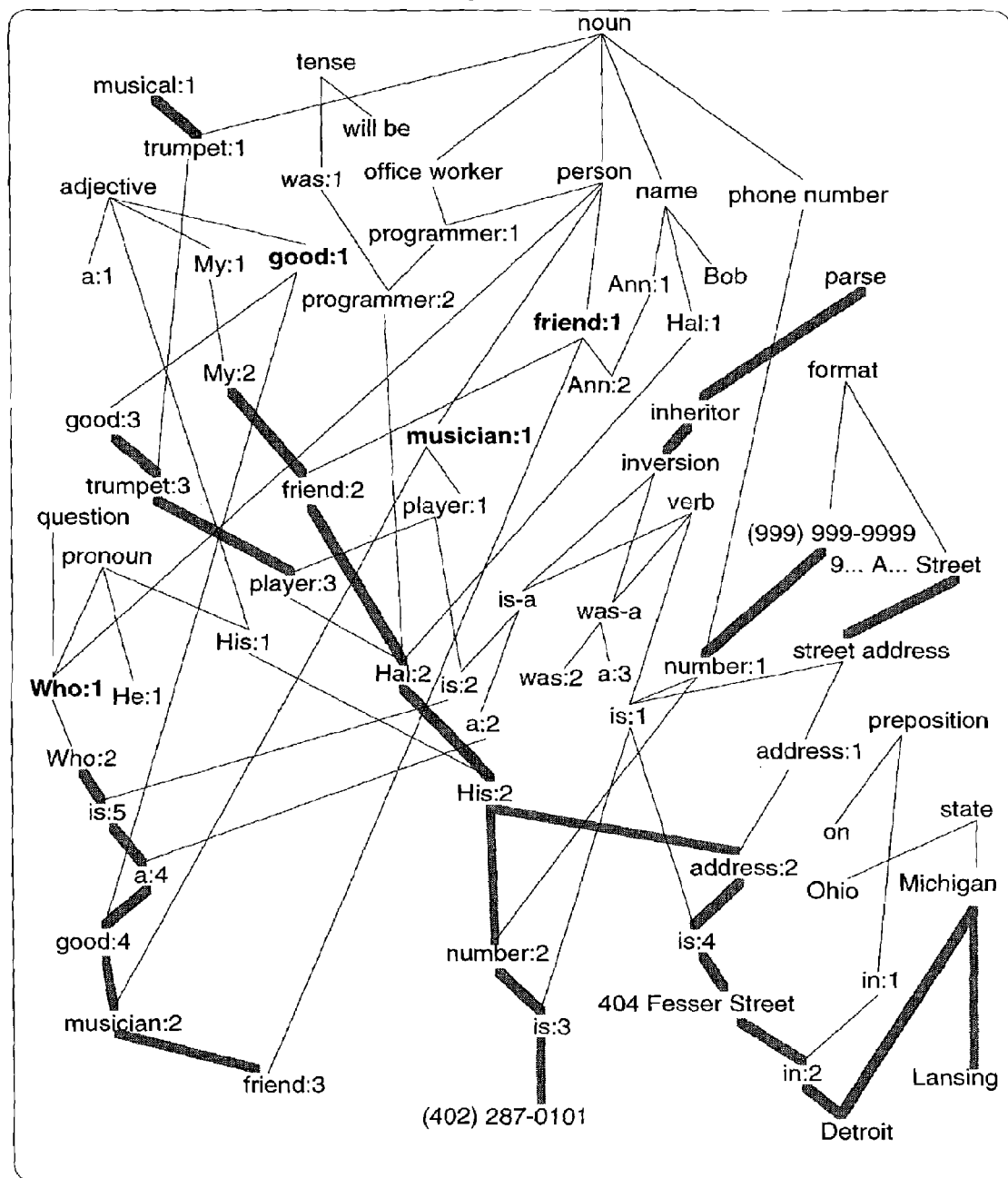
FIG. 53 shows the semantic network of FIG. 50 after adding the input phrase tree from the question "Who is a good musician friend," in accordance with an embodiment of the present invention.

FIG. 53 shows how the method of FIG. 51 answers the question from FIG. 42 by creating nodes in the semantic network of FIG. 50. Since the present invention automatically acquires semantic network meanings from natural language statements, questions and answers to questions, the present invention can automatically acquire all type of natural language meanings from natural language dialog. This automatic language acquisition functionality, together with the accuracy of the retrieval methods of the present invention makes the comparatively laborious data base maintenance work of relational database obsolete.

What is claimed is:

1. A system, comprising:
    a processor configured to facilitate execution of one or more computer-executable components, received by the system or stored in memory of the system, that at least:
        receive a natural language query;
        identify one or more meanings for a data set by removing syntactic ambiguities from the data set using one or more measurements associated with semantic distance to traverse the data set and a plurality of semantic network nodes included in a semantic network dictionary having a topology;
        determine a semantic efficiency measure for the semantic network dictionary based upon at least one measure of inheritor node population of the plurality of semantic network nodes and at least one measure of abstractness of the plurality of semantic network nodes; and
        rearrange the topology of the plurality of semantic network nodes to increase the semantic efficiency measure in response to detection of an inefficiency in the topology.

2. The system of claim 1, wherein the at least one measure of inheritor node population comprises at least one of a direct inheritor population, a total inheritor population, a direct inheritor deviation, a total inheritor deviation, or an average inheritor deviation.

3. The system of claim 1, wherein the at least one measure of abstractness comprises at least one of a mean inheritor abstractness, an abstract deviation, a total abstract deviation, or an average abstract deviation.

4. The system of claim 1, wherein the one or more computer-executable components further generate a semantically-relevant response to the natural language query, the semantically-relevant response corresponding to at least one of the one or more meanings.

5. The system of claim 4, wherein the one or more computer-executable components further output the semantically-relevant response to a portable device.

6. A method, comprising:
    receiving, at a computing device, a natural language query;

traversing a semantic network dictionary using at least one distance measurement, the semantic network dictionary comprising a plurality of semantic network nodes having a topology;

receiving or determining one or more meanings corresponding to at least one of the plurality of semantic network nodes;

determining a semantic efficiency measure for the semantic network dictionary based upon at least one measure of inheritor node population of the plurality of semantic network nodes and at least one measure of abstractness of the plurality of semantic network nodes; and rearranging the topology of the plurality of semantic network nodes to increase the semantic efficiency measure in response to detecting an inefficiency in the topology.

7. The method of claim 6, further comprising associating at least one of the plurality of semantic network nodes with a stored natural language context.

8. The method of claim 6, wherein the traversing comprises traversing the semantic network dictionary having at least one of the plurality of semantic network nodes inheriting from at least one other of the plurality of semantic network nodes.

9. The method of claim 6, wherein the traversing comprises traversing the semantic network dictionary having at least one link connecting two or more of the plurality of semantic network nodes.

10. The method of claim 6, wherein the traversing comprises traversing the semantic network dictionary using at least one of a minimum average distance or a maximum average distance.

11. The method of claim 6, further comprising:
generating a semantically-relevant response to the natural language query, the semantically-relevant response corresponding to at least one of the one or more meanings.

12. The method of claim 11, further comprising outputting the semantically-relevant response to a voice synthesizer.

13. The method of claim 11, further comprising outputting the semantically-relevant response to a mobile display device.

14. A non-transitory computer readable medium comprising computer executable instructions that, in response to execution, cause at least one device to perform operations, comprising:

receiving a natural language query;

traversing a semantic network dictionary using at least one semantic distance measurement, the semantic network dictionary comprising a plurality of semantic network nodes having a topology;

receiving or determining one or more meanings corresponding to at least one of the plurality of semantic network nodes;

determining a semantic efficiency measure for the semantic network dictionary based upon at least one measure of inheritor node population of the plurality of semantic network nodes and at least one measure of abstractness of the plurality of semantic network nodes; and rearranging the topology of the plurality of semantic network nodes to increase the semantic efficiency measure in response to detecting an inefficiency in the topology.

15. The non-transitory computer readable medium of claim 14, wherein the traversing comprises traversing the semantic network dictionary having at least one of the plurality of semantic network nodes inheriting from at least one other of the plurality of semantic network nodes.

16. The non-transitory computer readable medium of claim 14, the operations further comprising associating at least one of the plurality of semantic network nodes with a stored natural language context.

17. The non-transitory computer readable medium of claim 14, wherein the traversing comprises traversing the semantic network dictionary having at least one link connecting two or more of the plurality of semantic network nodes.

18. The non-transitory computer readable medium of claim 14, wherein the traversing comprises traversing the semantic network dictionary using at least one of a minimum average distance or a maximum average distance.

19. The non-transitory computer readable medium of claim 14, further comprising:
generating a semantically-relevant response to the natural language query, the semantically-relevant response corresponding to at least one of the one or more meanings.

20. The non-transitory computer readable medium of claim 19, further comprising outputting the semantically-relevant response to a voice synthesizer.

21. The non-transitory computer readable medium of claim 19, further comprising outputting the semantically-relevant response to a display device.

22. A system, comprising:
means for receiving a natural language query;
means for identifying one or more meanings for a data set by removing syntactic ambiguities from the data set using one or more measurements associated with semantic distance to traverse the data set and a plurality of semantic network nodes having a topology;
means for determining a semantic efficiency measure for the topology based upon at least one measure of inheritor node population of the plurality of semantic network nodes and at least one measure of abstractness of the plurality of semantic network nodes; and
means for rearranging the topology of the plurality of semantic network nodes to increase the semantic efficiency measure in response to detecting an inefficiency in the topology.

23. The system of claim 22, further comprising means for generating a semantically-relevant response to the natural language query, the semantically-relevant response corresponding to at least one meaning of the one or more meanings.

24. The system of claim 23, further comprising means for outputting the semantically-relevant response to a voice synthesizer.

25. The system of claim 23, further comprising means for outputting the semantically-relevant response to a display device.

* * * * *

UNITED STATES PATENT AND TRADEMARK OFFICE
CERTIFICATE OF CORRECTION

| | |
|---|---|
| PATENT NO. | : 8,204,844 B2 |
| APPLICATION NO. | : 12/577159 |
| DATED | : June 19, 2012 |
| INVENTOR(S) | : Au |

It is certified that error appears in the above-identified patent and that said Letters Patent is hereby corrected as shown below:

On the Title Page, in Field (56), under "OTHER PUBLICATIONS", in Column 2, Line 2, delete "Semuautomatic" and insert -- Semiautomatic --, therefor.

On Page 2, under "OTHER PUBLICATIONS", in Column 2, Line 25, delete ""Devolopment" and insert -- "Development --, therefor.

In Column 3, Line 32, delete "frame" and insert -- fame --, therefor.

In Column 5, Line 1, delete "FIG. 2." and insert -- FIG. 2 --, therefor.

In Column 5, Line 66, delete "potatoes," and insert -- potatoes", --, therefor.

In Column 15, Line 57, delete "relationship-b', relationship-c'." and insert -- 'relationship-b', 'relationship-c'. --, therefor.

In Column 18, Line 38, delete "type"." and insert -- type'. --, therefor.

In Column 19, Line 9, delete "FIG. 12." and insert -- FIG. 12 --, therefor.

In Column 19, Line 14, delete "FIG. 15." and insert -- FIG. 15 --, therefor.

In Column 23, Line 2, delete "step 6 FIG. 16" and insert -- step 6 of FIG. 16 --, therefor.

In Column 23, Line 5, delete "distance," and insert -- distance. --, therefor.

In Column 27, Line 3, delete "Is-a" and insert -- is-a --, therefor.

In Column 27, Line 32, delete "programmers," and insert -- programmer:2, --, therefor.

Signed and Sealed this
Thirtieth Day of October, 2012

David J. Kappos
*Director of the United States Patent and Trademark Office*